(12) United States Patent
Conger et al.

(10) Patent No.: US 8,739,737 B2
(45) Date of Patent: Jun. 3, 2014

(54) RACK SYSTEM AND MONITORING FOR ANIMAL HUSBANDRY

(75) Inventors: Dee L. Conger, La Jolla, CA (US); Francesca McGuffie, San Diego, CA (US); Leroy Jenson, La Mesa, CA (US); Cory Spivey, Escondido, CA (US)

(73) Assignee: Innovive, Inc., San Diego, CA (US)

( * ) Notice: Subject to any disclaimer, the term of this patent is extended or adjusted under 35 U.S.C. 154(b) by 0 days.

(21) Appl. No.: 12/614,291

(22) Filed: Nov. 6, 2009

(65) Prior Publication Data

US 2010/0242852 A1 Sep. 30, 2010

Related U.S. Application Data

(60) Provisional application No. 61/112,588, filed on Nov. 7, 2008.

(51) Int. Cl.
*A01K 1/03* (2006.01)

(52) U.S. Cl.
USPC .......................................... 119/419; 119/418

(58) Field of Classification Search
USPC ................................ 119/416–419
See application file for complete search history.

(56) References Cited

U.S. PATENT DOCUMENTS

| | | |
|---|---|---|
| 513,557 A | 1/1894 | Cobb |
| 1,909,611 A | 5/1933 | Charavay |
| 2,554,086 A | 5/1951 | Block |
| 2,988,044 A | 6/1961 | Adelberg et al. |
| 3,002,492 A | 10/1961 | Naturale |
| 3,084,850 A | 4/1963 | Engalitcheff, Jr. |
| 3,087,458 A | 4/1963 | Bennett |

(Continued)

FOREIGN PATENT DOCUMENTS

| | | |
|---|---|---|
| EP | 0160336 | 11/1985 |
| EP | 0233134 | 8/1987 |

(Continued)

OTHER PUBLICATIONS

International Search report and Written Opinion mailed on: May 28, 2010 in International Application No. PCT/US2009/063638 filed on Nov. 6, 2009 and published as WO 10/054257 on May 14, 2010.

(Continued)

*Primary Examiner* — Kristen C Hayes
(74) *Attorney, Agent, or Firm* — Grant IP, Inc.

(57) ABSTRACT

A rack system having shelves configured to support a plurality of disposable animal cages may include a modular configuration that is adapted to easily provide a desired rack size during manufacturing. A rack system may also include shelves which are configured to receive disposable cages and which have spring biased rails configured to receive edges of the disposable cages and provide a spring bias pushing apertures of a cage against nozzles of the shelf to provide a seal therebetween. A rack system may also include shelves which are configured to receive disposable cages and which have resilient flexible lids configured to deflect for releasable engagement into the rack assembly and establish a seal between the nozzle and receptacle for a controllable flow of air therethrough. A rack system may also include a monitoring system that includes at least one sensor in communication with a exhaust manifold of a cage that provides information to a controller that communicates cage conditions to a user via a graphic user interface. The controller may also provide information to a user independent of sensor data.

8 Claims, 37 Drawing Sheets

(56) References Cited

U.S. PATENT DOCUMENTS

| | | |
|---|---|---|
| 3,096,933 A | 7/1963 | Bora |
| 3,122,127 A | 2/1964 | Shechmeister et al. |
| 3,127,872 A | 4/1964 | Finkel |
| 3,163,149 A | 12/1964 | Ivey |
| 3,212,474 A | 10/1965 | Higgins et al. |
| 3,225,738 A | 12/1965 | Palencia |
| 3,302,615 A | 2/1967 | Tietje |
| 3,334,614 A | 8/1967 | Gass et al. |
| 3,397,676 A | 8/1968 | Barney |
| 3,465,722 A | 9/1969 | Duff |
| 3,500,831 A | 3/1970 | Schaar |
| 3,518,971 A | 7/1970 | Gass et al. |
| 3,524,431 A | 8/1970 | Graham et al. |
| 3,537,428 A | 11/1970 | Montgomery |
| 3,547,309 A | 12/1970 | Pusey et al. |
| 3,649,464 A | 3/1972 | Feeman |
| 3,662,713 A | 5/1972 | Sachs |
| 3,698,360 A | 10/1972 | Rubricius |
| 3,718,120 A | 2/1973 | Schwarz |
| 3,731,657 A | 5/1973 | Alessio |
| 3,765,374 A | 10/1973 | Kolste |
| 3,768,546 A | 10/1973 | Shipes |
| 3,771,686 A | 11/1973 | Brison |
| 3,776,195 A | 12/1973 | Willinger |
| 3,791,346 A | 2/1974 | Willinger et al. |
| 3,924,571 A | 12/1975 | Holman |
| 3,958,534 A | 5/1976 | Perkins |
| 3,965,865 A | 6/1976 | Kundikoff |
| 4,022,159 A | 5/1977 | Salvia |
| 4,023,529 A | 5/1977 | Landy |
| 4,043,256 A | 8/1977 | VanHuis |
| 4,161,159 A | 7/1979 | Leong |
| 4,177,761 A | 12/1979 | Bellocchi, Jr. |
| 4,252,080 A | 2/1981 | Gioia et al. |
| 4,343,261 A * | 8/1982 | Thomas ................. 119/418 |
| 4,365,590 A | 12/1982 | Ruggieri et al. |
| 4,367,728 A | 1/1983 | Mutke |
| 4,402,280 A * | 9/1983 | Thomas ................. 119/418 |
| 4,448,150 A | 5/1984 | Catsimpoolas |
| 4,480,587 A | 11/1984 | Sedlacek |
| 4,528,941 A * | 7/1985 | Spengler ................. 119/418 |
| 4,551,311 A | 11/1985 | Lorenz |
| 4,593,650 A | 6/1986 | Lattuada |
| 4,640,228 A | 2/1987 | Sedlacek et al. |
| 4,690,100 A | 9/1987 | Thomas |
| 4,699,088 A | 10/1987 | Murray et al. |
| 4,699,188 A | 10/1987 | Baker et al. |
| 4,728,006 A | 3/1988 | Drobish et al. |
| 4,774,631 A | 9/1988 | Okuyama et al. |
| 4,779,566 A | 10/1988 | Morris et al. |
| 4,798,171 A | 1/1989 | Peters et al. |
| 4,844,018 A | 7/1989 | Niki |
| 4,892,209 A | 1/1990 | Dorfman et al. |
| 4,907,536 A | 3/1990 | Chrisler |
| 4,940,017 A | 7/1990 | Niki et al. |
| 4,941,431 A | 7/1990 | Anderson et al. |
| 4,976,219 A | 12/1990 | Goguen et al. |
| 4,991,635 A | 2/1991 | Ulm |
| 5,000,120 A | 3/1991 | Coiro, Sr. et al. |
| 5,003,922 A | 4/1991 | Niki et al. |
| 5,031,515 A | 7/1991 | Niemela et al. |
| 5,044,316 A | 9/1991 | Thomas |
| 5,048,459 A * | 9/1991 | Niki et al. .................. 119/418 |
| 5,148,766 A | 9/1992 | Coiro, Sr. et al. |
| 5,163,380 A | 11/1992 | Duffy et al. |
| 5,165,362 A | 11/1992 | Sheaffer et al. |
| 5,213,059 A | 5/1993 | Krantz |
| 5,307,757 A | 5/1994 | Coiro, Sr. et al. |
| 5,316,172 A | 5/1994 | Apps et al. |
| 5,328,049 A | 7/1994 | Ritzow |
| 5,331,920 A | 7/1994 | Coiro, Sr. et al. |
| 5,349,923 A | 9/1994 | Sheaffer et al. |
| 5,385,118 A | 1/1995 | Coiro, Sr. et al. |
| 5,400,744 A | 3/1995 | Coiro, Sr. et al. |
| 5,407,129 A | 4/1995 | Carey et al. |
| 5,407,648 A | 4/1995 | Allen et al. |
| 5,429,800 A | 7/1995 | Miraldi et al. |
| 5,471,950 A | 12/1995 | White |
| 5,474,024 A | 12/1995 | Hallock |
| 5,513,596 A | 5/1996 | Coiro, Sr. et al. |
| 5,567,364 A | 10/1996 | Philipps |
| 5,572,403 A | 11/1996 | Mills |
| 5,572,953 A | 11/1996 | Phelan et al. |
| 5,605,240 A | 2/1997 | Guglielmini |
| 5,608,209 A | 3/1997 | Matsuda |
| 5,624,037 A | 4/1997 | Kozo |
| 5,655,478 A | 8/1997 | Kiera |
| 5,657,891 A | 8/1997 | Bilani et al. |
| 5,664,704 A | 9/1997 | Meadows et al. |
| 5,694,885 A | 12/1997 | Deitrich et al. |
| 5,717,202 A | 2/1998 | Matsuda |
| 5,745,041 A | 4/1998 | Moss |
| 5,771,841 A | 6/1998 | Boor |
| 5,780,130 A | 7/1998 | Hansen et al. |
| 5,797,350 A | 8/1998 | Smith |
| 5,823,144 A | 10/1998 | Edstrom et al. |
| 5,832,876 A | 11/1998 | Brown et al. |
| 5,865,144 A | 2/1999 | Semenuk |
| 5,894,816 A | 4/1999 | Coiro, Sr. et al. |
| 5,915,332 A | 6/1999 | Young et al. |
| 5,924,384 A | 7/1999 | Deitrich et al. |
| 5,954,013 A * | 9/1999 | Gabriel et al. ................. 119/419 |
| 5,954,237 A | 9/1999 | Lampe et al. |
| 5,996,535 A | 12/1999 | Semenuk et al. |
| 6,021,042 A | 2/2000 | Anderson et al. |
| 6,029,604 A | 2/2000 | de Vosjoli |
| 6,092,487 A | 7/2000 | Niki et al. |
| 6,112,701 A | 9/2000 | Faith et al. |
| 6,138,610 A | 10/2000 | Niki |
| 6,142,732 A | 11/2000 | Chou et al. |
| 6,158,387 A * | 12/2000 | Gabriel et al. ................. 119/419 |
| 6,164,311 A | 12/2000 | Momont |
| 6,217,437 B1 | 4/2001 | Murray et al. |
| 6,227,146 B1 | 5/2001 | Gabriel et al. |
| 6,257,171 B1 | 7/2001 | Rivard |
| 6,293,227 B1 | 9/2001 | Ver Hage |
| 6,295,826 B1 | 10/2001 | Lee |
| 6,295,950 B1 | 10/2001 | Deitrich et al. |
| 6,302,059 B1 | 10/2001 | Faith et al. |
| 6,308,660 B1 | 10/2001 | Coiro, Sr. et al. |
| 6,311,644 B1 | 11/2001 | Pugh |
| 6,336,427 B1 | 1/2002 | Gabriel et al. |
| 6,341,581 B1 | 1/2002 | Gabriel et al. |
| 6,357,393 B1 | 3/2002 | Coiro, Sr. et al. |
| 6,392,872 B1 | 5/2002 | Doustou et al. |
| 6,394,032 B1 | 5/2002 | Coiro, Sr. et al. |
| 6,396,688 B1 | 5/2002 | Davies et al. |
| 6,407,918 B1 | 6/2002 | Edmunds et al. |
| 6,408,794 B1 | 6/2002 | Coiro, Sr. et al. |
| 6,423,118 B1 | 7/2002 | Becerra et al. |
| 6,457,437 B1 | 10/2002 | Frasier et al. |
| 6,463,397 B1 | 10/2002 | Cohen |
| 6,517,428 B1 | 2/2003 | Murray et al. |
| 6,532,901 B2 | 3/2003 | Isley |
| 6,543,387 B1 | 4/2003 | Stein |
| 6,553,939 B1 | 4/2003 | Austin et al. |
| 6,556,437 B1 | 4/2003 | Hardin |
| 6,571,738 B2 | 6/2003 | Rivard |
| 6,572,819 B1 | 6/2003 | Wu et al. |
| 6,584,936 B2 | 7/2003 | Rivard |
| 6,588,373 B1 | 7/2003 | Strzempko et al. |
| 6,592,448 B1 | 7/2003 | Williams |
| 6,612,260 B1 | 9/2003 | Loyd et al. |
| 6,729,266 B1 | 5/2004 | Gabriel et al. |
| 6,739,846 B2 | 5/2004 | Stoddard et al. |
| 6,810,833 B2 | 11/2004 | Bonner et al. |
| 6,813,152 B2 | 11/2004 | Perazzo |
| 6,853,946 B2 | 2/2005 | Cohen et al. |
| 6,878,874 B2 | 4/2005 | Osborn et al. |
| 6,998,980 B2 | 2/2006 | Ingley, III |
| 7,031,157 B2 | 4/2006 | Horng et al. |
| 7,086,350 B2 | 8/2006 | Tecott |
| 7,114,463 B2 | 10/2006 | Donohoe |
| 7,126,471 B2 | 10/2006 | Ahmed |

(56) References Cited

U.S. PATENT DOCUMENTS

| | | | |
|---|---|---|---|
| 7,131,398 | B2 | 11/2006 | Cohen et al. |
| 7,146,931 | B2 | 12/2006 | Gabriel et al. |
| 7,191,734 | B2 | 3/2007 | Strzempko et al. |
| 7,237,509 | B2 | 7/2007 | Bonner |
| 7,320,294 | B2 | 1/2008 | Irwin et al. |
| 7,389,744 | B2 | 6/2008 | Zhang |
| 7,665,419 | B2 | 2/2010 | Conger et al. |
| 7,734,381 | B2 | 6/2010 | Conger et al. |
| 7,739,984 | B2 | 6/2010 | Conger |
| 7,874,268 | B2 | 1/2011 | Conger |
| 7,913,650 | B2 | 3/2011 | Conger |
| 7,970,495 | B2 | 6/2011 | Conger et al. |
| 8,082,885 | B2 | 12/2011 | Conger et al. |
| 8,156,899 | B2 | 4/2012 | Conger et al. |
| 8,171,887 | B2 | 5/2012 | Conger et al. |
| 2001/0054394 | A1 | 12/2001 | Marchioro |
| 2002/0022991 | A1 | 2/2002 | Sharood et al. |
| 2002/0094283 | A1 | 7/2002 | Salmen et al. |
| 2002/0100429 | A1 | 8/2002 | Wade |
| 2002/0190845 | A1 | 12/2002 | Moore |
| 2002/0195060 | A1 | 12/2002 | Dollahan |
| 2003/0130809 | A1 | 7/2003 | Cohen et al. |
| 2003/0131802 | A1 | 7/2003 | Murray et al. |
| 2003/0170145 | A1 | 9/2003 | Smith et al. |
| 2003/0200933 | A1 | 10/2003 | Park |
| 2004/0018105 | A1 | 1/2004 | Stoddard et al. |
| 2004/0185770 | A1 | 9/2004 | Soeholm et al. |
| 2004/0191437 | A1 | 9/2004 | Asayama et al. |
| 2005/0024211 | A1 | 2/2005 | Maloney |
| 2005/0066908 | A1 | 3/2005 | Park |
| 2005/0076852 | A1 | 4/2005 | Campiotti et al. |
| 2005/0145191 | A1 | 7/2005 | Cohen et al. |
| 2005/0166860 | A1 | 8/2005 | Austin et al. |
| 2005/0193957 | A1 | 9/2005 | Oshima et al. |
| 2005/0241591 | A1 | 11/2005 | Ingley, III |
| 2005/0256591 | A1 | 11/2005 | Rule et al. |
| 2006/0000422 | A1 | 1/2006 | Cheng |
| 2006/0011143 | A1 | 1/2006 | Drummond et al. |
| 2006/0111680 | A1 | 5/2006 | Spada et al. |
| 2006/0124072 | A1 | 6/2006 | Conger |
| 2006/0185614 | A1 | 8/2006 | Van Fleet, Jr. |
| 2006/0236951 | A1 | 10/2006 | Gabriel et al. |
| 2006/0278171 | A1 | 12/2006 | Conger et al. |
| 2007/0011950 | A1 | 1/2007 | Wood |
| 2007/0040682 | A1 | 2/2007 | Zhu et al. |
| 2007/0044799 | A1 | 3/2007 | Hete et al. |
| 2007/0159040 | A1 | 7/2007 | Fernandez et al. |
| 2007/0169714 | A1 | 7/2007 | Conger et al. |
| 2007/0169715 | A1 | 7/2007 | Conger et al. |
| 2007/0169716 | A1 | 7/2007 | Conger et al. |
| 2007/0169717 | A1 | 7/2007 | Conger et al. |
| 2007/0169718 | A1 | 7/2007 | Conger et al. |
| 2007/0175399 | A1 | 8/2007 | Conger et al. |
| 2007/0175404 | A1 | 8/2007 | Conger et al. |
| 2007/0181070 | A1 | 8/2007 | Conger et al. |
| 2007/0181074 | A1 | 8/2007 | Conger et al. |
| 2007/0181075 | A1 | 8/2007 | Conger et al. |
| 2007/0193527 | A1* | 8/2007 | Verhage et al. ............... 119/418 |
| 2007/0209653 | A1 | 9/2007 | Beisheim et al. |
| 2007/0256643 | A1 | 11/2007 | Coiro et al. |
| 2008/0066688 | A1 | 3/2008 | Malnati et al. |
| 2008/0078332 | A1 | 4/2008 | Conger et al. |
| 2008/0087231 | A1 | 4/2008 | Gabriel et al. |
| 2008/0134984 | A1 | 6/2008 | Conger et al. |
| 2008/0222565 | A1 | 9/2008 | Taylor et al. |
| 2008/0236506 | A1 | 10/2008 | Conger et al. |
| 2008/0236507 | A1 | 10/2008 | Conger et al. |
| 2009/0293815 | A1 | 12/2009 | Coiro et al. |
| 2010/0006521 | A1* | 1/2010 | VerHage et al. ........... 211/71.01 |
| 2010/0242852 | A1 | 9/2010 | Conger |
| 2011/0041773 | A1* | 2/2011 | Brielmeier et al. ........... 119/419 |
| 2011/0297098 | A1 | 12/2011 | Conger et al. |
| 2011/0303158 | A1 | 12/2011 | Conger et al. |
| 2011/0308475 | A1 | 12/2011 | Conger et al. |
| 2012/0085291 | A1 | 4/2012 | Conger et al. |

FOREIGN PATENT DOCUMENTS

| | | |
|---|---|---|
| EP | 0279076 | 12/1987 |
| FR | 2696423 A1 | 4/1994 |
| FR | 2824703 A1 | 11/2002 |
| JP | 56-3770 | 1/1981 |
| JP | 57-083233 | 5/1982 |
| JP | S56-54772 | 12/1982 |
| JP | 62-7852 | 1/1987 |
| JP | 03-244330 | 10/1991 |
| JP | 4-9555 | 1/1992 |
| JP | 4-023929 | 1/1992 |
| JP | 4-267826 | 9/1992 |
| JP | 05005499 | 1/1993 |
| JP | H06-068430 | 9/1994 |
| JP | 3022196 | 12/1995 |
| JP | 9-168346 | 6/1997 |
| JP | H10-215720 | 8/1998 |
| JP | 10-286037 | 10/1998 |
| JP | H11-009126 | 1/1999 |
| JP | 2000-032862 | 2/2000 |
| JP | 3070623 | 8/2000 |
| JP | 2003-088263 | 3/2003 |
| JP | 2003-018932 | 7/2003 |
| JP | 2005-095004 | 4/2005 |
| JP | 2005-185189 | 7/2005 |
| JP | 2005-328725 | 12/2005 |
| WO | WO 9218084 | 10/1992 |
| WO | WO 02/11523 | 2/2002 |
| WO | WO03051106 A1 | 6/2003 |
| WO | WO03059048 | 7/2003 |
| WO | WO 2006/065773 | 6/2006 |
| WO | WO 2008/127998 | 10/2008 |
| WO | WO 2010/054257 | 5/2010 |
| WO | WO 2012/051124 | 4/2012 |

OTHER PUBLICATIONS

Office Action mailed on: Apr. 2, 2010 in U.S. Appl. No. 11/695,079, filed Apr. 2, 2007 and published as US 2007-0169718 A1 on Jul. 26, 2007 and Issued as: 7,739,984 on Jun. 22, 2010.

Office Action mailed on: May 11, 2010 in U.S. Appl. No. 11/695,087, filed Apr. 2, 2007 and published as US 2008-0078332 A1 on Apr. 3, 2008.

Office Action mailed on: Oct. 13, 2009 in U.S. Appl. No. 11/695,079, filed Apr. 2, 2007 and published as US 2007-0169718 A1 on Jul. 26, 2007 and Issued as: 7,739,984 on Jun. 22, 2010.

Office Action mailed on: Dec. 26, 2007 in U.S. Appl. No. 11/695,086, filed Apr. 2, 2007 and published as US 2007-0181075 A1 on Aug. 9, 2007.

Office Action mailed on: Sep. 1, 2011 in U.S. Appl. No. 11/695,087, filed Apr. 2, 2007 and published as US 2008-0078332 A1 on Apr. 3, 2008.

International Search Report/Written Opinion mailed: May 7, 2012 in International Application No. for PCT/US2011/055650 filed on Oct. 10, 2011 and Published as: WO/2012/051124 on: Apr. 19, 2012.

Extended European Search Report dated: Dec. 11, 2012 in European Application No. EP 06773076 filed on: Jun. 13, 2006.

Extended European Search Report dated: Jun. 27, 2012 in European Application No. EP 12160134 filed on: Dec. 13, 2005.

International Preliminary Report on Patentability mailed: May 10, 2011 in International Application No. for PCT/US2009/063638 filed on Nov. 6, 2009 and Published as: WO/2010/054257 on: May 14, 2010.

National Research Council, Guide for the Care and Use of Laboratory Animals, Washington, D.C.: National Academy Press, 1996.

Canadian Council on Animal Care, Guidelines on, Laboratory Animal Facilities—Characteristics, Design and Development, Ottawa, ON: Canadian Council on Animal Care, 2006.

Office Action mailed: May 23, 2013 in U.S. Appl. No. 12/377,591, filed Feb. 13, 2009 and published as: 2011/0061600 on: Mar. 17, 2011.

Office Action mailed: May 24, 2013 in U.S. Appl. No. 13/594,703, filed Aug. 24, 2012 and published as: 2012/0318207 on: Dec. 20, 2012.

(56) References Cited

OTHER PUBLICATIONS

Office Action mailed on: Jun. 18, 2013 in U.S. Appl. No. 12/101,046, filed Apr. 10, 2008 and published as US 2008/0282990 on Nov. 20, 2008.
Office Action mailed: Jun. 26, 2013 in U.S. Appl. No. 13/771,015, filed Feb. 19, 2013 and published as US 2013/0220229 on Aug. 29, 2013.
Office Action mailed: Aug. 2, 2013 in U.S. Appl. No. 13/775,080, filed Feb. 22, 2013 and published as US 2013/0160716 on Jun. 27, 2013.
Ancare Catelog, Systems and supplies for Animal Care, Sep. 2006, from World Wide Web URL "ancare.com".
International Preliminary Report on Patentability for PCT/US2005/044977 mailed: Mar. 5, 2009.
International Preliminary Report on Patentability for PCT/US2007/018255 mailed: Feb. 26, 2009.
International Search Report and Written Opinion for PCT/US2008/063766 mailed: Sep. 25, 2008.
International Search Report/Written Opinion for PCT/US2005/44977 mailed: Sep. 30, 2008.
International Search Report/Written Opinion for PCT/US2006/23038 mailed: May 28, 2008.
International Search Report/Written Opinion for PCT/US2007/018255 mailed: Jun. 16, 2008.
International Search Report/Written Opinion for PCT/US2008/059953 mailed: Jul. 16, 2008.
Marketing Materials From Trade Show Distributed Nov. 7, 2005.
Web Page describing Nalgene animal cage cover printed on Dec. 5, 2006 from VWR Catalogue on World Wide Web http://www.vwrsp.com.
Office Action mailed on: Oct. 5, 2009 in U.S. Appl. No. 11/695,087, filed Apr. 2, 2007 and published as US 2008-0078332 A1 on Apr. 3, 2008.
Claim Translation for Japanese Patent Document JP56-3770. Translation certified: Feb. 5, 2009.
Statement under 37 C.F.R. section 1.98(a)(3) for Japanese Patent Document JP56-3770. Statement made: Feb. 6, 2009.
Claim Translation for Japanese Patent Document JP62-7852. Translation certified: Feb. 5, 2009.
Statement under 37 C.F.R. section 1.98(a)(3) for Japanese Patent Document JP62-7852. Statement made: Feb. 6, 2009.
Claim Translation for Japanese Patent Document JP04-9555. Translation certified: Feb. 5, 2009.
Statement under 37 C.F.R. section 1.98(a)(3) for Japanese Patent Document JP04-9555. Statement made: Feb. 6, 2009.
Wikipedia/pulse-width-modulation (printed from internet http://en.wikipedia.org/wiki/Pulse-width_modulation on Dec. 5, 2009).
Office Action mailed Sep. 18, 2013 in U.S. Appl. No. 13/775,080, filed Feb. 22, 2013 and published as US 2013/0160716 on Jun. 27, 2013.
Office Action mailed on Oct. 18, 2013 in U.S. Appl. No. 13/270,165, filed Oct. 10, 2011 and published as US 2012-0085291 on Apr. 12, 2012.
Office Action mailed on Oct. 18, 2013 in U.S. Appl. No. 13/776,645, filed on Feb. 25, 2013 and published as US 2013-0228134 on Sep. 5, 2013.
Office Action dated Nov. 26, 2013 in U.S. Appl. No. 12/377,591, filed on Nov. 23, 2010 and published as US 2011-0061600 on Mar. 17, 2011.
Office Action dated Dec. 5, 2013 in U.S. Appl. No. 13/771,015, filed on Feb. 19, 2013 and published as US 2013-0220229 on Aug. 29, 2013.
Office Action dated Jan. 3, 2014 in U.S. Appl. No. 13/594,703, filed on Aug. 24, 2012 and published as US 2012-0318207 on Dec. 20, 2012.
Office Action dated Mar. 6, 2014 in U.S. Appl. No. 12/101,046, filed on Apr. 10, 2008 and published as US 2008-0282990 on Nov. 20, 2008.

\* cited by examiner

Innovive

Racks

| | Serial Number | Description | Actual | Target | Status | | | |
|---|---|---|---|---|---|---|---|---|
| ☐ | rack1 | Rack #1 | 58 ACH / -8 DP | 60 ACH / -15 DP | alive | settings | data | ○ |
| ☐ | rack2 | Breeding Rack #5 | 46 ACH / 25 DP | 44 ACH / 25 DP | alive | settings | data | ○ |
| ☐ | rack3 | RS Prototype #1 | 51 ACH/ -11 DP | 50 ACH/ -10 DP | alive | settings | data | ○ |
| ☐ | rack4 | future rack | n/a ACH / n/a DP | n/a ACH / n/a DP | down | settings | data | ○ |

Update target settings on selected racks

Alerts

FIG. 49

Innovive | Alerts

Rack Settings

Rack Settings for rack 'Rack #1' (rack1)

| Setting | Description | Stored Value | Last Updated | Target Value | Current Value | New Target Value |
|---|---|---|---|---|---|---|
| ACH | Air Changes per Hour | 55 | 2009-04-21 15:20:12 | 60 | 61 | 60 |
| DP | Differential Pressure | +20 | 2009-04-21 15:20:12 | -15 | -18 | -15 |

Rack status: alive (Store New Values)

(Set Vet Alert) (Clear Vet Alert)

(Done)

FIG. 50

Innovlve

Rack Data

Rack Data for rack 'Rack #1' (rack1)

last 5 minutes | last hour | last 6 hours | last 12 hours | last day | last week | last month | all

| Type | Value | Time | Ref |
|---|---|---|---|
| ach | 33.99,40.09 | 2009-10-11 18:40:25 | 192287 |
| dp | 17.9 | 2009-10-11 18:40:25 | 192288 |
| ach | 31.44,39.82 | 2009-10-11 18:39:55 | 192285 |
| dp | 21.34 | 2009-10-11 18:39:55 | 192286 |
| dp | 23.7 | 2009-10-11 18:39:36 | 192284 |
| ach | 31.28,42.63 | 2009-10-11 18:39:36 | 192283 |
| dp | 17.28 | 2009-10-11 18:39:06 | 192282 |
| ach | 31.22,39.08 | 2009-10-11 18:39:06 | 192281 |
| ach | 30.99,39.83 | 2009-10-11 18:38:36 | 192279 |
| dp | 17.81 | 2009-10-11 18:38:36 | 192280 |
| ach | 31.37,39.47 | 2009-10-11 18:26:55 | 192277 |
| dp | 21.19 | 2009-10-11 18:26:55 | 192278 |
| ach | 33.66,38.89 | 2009-10-11 18:26:25 | 192275 |
| dp | 17.51 | 2009-10-11 18:26:25 | 192276 |
| dp | 20.39 | 2009-10-11 18:25:57 | 192274 |
| ach | 32.4,39.9 | 2009-10-11 18:25:56 | 192273 |
| dp | 23.35 | 2009-10-11 18:25:27 | 192272 |
| ach | 32.05,40.68 | 2009-10-11 18:25:26 | 192271 |
| dp | 22.51 | 2009-10-11 18:24:56 | 192270 |

FIG. 51

RACK SYSTEM AND MONITORING FOR ANIMAL HUSBANDRY

RELATED APPLICATIONS

This application claims priority from U.S. Provisional Patent Application Ser. No. 61/112,588, filed Nov. 7, 2008, titled "Rack System and Monitoring for Animal Husbandry", naming Dee L. Conger et al. as inventors which is incorporated by reference herein in its entirety.

This application is related to Patent Application Ser. No. 60/911,271, filed Apr. 11, 2007, naming Dee L. Conger, Thomas M. Perazzo, Francesca McGuffie, and Matthew D. d'Artenay as inventors, titled "Animal Husbandry Drawer Caging Systems and Components", and to U.S. Provisional Patent Application Ser. No. 60/979,721, filed Oct. 12, 2007, naming Dee L. Conger and Thomas M. Perazzo as inventors, titled "Animal Husbandry Drawer Caging", both of which are incorporated by reference herein in their entirety. This application is also related to U.S. Provisional Patent Application Nos. 60/635,756, 60/690,811 and 60/717,826 filed on 13 Dec. 2004, 14 Jun. 2005 and 16 Sep. 2005, respectively, entitled "Animal Containment Systems And Components," naming Thomas Perazzo and Dee Conger as inventors. This application is also related to U.S. Provisional Patent Application Nos. 60/734,229 and 60/734,189, each filed on 7 Nov. 2005, entitled "Containment Systems And Components For Animal Husbandry," naming Thomas Perazzo and Dee Conger as inventors, respectively. This application is also related to U.S. Provisional Patent Application No. 60/804,554 filed on 12 Jun. 2006, entitled "Containment Systems And Components For Animal Husbandry," naming Dee Conger et al. as inventors. This application is also related to U.S. Provisional Patent Application Nos. 60/822,755 and 60/822,914 filed on 17 Aug. 2006 and 18 Aug. 2006, entitled "Containment Systems And Components For Animal Husbandry," naming Dee Conger et al. as inventors, respectively. This application is also related to U.S. patent application Ser. No. 11/300,664 filed on 13 Dec. 2005, International Patent Application No. PCT/US2005/044977 filed on 13 Dec. 2005, U.S. patent application Ser. No. 11/423,949 filed on Jun. 13, 2006, and International Patent Application No. PCT/US2006/023038, each entitled "Containment Systems And Components For Animal Husbandry," each naming Dee Conger et al. as inventors, respectively, International Patent Application No. PCT/US2007/018255, filed Aug. 17, 2007, naming Dee L. Conger, Thomas M. Perazzo, Matthew D. d'Artenay and Francesca McGuffie as inventors, entitled "Containment Systems and Components for Animal Husbandry". Each of the foregoing patent applications is incorporated herein by reference in its entirety.

FIELD OF THE INVENTION

The invention pertains to the field of animal husbandry and to animal containment.

BACKGROUND

Animal containment systems are utilized in a variety of applications, such as for animal transportation, breeding and maintenance. Animals contained in the systems often are laboratory animals such as rodents, and such animals often are contained in a vivarium. Containment systems may include animal cages in which the animals are housed and a rack unit onto which cages are mounted. Animals contained in such systems emit several gaseous and particulate contaminates that are health risks to housed animals and human personnel maintaining the systems. Generally, permanent or multiple-use cages are designed for multiple uses, which requires they are washed and sterilized about every week for two years or more in an animal containment facility, for example, especially in a facility practicing Good Laboratory Procedures (GLPs). Multiple-use cages generally are heavy and have relatively thick walls and components often are constructed from resilient materials that can withstand multiple washes and sterilizations. Such cages may be disposed in a rack that holds multiple cages in order to house the animals more efficiently, however, it may be inconvenient to remove the cages from such rack in order to perform cleaning and other maintenance work.

Due to these aspects of typical multiple-use animal containment systems, a significant portion of animal containment resources are required for washing and sterilizing multiple-use components. Multiple-use cage designs also can present disadvantages with respect to contamination, such as requiring contaminated air filter handling or exposure of cage components to the environment when a cage impacts a surface (e.g., a cage is dropped by a user or falls from an elevation), for example, which bear especially on handling of animals in higher biosafety level animal facilities.

As such, what has been needed are animal containment cages and systems that eliminate the need for regular washing of cages, provide a safe and healthy environment for contained animals and optionally provide an efficient means for housing a large number of animals in a limited space.

BRIEF DESCRIPTION OF THE DRAWINGS

FIGS. 48-51 are diagrammatic screen shot embodiments of the rack servers of the rack system of FIG. 46.

DETAILED DESCRIPTION

Figure 1:
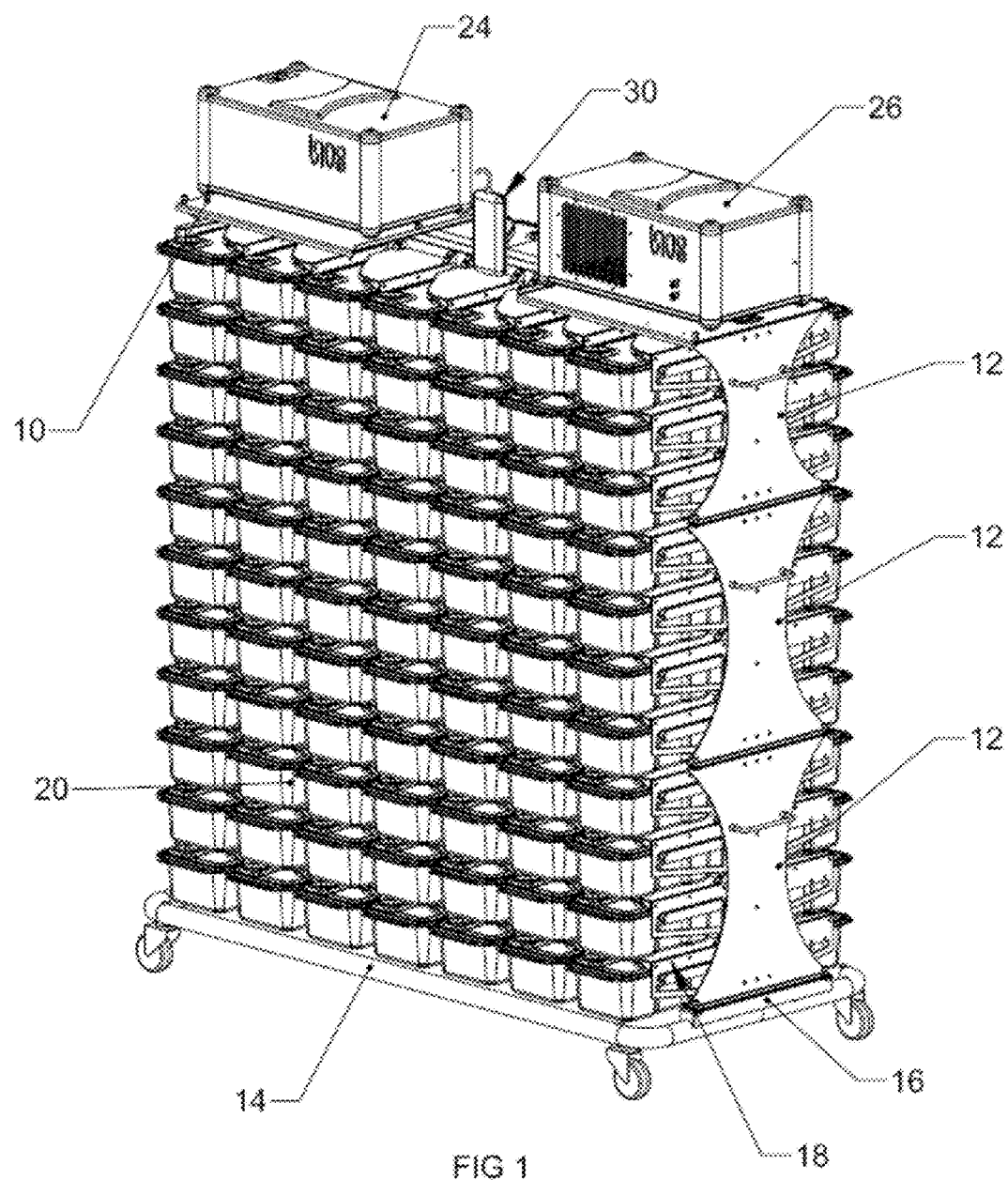
FIG. 1 is a perspective view of a rack system.

Provided herein are animal containment systems that may include disposable, single-use cages, which do not require washing and sterilization by laboratory personnel. The animal containment systems and components may be used for containment of animals for research and breeding, for example. Cage assemblies of such systems often include relatively thin walls constructed from a polymer. Features of cage embodiments discussed herein may substantially reduce or prevent the possibility that contained animals will damage the relatively thin polymeric material (e.g., gnawing damage). The low weight and relative flexibility of single-use cages, as compared to thicker, rigid multiple-use cages, provide for cages less prone to breakage or disassembly upon impact due to inadvertent dropping of a cage by a user or other impact. Some cage embodiments and associated components thereof also may be efficiently nested, thereby advantageously reducing required storage space.

Ventilated system embodiments provided herein may include a rack system with one or more blower assemblies coupled to individual cages with a manifold system. The one or more blowers and manifold system may be configured to efficiently exchange air in cages and efficiently maintain temperature within cages. Such ventilated systems may be operated at relatively high air pressures within a blower and manifold system and without adjustable valves to each cage. Instead of adjustable valves, each cage assembly may be in communication with the high pressure air supply or exhaust of the manifold system through an aperture of fixed cross sectional area, providing for airflow and air pressure uniformity and efficient airflow control across a range of air pressures of the manifold system.

Also provided are animal containment systems that comprise modular components, often components that are readily disassembled. In some embodiments, rack units include one or more attachable and detachable rack modules that are readily disassembled for washing of the rack modules. These and other features of the components disclosed herein can reduce the amount of resources required for animal containment, can enhance quality of care afforded to the housed animals, and can minimize health risks to human personnel who care for or study the contained animals.

Some animal containment cage embodiments may include a containment cage base member, a cover or lid member, and an optional insertion member or device. An animal cage base sometimes is provided separately from a lid, the lid often may be attached to the cage base and the lid may be readily detachable from the base. An animal, such as a rodent, and/or optional insertion member may be placed in a cage base before a lid is attached. A variety of animals may be contained within cage embodiments described herein. Rodents often are contained within such units, including but not limited to mice, rats, hamsters, gerbils, guinea pigs, chinchillas and rabbits. The animal can be transgenic, inbred, immunodeficient, lack one or more functional genes (e.g., knock-out animal), and/or can include one or more xenografts. Examples of immunodeficient mice include nude mice and severe combined immune deficiency (SCID) mice. Cells from cultured cell lines, cultured primary cells or directly from another animal or tissue (e.g., biopsy) may be utilized for xenografts (e.g., cancer cells from a human). The animals contained in cages and systems described herein can be utilized in a variety of manners, including but not limited to studying cancer and other diseases, assessing parameters of potential drugs (e.g., toxicity, efficacy, maximum tolerated doses, effective doses and other pharmacokinetic parameters), producing and isolating antibodies and producing and isolating cells useful for preparing hybridomas, for example.

Cage base embodiments may be of any geometry suitable for housing animals, such as cylindrical, substantially cylindrical, conical, rectangular, square, cubic, rhomboid and the like, for example. Cage base embodiments may include a bottom member that supports a plurality of sides or sidewall members (e.g., four sidewall members). One sidewall member may be referred to as a "front sidewall member" and the opposite sidewall member may be referred to as a "rear sidewall member." Opposing sidewall members sometimes are parallel, substantially parallel, not parallel, rhomboid, substantially rhomboid or a combination thereof. In some embodiments, opposing sidewalls are not parallel, and are not vertical or perpendicular with respect to the bottom. In such embodiments, a sidewall, and sometimes all sidewalls, are at a non-90 degree angle with respect to the bottom, such as an angle between about 91 degrees and about 105 degrees, an angle of about 92 degrees to about 98 degrees or an angle of about 95 degrees, for example. Such angled sidewall configurations (with respect to the bottom) can promote cage base nesting (described in greater detail hereafter).

Each edge junction or corner junction of a wall or walls and/or the bottom may have a geometry convenient for manufacture and use, such as a sharp edge, smooth edge or rounded edge. Certain corner and edge geometries in animal containment components reduce or eliminate the possibility of damage caused by animal residents (e.g., gnawing damage by rodents). This resistance to damage caused by contained animals may be especially applicable to single-use containment components having thin polymer walls (e.g., about 0.01 inches to about 0.08 inches). Damage resistant edge and corner orientations have been determined based upon a combination of (i) angle of edge or corner surfaces (in degrees) and (ii) edge or corner radius (in inches). The angle alpha between two surfaces is measured from the side of the surfaces on which an animal resides. When alpha is less than 180 degrees, the edge or corner minimum radius may be zero. When alpha is between 180 degrees and 360 degrees, a minimum radius can be determined by the following equation:

minimum radius=0.25/(tan((pi/360)(360−alpha))).

For example, minimum edge and corner radii of 0.02, 0.04, 0.07, 0.09, 0.12, 0.14, 0.18, 0.21, 0.25, 0.30, 0.36, 0.43, 0.54, 0.69, 0.93, 1.42, 2.86 and 5.73 inches often are incorporated when the corresponding angle alpha is 190, 200, 210, 220, 230, 240, 250, 260, 270, 280, 290, 300, 310, 320, 330, 340, 350 and 355 degrees, respectively, in accordance with this relation. Thus, provided are edge and corner angle/minimum radius combinations in accordance with the above relation.

Cage base embodiments may include rounded junctions of a suitable radius, which can minimize damage caused by gnawing or clawing of housed animals, for example. Thus, in some embodiments, bottom corners, each formed at the junction of a bottom and two sidewalls, often are not sharp corners and often are smooth corners defined by a radius. Each corner in some embodiments may be effectively split into multiple edges which may improve crumple resistance to impact. Crumple resistance to impact provides benefits of maintaining nesting efficiency, reducing potential damage caused by animal gnawing (e.g., impact can crumple a corner and introduce a sharp edge on which an animal may gnaw), and maintaining cage integrity upon impact (e.g., not exposing the cage interior to the outside environment). In certain embodiments, a corner may be effectively split into 10, 9, 8, 7, 6, 5, 4 3 or 2 corners, each often defined by a radius.

A top edge of one or more sidewall members often is contiguous with a flange or rim portion that extends, often vertically, from the outer surface of the sidewall member. The flange sometimes forms a continuous surface around the top perimeter of the cage and its surface may be substantially horizontal when a bottom member of the cage rests on a horizontal surface. The flange may be any suitable width, sometimes about 0.03 inches to about 1 inch. The flange may increase cage base rigidity and sometimes is configured to mate with a portion of a lid member, described further herein. In some embodiments, the flange includes an optional downward extending lip member, which sometimes mates with a corresponding member of a lid to form a detachable seal. The profile of the lip member of the base is of any shape to allow a fit with a corresponding structure on the lid, where the profile sometimes is curved, and sometimes is S-shaped, V-shaped or J-shaped. The lip member and/or flange member of the cage base sometimes are shaped to deflect when mated with a lid member to form a seal between the cage base and the lid. A seal between cage base embodiments and lid embodiments, which may be partial, may be of any convenient or useful type, including but not limited to an adhesive seal, compression fit or interference fit, for example. Some cage embodiments do not require or include a seal between the cage base and lid.

A cage base sometimes includes one or more indents in a sidewall member that extends towards the interior of the cage base. One, two, three, four or more sidewalls sometimes include one or more indents, which can increase sidewall rigidity. Sidewall integrity enhancement can provide an advantage of increasing impact resistance to crumpling, advantages of which are described above. The depressed surface area of an indent can be trapezoidal or rectangular. The depressed distance of the indent vertical from a sidewall from which the indent extends often is continuous from the top of the indent to the bottom (e.g., the face is parallel to the side wall from which the indent is extended), and may be greater at the top of the indent, sometimes tapering from the top portion of the indent to the bottom portion. Such configurations allow for nesting of cage bases when they are not housing an animal, as described hereafter.

A cage base may include one or more mounts located on an outside surface of a sidewall member or bottom member, which may be referred to as "outer support members" or "outer guide members," which allow for convenient mounting of the cage into a rack unit. The outer support members or outer guide members are of any configuration allowing for mounting of the cage base into a rack unit member or shelf, and sometimes mate with or are supported by corresponding members in a rack unit embodiment.

In certain embodiments, a guide member and/or support member is a flange, projection, rib or groove located on the exterior surface of a bottom member of a base and/or one or both cage sidewall members (e.g., sidewall member adjacent to the front sidewall and rear sidewall), and often may be parallel with the top edges of the sidewall members. Such guide members and support members sometimes extend from the front edge of a sidewall member, sometimes extend to the rear edge of a sidewall member, sometimes extend from a point in a sidewall member a distance from the front edge, and sometimes extend to a point in a sidewall member a distance from the rear edge. Such members sometimes are oriented in the middle half of the vertical length of a sidewall member, and sometimes are oriented in the middle of the vertical length. In some embodiments, guides are low profile, and sometimes are grooves or depressions, that do not substantially interfere with nesting of cage bases.

Some cage base embodiments may be manufactured from any material suitable for housing an animal, such as a small rodent, for a time period of about one week or greater. The material may be rigid, and often is a semi-rigid or flexible material. The cage base sometimes is constructed entirely, or in part, from a translucent or transparent material. Examples of materials that may be utilized for manufacture of any of the a cage base or lid embodiments discussed herein include, but are not limited to, polypropylene (PE), high-density polyethylene, low-density polyethylene, polyethylene teraphthalate (PET), polyvinyl chloride (PVC), polyethylenefluoroethylene (PEFE), polystyrene (PS), high-density polystryrene, acrylnitrile butadiene styrene copolymers and the like. In certain embodiments, a cage is constructed from PET or PS (e.g., high density PS). For any of the embodiments discussed herein, it may be desirable to use a photodegradable or biodegradable material in order to reduce the impact of the use of disposable type cage assemblies on landfills and other waste management depots. One such material may include a biodegradable PET, such as a biodegradable PET by BioLand from Advanced Extrusions in Minnesota. Such a biodegradable PET material may include the polyethylene terephthalate and an organic additive which creates an extension of the polymer chain that is highly attractive to microbes. Some such additives may be used that do not degrade the strength, stiffness, impact resistance, abrasion resistance, gas barrier properties or migration propensity of the material. Some biodegradable PET materials may have a specific gravity of about 1.3 grams per $cm^2$ and a tensile strength of about 7,000 psi to about 8,500 psi.

Sidewall members and bottom members of cage base embodiments may be of any thickness for substantially maintaining cage integrity for about one, two, three or four or more weeks of animal containment, and the thickness sometimes is about 0.01 inches to about 0.08 inches. The sidewalls often are of substantially uniform thickness. A cage base often is manufactured as a single unit and by any convenient process, sometimes in an injection molding, thermoforming or vacuum forming process, for example. A cage base often is packaged for shipment, sometimes as a single unit and sometimes with other like units (e.g., as a nested set described hereafter). A cage base sometimes is washed and/or sterilized (e.g., U.V. irradiation, gamma irradiation) prior to packaging. Cage bases may be packaged in any material, including but not limited to materials containing polystyrene, polyvinyl chloride, low-density polyethylene and the like.

Some embodiments of a cage base floor may be about 60 square inches to about 90 square inches, and sometimes about 75 square inches, for some embodiments. The height of such cages sometimes is about 4 inches to about 6 inches and sometimes about 5 inches. In a specific embodiment, wall junction radii are about 1 inch, and sometimes 1.06 inches. In some embodiments, the cage is constructed from PET and weighs about 110 grams to about 150 grams, and sometimes is about 130 grams (e.g., 130.4 grams). For rat cage bases, the cage floor sometimes is about 130 square inches to about 150 square inches, and sometimes is about 140 square inches. The height of such cages sometimes is about 5 inches to about 9 inches, and sometimes is about 7 inches.

A cover or lid may be provided separately from a cage base, often reversibly mates with a cage base, sometimes in sealing attachment, and may be of any suitable geometry allowing for attachment to base embodiments, including sliding attachment. Some lid embodiments may include one or more members that directly mate with and seal with one or more members of a base; sometimes has no side wall members; and sometimes is planar or substantially planar. Some lid embodiments may be constructed from any material that allows for animal containment for about one week or greater. Materials for constructing a lid sometimes are selected to allow for sealing or partial sealing attachment to a cage base. Examples of materials from which lid embodiments may be constructed include those described above for cage base embodiments. Sometimes the lid and base are constructed from the same material and sometimes are of a similar or the same thickness as a thickness of a corresponding base.

Some lid embodiments may be flexible or semi-rigid and include a substantially planar region and a flange region. The substantially planar region may include one or more components described herein. A flange region of lid embodiments sometimes is embossed, may be raised and may includes a region that extends downwards as a lip (referred to herein as a "lip"). A flange and optional lip region may extend continuously around the perimeter of lid embodiments. The profile of the flange and optional lip often correspond to a flange and optional lip on a cage base, and may allow the lid to seal or partially seal with some base embodiments. The flange and optional lip may include any suitable shape to fit with corresponding base embodiments, and sometimes are S-shaped, V-shaped, J-shaped and U-shaped, upwards or inverted, for example.

Some lid embodiments may include one or more of a continuously solid surface, an imperforate surface region, and/or a perforated surface region (e.g., a region containing air holes or a grid structure). A lid member sometimes includes, sometimes within a substantially planar region, an aperture, a groove, a channel, a depressed or indented region, a bossed region, a rib (e.g., an embossed rib or solid rib), and sometimes a combination of the foregoing. Such a structure or structures may be located near a heavier structure in the lid, such as around or near a water supply receptacle or a connector that receives a corresponding non-lid connector. A lid member sometimes includes other components, such as a filter, a baffle, a feeding structure, and/or a watering structure, holders of the foregoing, and combinations of the forgoing, where each structure is integral or provided as a component separate from the lid member. Edges or corners in a lid may be rounded or otherwise defined by a radius and/or angle as described herein for cage base embodiments. A lid in certain embodiments may be rigid. A lid member may comprise a combination of a flexible region with a rigid or semi-rigid region, the rigid or semi-rigid region sometimes acting as a frame that allows a lid to be handled efficiently and conveniently when securing it to a cage base, for example. Lid embodiments, or a portion or portions thereof, may be translucent or transparent.

Lid embodiments may sometimes include one or more air filters. Such air filters often are configured to filter components (e.g., particulates) in air exiting an interior volume of a cage. Some filter embodiments may be composed of any filter material useful for housing animals, including but not limited to spunbonded polyester, pressed pulp (depth filter), a Reemay filter (e.g., Reemay 2024), high-efficiency particulate air (HEPA) filter and the like (e.g., U.S. Pat. No. 6,571,738). Filter embodiments may be configured to exclude or otherwise filter out particles which are about 1 micron to about 5 microns in size, more specifically, about 0.3 microns to about 1 micron in size. The filter often may be in effective connection with a portion of the surface area of a lid member, and often only a portion or fraction of the surface area of the lid member. In some embodiments, the filter may be in effective connection with 80% or less, 70% or less, 60% or less, 50% or less, 40% or less, 30% or less, 25% or less, or 20% or less of the lid member surface area. Filter embodiments sometimes are integrated with the lid (e.g., the filter is not reversibly mounted to the lid member), and may be provided separately from the lid. When provided separately from the lid, a filter often is placed in effective connection with a portion of the lid, often a perforated portion of the lid (e.g., a portion having air apertures or a grid structure).

A filter may be affixed to a lid in any suitable manner, often by reversible and/or sealing attachment, and in some embodiments, filter embodiments may include an adhesive, sometimes on the outer perimeter of the filter, sometimes across the entire surface area of the filter, and often on one side of the filter. Where the filter includes an adhesive, it sometimes is provided with a peel-off backing that exposes the adhesive, and the adhesive often allows for reversible adhesion (e.g., the filter can be affixed, removed or partially peeled back from the lid, and then affixed again, which can be repeated multiple times). Filter embodiments may be secured to a lid by a manufacturer of the lid, and/or may be attached/detached by a user. In some embodiments, filter embodiments may be in connection with a flexible film, the latter of which is coated on a surface (e.g., the entire surface or a portion of the surface) with an adhesive. When an adhesive is utilized, it often is not substantially toxic to animals housed in the cage and sometimes is a food grade adhesive. The filter and/or film often may be disposed adjacent to or in effective connection with one or more apertures of the lid.

In certain embodiments, a filter may be sandwiched between the lid and a holding member or shield attached to the lid. The holding member often includes one or more apertures through which air may flow, and the holding member often is sealingly attached to the lid (e.g., attached by an adhesive). In such embodiments, a substantial surface area of the filter often is not in direct contact with the holding member, which may provide an advantage of reducing potential gnawing damage caused by a contained animal (such a holding member also is referred to herein as a "filter shield"). Standing an air filter away from surfaces of the lid and optional filter shield(s) provides certain advantages, such as permitting efficient airflow and protecting filter material from possible damage caused by contained animals (e.g., animals cannot effectively contact the filter). For example, some filter embodiments may have a pore size of about 0.5 microns and there may be approximately 1000 pores per inch. The corresponding percentage of open area for this type of filter may be about 2%.

A relatively large filter surface may be utilized in some embodiments to permit airflow through the filter without significant restriction or pressure drop. Filter dimensions in the lid sometimes are about six (6) inches by about two (2) inches. The resulting area available to airflow for a filter of these dimensions may be about 12 square inches multiplied by 2%. The area available to airflow would be significantly limited by exhaust apertures in the lid if the filter paper were in direct contact with the lid (e.g., the area available to flow is that of the area of the apertures, which can be (the square of 0.125/4 multiplied by 27 holes multiplied by 2%). Thus, standing a filter away from apertures in the lid and optional filter shield(s) can significantly enhance airflow by allowing the entire filter paper to breathe.

Characteristics of cages provided herein may contain cage components and characteristics which are resistant to damage when the cages are exposed to physical impact. For example, combinations of (i) sliding attachment of a cage base to a lid, (ii) light weight of the cage base and lid resulting from thin walls, (iii) flexibility of the semi-rigid base and lid, and (iv) base corner geometry (e.g., effectively split into more than one corner), may be configured to reduce the possibility that cage contents (e.g., animals, animal waste and cage additives) are exposed to the outside environment as compared to reusable, rigid cages. In the event a cage is exposed to impact (e.g., dropped or falls to a floor from an elevated position) these features may protect contained animals from the exterior environment and protect personnel from cage contents. These features may be desirable for application in higher biosafety level environments, for example.

Lid embodiments may sometimes include a substance that scavenges emissions from an animal in the cage. Emissions sometimes are gaseous or particulate compositions, such as those resulting from exhalation (e.g., water vapor, carbon dioxide), urination and defecation (e.g., ammonia, microbes), and exfoliation (e.g., dander, hair follicles, allergens, fomites, microbes (e.g., bacteria, fungi and viruses)), for example. The scavenging substance sometimes is a catalyst or is utilized in combination with a catalyst that breaks down an emission from an animal into innocuous substances (e.g., biocatalyst). A scavenging substance sometimes is included in a filter or is located adjacent to a filter, and sometimes is located in another portion of a cage (e.g., on a floor and/or below a sub-floor). Any scavenging substance suitable for use with animals can be used, such as charcoal or other form of carbon.

Lid embodiments sometimes include a delivery component for delivering a consumable element to a housed animal, such as air, water or food. The delivery component sometimes is integral with the lid, sometimes the lid is in contact with a separate delivery component (e.g., a surface of the lid is in contact with a flange member of a food trough), sometimes the lid comprises a holder or receptacle for the delivery component, and sometimes the lid includes an aperture adapted to receive the delivery component.

In some embodiments the lid includes one or more connectors adapted to receive an air supply or air exhaust component or water supply component (e.g., a nozzle or nozzle receptacle). A connector can be of any geometry to receive a corresponding connector from an air supply, air exhaust or water supply component. The cage lid connector often mates with the air supply, air exhaust or water supply connector by a sealing attachment, and often by a reversible connection, and the connectors are of any suitable type. For example, the connection may be defined by cylindrical, square, rectangular or conical side geometry, and flat, rounded, tip or point geometry for the top or bottom, for example. The connecting member in the lid may be a protrusion or a void (e.g., concave or convex, respectively) that receives a corresponding mating void or protrusion, respectively.

In some embodiments the connector structure in the lid may be a void that includes two apertures, a larger aperture and a smaller aperture, where the larger aperture is spaced above the smaller aperture. In such embodiments, the mating nozzle connector may be seated, often reversibly, in the void, thereby forming a substantially air-tight seal. In some embodiments the connector structure in the lid comprises a protrusion having an aperture, where the aperture is at the apex of the protrusion. In such embodiments, a void in the mating nozzle connector may be configured to fit over the protrusion in the lid, often reversibly, and forms a substantially air-tight seal. Connection geometry in the latter described embodiments can provide advantages of (a) expanding air exiting an air supply connector along inner walls of the lid connector and other lid and cage surfaces, which expansion cools air in the cage and compensates for thermal load of a contained animal, and (b) substantially reducing or preventing the possibility of damage caused by contained animals (e.g., gnawing, clawing).

Some embodiments of a containment cage have a conical receptacle in the lid extending outwardly from the lid, and the connection member may also be conical concave in certain embodiments. The nozzle connector of an air supply component may be seated in the lid by hand or by any other method, and connection may be a gravity fit, pressure fit, screw fit, spring bias engagement or another suitable fit. In some embodiments, the conical connector is held in a carriage that guides the connector into the lid. Such carriages sometimes are connected to a rack unit, often to a shelf thereon, embodiments of which are described hereafter. The conical void sometimes may be located in an embossed region of the lid, where the top surface of the embossed region sometimes is substantially elliptical. Where the lid comprises a flange, the height of the embossed region sometimes is equal to or substantially equal to the highest point of the flange.

A connector, such as an air supply and/or air exhaust or water supply connector, sometimes is in contact with a channel. Such a channel may be formed within the lid in some embodiments, and may be formed by raised corresponding raised portions on each side of the lid. The channel in some embodiments may be formed by the mating of (a) a bossed portion of the lid and (b) a corresponding bossed portion in a filter barrier member. The channel often includes one or more apertures on the side opposite the connector, such that air introduced through the connector may enter the cage. In embodiments where the channel is formed in part by a filter shield, the filter shield may include one or more apertures. In some embodiments, two or more apertures are distributed across the length of the channel, which can provide an advantage of distributing or exhausting airflow across the width of the cage, or a portion thereof. The channel may be of any suitable shape for permitting airflow: the channel cross section may be circular, ovular, semi-circular, semi -ovular, rectangular, square, rhomboid or trapezoidal, for example, and the length of the channel may comprise or consist of a linear, circular, triangular, rectangular, ellipsoid, arc, sinusoidal or zig-zag geometry, for example. The length of the channel sometimes is not entirely linear and sometimes it is non-linear. The latter embodiments provide an advantage of reducing adherence of a filter to the lid or a filter barrier as a filter surface cannot depress as readily across a non-linear depression as a linear depression.

Some cage embodiments provided herein allow for transverse cage airflow designed to minimize air recirculation and bypass, thereby providing efficient use of airflow for air exchange and temperature regulation. In some embodiments, provided is an animal containment cage including a lid and a base, where the lid may include an air inlet and an air exit, a baffle between the air inlet and air exit that extends downwards into the interior of the cage, and air flows downward from the inlet, through the cage interior and out the exhaust exit. In certain embodiments, air flows in a substantially U-shaped pattern, and sometimes the cage includes nesting material for an animal and air flows in proximity to or through the nesting material. The air inlet sometimes is at substantially one end of the lid and the air exhaust exit is at substantially the end of the lid. The air inlet sometimes includes an air supply connector, and the air exhaust exit sometimes includes an array of apertures and/or one or more air exhaust connectors. The baffle sometimes extends from one wall of the cage to the opposite wall, and sometimes is one or more surfaces of a feeding tray. The baffle often may be in effective sealing connection with two walls of a cage (e.g., a feeding trough resting on two cradles, one in each of two opposing sidewalls) to prevent or substantially reduce airflow around baffle sides and permit airflow under the baffle.

In some embodiments, a lid or base of a containment cage may be in connection with an airflow baffle. Airflow baffle embodiments often extend downwards from an inner surface of lid embodiments into a portion of the cage interior. A baffle often may be located between an air inlet aperture and an air exit aperture, thereby directing airflow around the baffle. Sides of baffle embodiments often are in close contact or substantially contacted with sidewalls of a cage base so that airflow is directed towards the bottom of the cage base and does not bypass the baffle along cage sidewalls. In some embodiments, a feed tray is configured such that a wall of the tray acts as a baffle. Directing airflow towards the bottom of the cage and then up through the top of the lid may be desirable for purging gaseous waste from bedding material located at the cage bottom and for reducing airflow required for maintaining the animals. In some embodiments, baffle embodiments may be formed by a food trough or tray in connection with a lid and a base that projects towards the bottom of the cage base. The food trough in such embodiments often is a member separate from the lid and the base and rests on a cradle (i.e., mount) formed in an indent within the cage base.

Some lid embodiments may include a water supply component. The lid sometimes includes an integral water supply reservoir to which an emitter is connected or integrated. In some embodiments, the lid includes a water supply receptacle or holder into which a water supply that includes an optional emitter is seated, and in certain embodiments, the lid includes an aperture through which a water reservoir is fixed and/or suspended. In some embodiments, the lid is in connection with or comprises a feed supply component, often referred to herein as a "feeder," "food trough," or "food tray." The lid sometimes includes an integral food tray, and sometimes is in connection with a member of a separate food tray module when the lid is mated with a cage base. In some embodiments, the lid includes a food tray holder into which a food tray is seated, and in certain embodiments, the lid includes an aperture through which a food tray is fixed and/or suspended.

A lid member sometimes does not include an air exhaust connector and sometimes does not include an air inlet connector. Accordingly, in some lid member embodiments: the lid member sometimes is rigid, semi-rigid, or flexible, or includes a flexible region; the lid member sometimes includes a flexible material and a semi-rigid material, and sometimes a filter; a filter in a lid often lids a portion of the surface area of a lid member and not the entire surface area of the lid member; the lid member sometimes comprises a continuously solid surface area and a filter, where the solid surface area is rigid, semi-rigid, flexible or a combination thereof; the lid member sometimes includes a continuously solid surface area and a filter, where the continuously solid surface area is imperforate and not a grid.

Examples of cage members or components in addition to a cage base and lid include watering devices and feeding structures separate from a cage base or cage lid or integrated with the foregoing. These additional members are referred to herein as "insert or insertion members." A cage insert member sometimes may be placed in a cage base or cage lid before a lid is secured to the top of a base embodiments. In some embodiments, an insert member may be located near the top of a cage base in proximity to the lid, such as in food trough embodiments described herein. In some embodiments, an insert member defines a top portion of a containment space for one or more animals housed in the cage. An insert member, such as a food tray, sometimes rests on or is positioned by one or more mounts or cradles extending from an inner surface of one or more sidewall members of a cage base.

In some embodiments, an insert is a substantially flat, planar member, where the surface of the insert is parallel to the surface of the cage base bottom member. One or more edges of the insert member often substantially mate, sometimes are substantially flush, sometimes are in close proximity, and sometimes are sealingly contacted with the inner surface of one or more sidewall members. In some embodiments, each edge of the insert substantially mates, is substantially flush, is in close proximity, or is sealingly contacted with the inner surface of each corresponding sidewall member. An edge of an insert member is of any thickness appropriate for the material from which it is constructed for housing an animal, and sometimes is about 0.010 inches to about 0.080 inches. An insert member is constructed of any material suitable for containing an animal using materials and manufacturing process such as those described for manufacturing cage bases, for example.

An example of an insert member is a food tray. A food tray often includes a bottom integrated with four wall members, and optionally includes a lid adapted to sealing attach to the food tray. One or more sidewall members and/or the bottom, can include one or more openings or slots that expose food in the feeding structure to a housed animal. Opposing sidewalls sometimes are parallel, non-parallel, curved, elliptical or rhomboid, where two or more of the sidewall members may taper downwards to a bottom member having a surface area less than the surface area of the top opening or lid member. Edge and corner junctions between the sidewalls and bottom often are curved and have a radius convenient for manufacture and animal feeding. A radius sometimes is selected to minimize abrasions caused by housed animals.

Some food tray embodiments may include a flange member surrounding the top edge of the food tray. In some embodiments, the food tray bottom is curved and not flat, and in certain embodiments the food tray is constructed from a plurality of vertically arranged tubular structures (e.g., wire). Some food tray embodiments may be constructed of any material suitable for feeding animals, examples of which include but are not limited to: a metal alloy, stainless steel, steel, nickel, nickel alloy, zinc, zinc alloy, aluminum, a polymer, polypropylene, high-density polyethylene, low-density polyethylene, polyethylene teraphthalate, polyvinyl chloride, polyethylenefluoroethylene, polystyrene, high-density polystyrene, acrylInitrile butadiene styrene copolymers and the like, and combinations of the foregoing. In some embodiments, a food tray may be constructed from a polymer, such as the same polymer from which the lid is manufactured, in certain embodiments the food tray is a metal alloy and in some embodiments the food tray may be a combination of a metal structure and a polymer frame or housing component.

In certain embodiments, the tray may be constructed from polyethylene teraphthalate or polystyrene (e.g., high-density polystyrene). In some embodiments, the food tray, and sometimes the cage and/or lid, may be constructed from a substantially hard polymer. Such polymers are known and measures of hardness include Rockwell (e.g., Rockwell M or R), Brinell, Shore, Izod (e.g., Izod impact, notched), Charpy (e.g., Charpy impact, notched) and Vickers measures. Substantially hard polymers, as opposed to softer polymers, may reduce the possibility of gnawing damage caused by contained animals without increasing or substantially increasing material thickness.

Another example of an insert member is a water supply, which also may be referred to herein as a "reservoir." Water or another suitable hydrating liquid is emitted to contained animals via the water supply. The water supply or reservoir, and corresponding reservoir holder or aperture for receiving a reservoir in a cage component (e.g., lid), is of any geometry convenient for dispensing water. A reservoir may be a box-shaped structure, sometimes is a substantially cylindrical structure, and sometimes is a substantially cylindrical structure with gently tapered side walls (slightly conical) and a chamfer. A reservoir sometimes may be geometrically configured to reduce the potential of abrasions caused by housed animals (e.g., reduce abrasions caused by animals gnawing on the watering structure), and in some embodiments, a reservoir comprises rounded corners (e.g., a rounded junction between a bottom edge and a sidewall member edge) and/or edges (e.g., rounded junction between two sidewall member edges).

Rounded corner radiuses are described herein. A reservoir sometimes is adapted to mate with a sealingly attachable lid or cap located in a convenient location of the bottle (e.g., the top or bottom), such as a screw-on lid or snap on lid, for example, such that the reservoir can be filled with water and then sealed with the lid. Accordingly, a reservoir often includes male or female threads adapted to receive threads from a screw-on lid or a fitting for a snap-on lid. A portion of the reservoir exposed to the inside of a cage (e.g., the bottom of the reservoir, cap or lid) often includes a small aperture that can retain water by surface tension until contacted by an animal.

A side wall region of the reservoir may be chamfered and sometimes can mate with a corresponding chamfer in a receptacle of the lid. Such a chamfer can function as a key that ensures alignment of the reservoir in the lid. A step in a radius of the aperture also may generate an interference fit with the reservoir receptacle, ensuring a tight seal between the reservoir and the lid and thereby reducing and substantially preventing air leakage. A reservoir may be constructed of any material suitable for containing a fluid for hydrating animals (e.g., water) including but not limited to: polypropylene, high-density polyethylene, low-density polyethylene, polyethylene teraphthalate, polyvinyl chloride, polyethylenefluoroethylene, acrylInitrile butadiene styrene copolymers, cellulose, cellulose lined with a polymer or metallic foil, and the like.

For embodiments in which a lid comprises a water reservoir holder, the reservoir holder sometimes is substantially cylindrical with slightly tapered sidewalls and a chamber located in the side and bottom. Such a geometry of the holder can key a similarly shaped reservoir, where the chamfers of the holder and the reservoir mate. Such holders often include an aperture, often in the chamfer region, adapted to receive an emitter from the reservoir, such that the emitter is accessible to a housed animal. Such holders often are adapted to receive a reservoir that includes a step in the radius such that the top portion of the reservoir has a larger diameter than the lower portion, which provides an interference fit with the inner wall of the holder and a substantially air tight fit.

In some embodiments, an emitter contains a valve sometimes located in the emitter and sometimes located at the junction of the emitter and the reservoir. In some embodiments, the emitter contains no valve. A quick release coupling sometimes connects the emitter to the reservoir. In certain embodiments, the emitter is conical with the larger cross sectional area connected to the reservoir and a small aperture on the opposite end accessible to a housed animal. In such embodiments, the aperture is sized to retain water in the reservoir by surface tension and to emit water when contacted by a housed animal. In certain embodiments, provided is a water bottle for use in conjunction with a lid, which comprises a cap having an aperture that retains water via the inherent surface tension of water within the cap face, the latter of which is defined by a flat surface. In the latter embodiments, the cape face is not conical and does not include a projection.

Fluid supply embodiments may be configured to reduce the likelihood that an animal resident can damage the supply structure (e.g., gnawing damage). For example, provided herein are rodent containment cage bottles comprising three walls, a top, a bottom an aperture and a barrier in effective connection with the aperture, where: the bottle may be constructed from a polymer; two of the walls are about perpendicular (e.g., 85 degrees to 95 degrees or 90 degrees) and the third wall is curved; and the bottle may retain fluid at the aperture when inverted. The top, bottom and walls of the bottle generally may form a substantially semi-spherical structure, whereby the curved wall has a radius of about 5 inches to about 9 inches (e.g., about 7 inches). Also, wall junctions and corners often are rounded, and the rounded junctions and corners sometimes are defined by a radius of about 0.25 inches or greater. When such water bottles are placed in receptacles oriented near or substantially in contact with one or more walls of a cage base, such design features minimize the likelihood an animal resident can access and damage the bottle or its receptacle.

In certain embodiments, the aperture is located in a cap in connection with the bottle (e.g., a screw cap). The bottle may contain a fluid such as water, and the barrier often may be a removable barrier such as an adhesive tab over the aperture. In some embodiments, the barrier is inside the cap. The barrier can prevent spillage of a fluid contained in the bottle during shipping, and when the barrier is removed or modified to expose the aperture to fluid contents in the bottle, the bottle can maintain pressure equilibrium of a fluid when inverted. The bottles may be constructed from a polymer described herein (e.g., polyethylene teraphthalate). In certain embodiments, a bottle may have a capacity of about 13 ounces and weigh (when empty) about 10 grams to about 25 grams (e.g., about 17 grams), and in some embodiments, a bottle may have a capacity of about 26 ounces and weigh (when empty) about 20 grams to about 50 grams (e.g., about 34 grams). The bottles sometimes are single-use bottles (e.g., the walls often are about 0.01 inches to about 0.08 inches thick), and in certain embodiments, the bottles are multi-use bottles (e.g., the walls often are thicker than 0.08 inches).

Other insert members may be in association with a cage assembly, such as a shelter structure, bedding material, and/or a sub-floor, for example. A shelter structure may be of any shape or geometry that allows an animal to enter the structure and become covered or partially covered by the structure. Any convenient structure for housing animals can be used, and in some embodiments, a shelter is a perforated pipe structure. An example of a combined feeding and shelter structure is described in U.S. Pat. No. 6,571,738 which is incorporated by reference herein in its entirety. A bedding material often is placed in a cage. Any bedding material suitable for housing animals can be used, such as wood chips or newspaper, for example. In some embodiments, a removable sub-floor sometimes is positioned in association with a cage base. Sub-floor embodiments may constructed from any material and is of a geometry that allows foodstuffs, liquid emissions and/or solid emissions from a housed animal to pass through the sub-floor to the cage base bottom member, and in some embodiments, a sub-floor member or a portion thereof is reticulated or perforated (e.g., http address www.ssponline.com/bed.html). A scavenging substance described previously may be placed under the sub-floor in certain embodiments.

In some embodiments, an insert member includes two or more connected planar members, where each planar member has a surface parallel to a surface of another planar member and the bottom surface of one planar member is elevated with respect to the top surface of another planar member. In the latter embodiments, each planar member is connected by a riser member, where a surface of the riser member sometimes is perpendicular to surfaces of the connected planar members and sometimes connects the planar members at a non-perpendicular angle (e.g., about 10 degrees to about 95 degrees). The planar members and one or more riser members often are contiguous, often with seamless junctions. An insert member often is manufactured by a process that renders a unit having no seams or disconnections between the planar and riser members.

Insert member embodiments sometimes include an aperture or a combination of an aperture and a recessed flange adapted to receive a component useful for meeting requirements of a housed animal, such as a feeding structure, watering structure and/or shelter structure, for example. An insert member sometimes comprises one or a plurality of sidewall members (e.g., two, three or four sidewall members) extending downwards into the interior of a cage base member also adapted to support a component useful for meeting requirements of a housed animal. The outer surface of a sidewall member often is perpendicular to the bottom surface of an insert planar member from which it extends and often are contiguous with the bottom surface of an insert member. In some embodiments, a bottom edge of a sidewall member is not parallel to the bottom surface of an insert planar member, and sometimes a side edge of a sidewall member is not perpendicular to the bottom surface of an insert planar member.

Insert member embodiments may include one or more apertures allowing air to enter and/or exit the cage. In some embodiments, the one or more apertures, sometimes referred to as "vents," diffuse air entering a cage at the top surface of the insert. In certain embodiments, one or more vents are in the front portion of the insert so that air flows from the front of the cage to the back of the cage, sometimes by laminar flow (e.g., downward near the front to upward near the rear). For some embodiments, one or more vents may be disposed or configured such that airflow, such as laminar air flow, flows from the back of the cage to the front of the cage. The apertures may be of any geometry allowing for air flow, such as circular, rectangular, square, rhombus and/or reticulated, for example. A filter may be disposed in communication with one or more of the apertures with a protective grate disposed beneath the filter. An insert member often is not connected to a filter. An insert member may include one or more openings, apertures or recesses for receiving other structures, and sometimes is integrated with one or more other structures. Such structures sometimes may be utilized for feeding, watering and/or sheltering animals housed in the cage. Two or more of such structures sometimes are integral, such as an integrated feeding/shelter structure. Where an insert member includes an opening, aperture or recess for receiving another structure, the other structure often is in removable association with the insert, and in some embodiments, the other structure is sealingly mated with the insert member.

In some embodiments, provided herein are animal containment cages including a wall or walls and a bottom, where the cage is constructed from a polymer, and the thickness of each wall is about 0.01 inches to about 0.08 inches. Examples of suitable polymers are described above. In certain embodiments, the thickness of the bottom is about 0.01 inches to about 0.08 inches. The wall or walls and bottom often are of a substantially uniform thickness. The thickness of the wall or walls or bottom sometimes is about 0.01 inches to about 0.05 inches, at times is about 0.02 inches to about 0.06 inches, and can be about 0.02 inches to about 0.03 inches. In some embodiments, the cage is semi-rigid and can flex. Single-use cage embodiments discussed herein may be flexible or semi-rigid.

In some embodiments, the rear wall of a cage base may include one or more apertures adapted to receive or connect to an air supply component, air exhaust component, and/or central water supply component. In some embodiments a base unit may include a break-away member that can expose an aperture for receiving a component such as a sensing probe, water delivery structure or air delivery structure, for example. A break-away member, sometimes referred to as a "punch out" member, sometimes breaks away entirely and sometimes remains attached to the cage by a portion after being broken. In certain embodiments, a cage base may comprise a filter member and one or more optional exhaust ports.

Cage embodiments discussed herein may be single-use embodiments, and sometimes may be used in combination with a rack, an airflow unit, an airflow controller or a combination thereof. Cage embodiments described herein may include or contain one or more animals. The animal sometimes is transgenic, immunodeficient, inbred, contains one or more xenografts and/or lacks one or more functional genes (knock-out animal). The animal often may be a rodent, such as a rodent selected from the group consisting of mice, rats, hamsters, gerbils, guinea pigs, chinchillas and rabbits, for example. A contained mouse sometimes may be a nude mouse or a severe combined immune deficiency (SCID) mouse.

Rack units may be referred to herein as "cage mounting platforms" or "cage mounting systems." The racks sometimes are modular and can be assembled from reversibly connected rack modules. A rack module may have any configuration that allows for reversible stacking in a vertical or horizontal configuration. A rack module sometimes includes a bottom member, two sidewall members a top member, and sometimes a back member and front member (e.g., a skin), where the sidewall members often are parallel or substantially parallel and the top and bottom members often are parallel or substantially parallel. In some embodiments, rack modules are connected by two connection members, one on each side of the module, where the connection member is a post that inserts into an aperture in a rack module. In some embodiments a rack module comprises four horizontal posts vertically extended from each corner of a rectangular bottom member, and connected to a rectangular top member. Rack module embodiments may be constructed from any material of sufficient resilience to allow for repeated assembly and disassembly of rack units. Examples of materials used to construct a rack unit module include metal alloys (e.g., sheet metal) or polymers and the like and combinations of the foregoing. A rack module often comprises airflow components, often located internally, such as plenums, cage supply tubes, and exhaust ports, which are described hereafter.

A connection member for linking one rack module to another sometimes is integrated with one of the rack unit modules and sometimes is separate from the module and/or other modules in the rack unit. In some embodiments, a connection member is engaged with a corresponding connection member in a first rack module and a second rack module, where the first and second rack modules are connected reversibly. In certain embodiments, a first rack module comprises a first connection member and a second rack module comprises a second connection member complementary to the first connection member, where the first and second connection members may be engaged with one another to form a reversible connection between the first and second rack modules. A connection member in a rack module can be configured in any manner that limits the movement of a cage module with respect to another connected cage module and allows for convenient disconnection and reconnection of the modules.

In some embodiments, connection members are engaged and/or disengaged without a tool (i.e., rack modules can be assembled and/or disassembled by hand). In certain embodiments, a connection member includes a groove or flange on one or more surfaces of a rack module adapted to receive, sometimes slideably receive, a corresponding flange or groove on or in another rack module.

In some embodiments, a rack module includes one or more mounts and/or connectors configured to receive one or more detachable shelf members, and in certain embodiments, a rack module comprises one or more shelf members. A rack module sometimes is connected to another component other than another rack module. In some embodiments, a rack module is mounted onto a tram member, sometimes via a connector, where the tram is configured for transportation of a rack module or plurality of rack modules (i.e., a rack unit).

One or more cages may be stored on or in a rack module, and any convenient configuration for storing a cage can be utilized. A cage sometimes is placed on a surface of a rack module and stored for a period of time. A cage often resides on a shelf connected to the rack. A rack module sometimes includes one or more mount members useful for storing one or more cages in or on the rack module. A corresponding mount member sometimes is located on one or more outer surfaces of a cage and is adapted to connect with a mount member located on a rack module. In certain embodiments, a mount member is a groove or flange on one or more surfaces of a rack module and is adapted to receive, sometimes slideably receive, a corresponding flange or groove on or in a cage. There may be sufficient distance between the top of a mounted cage and the lower surface of a rack module located above the cage to permit airflow out of the cage in such embodiments.

A rack module may include one or more carriages suitable for contacting a cage with another component. In some embodiments, a carriage sometimes associates a component with one cage or multiple cages. A carriage can be utilized to contact a cage with any component, such as an air supply connector, an air exhaust connector, a central water supply connector and a detector or sensor, for example. A carriage often is connected to a shelf of a rack system in such embodiments. Any suitable carriage can be utilized, such as a carriage comprising a piston or lever, for example, and can be constructed from any suitable material, such as a metal alloy and/or a polymer, for example. The carriage engages a component with a cage member (e.g., a cage base or cage cover) in any suitable manner, sometimes by a linear, arc, vertical or horizontal motion, or combination thereof. The carriage often includes a holder that retains a component that is engaged with a cage member. The carriage sometimes is operated by hand and sometimes is operated remotely by mechanical operation and/or computer-controlled operation, for example. In some embodiments, a carriage is useful in part for orienting the position of a cage in a rack unit, as the carriage often can only engage the member it holds with a cage when the cage is properly oriented on a rack unit. In some embodiments, a carriage applies mechanical pressure to the cage and thereby holds it in alignment. In certain embodiments, a carriage comprises a mechanism that holds its position away from the cage, which can be disengaged for engaging a component of the carriage with a cage component.

In some embodiments, the carriage comprises a lever connected near to an end or at one end of a rack or shelf unit via a hinge and a holder adapted to receive one or more components reversibly associated with a cage. Such a lever often includes a spring that applies downward pressure to the lever when a component to which it is connected is associated with the cage. In certain embodiments, a rack unit comprises one or more carriages connected to an air supply or air exhaust connector (e.g., one, two or more air connectors or nozzles) and reversibly contact the connector(s) with a cage. In some embodiments, the air supply connector and optional air exhaust connector is conical and the cage cover member includes a conical void adapted to sealingly and reversibly connect with each conical connector. In some embodiments, a carriage includes one or more projections (e.g., pins) that can be slideably positioned through one or more corresponding structures of the cage adapted to receive the projection(s) (e.g., one or more apertures in a flange member), which are useful for orienting a cage in a rack unit.

For some embodiments, one or more carriages may each be disposed in connection with an air supply or air exhaust connector and a nozzle in association with the connector, whereby the nozzle of the carriage automatically engages a corresponding cage nozzle when a cage is positioned onto the rack. The carriage may automatically translate along the surface of the cage when a cage is positioned onto the rack, and the position of the carriage can automatically translates along the surface of the cage until the nozzle of the carriage settles on the corresponding cage nozzle. In some embodiments, the carriage nozzle is concave and the corresponding cage nozzle is convex, and sometimes the carriage nozzle and the cage nozzle are conical.

In some embodiments, the carriage may include a pivot in connection with the rack, an arm in connection with the pivot and a cage engagement surface and a spring, and the cage engagement surface is in connection with the nozzle. The spring sometimes is a torsion spring, and the cage engagement surface often includes one or more angled surfaces. The one or more angled surfaces may be at an angle of about 25 degrees to about 45 degrees from horizontal. The angled surfaces allow the carriage to track along differing elevations of the cage as the cage is inserted into the rack, and thereby allows the carriage to automatically translate along an arc (i.e., rotates around a pivot) along the surface of the cage and automatically engage a cage nozzle receptacle. Springs connecting the carriage to the rack may also allow the carriage to automatically track along differing elevations of the cage. In certain embodiments, the angled surface may be about 35 degrees. In certain embodiments, one or more of the carriages may be in connection with one or more shelves on which one or more animal containment cages can be mounted. The shelf in some embodiments contains a flange perpendicular to the shelf floor that engages an animal containment cage.

Air supply and exhaust conduits sometimes may be located within walls of a rack module, and no exterior plumbing may be required in some embodiments. An air conduit system sometimes includes a conduit of comparatively large volume connected to the blower, sometimes arranged in a vertical orientation in a rack module, which is connected to one or more comparatively smaller volume conduits that supply/exhaust air for a group of cages in a manifold of conduits often arranged horizontally. A vertical air conduit sometimes is referred to as a "tube" herein. Air tubes and conduits may be of any suitable shape and are constructed from any material suitable for providing air to or exhausting air from animals. In some embodiments, the manifold may be constructed from rigid tubing connected to flexible tubing that supplies or exhausts air from each cage. Such flexible tubing sometimes is connected at one end to a clamp or metering nozzle in association with a manifold conduit and at the other end to a nozzle that can be engaged with a cage. An air metering nozzle often is located between air supply conduit and an air supply nozzle that engages the cage. Each end of a flexible tube may be reversibly coupled to a nozzle or a clamp, sometimes by a twist lock or quick release coupling, and sometimes is integrated with the end of these components. A nozzle (i.e., outlet member) may be constructed from any material and is of any shape convenient for delivering air to an animal. In some embodiments, the outlet member is a hollow cylinder structure, having tapered or un-tapered walls, or an acicular or needle structure.

A nozzle may be engaged with a cage in any convenient manner that provides/exhausts air to contained animals. In some embodiments, the nozzle may be a connector that mates with a corresponding structure in the cage assembly, often forming an air-tight, or substantially air tight, reversible seal. The nozzle is of any geometry suitable for delivering/exhausting air to/from an animal cage assembly, and sometimes is conical. In conical connector embodiments, the smaller horizontal surface area sometimes is located below the larger horizontal surface area when the nozzle is oriented for air passing vertically through it, and the conical connector often includes a void, sometimes a cylindrical or conical void, defined by apertures in the top and bottom surface of the connector. In some embodiments, one or two nozzles passes through a cage cover member, sometimes through a portion of the cover thickness or trough the entire cover thickness.

Nozzle embodiments may extend through exterior and interior surfaces of a cover member, sometimes piercing through a cover member having no aperture or other structure for receiving the nozzle, and sometimes extends through an aperture formed by a break-away portion of the cover member. Where a nozzle pierces through a cover member, it can pierce through a flexible region in the cover member, and material in the cover may form an air-tight or semi air-tight seal with the outer surface of the nozzle. Nozzles and other members of an airflow system often are not connected to a sidewall member of a cage (e.g., not connected to a sidewall member of a cage base). Air often enters a cage through a cover member, often via a nozzle from an airflow system, and often exhausts through an exhaust nozzle to an airflow system and/or exhaust aperture(s) juxtaposed with a filter in the cover member. Air often does not exhaust through a cage base.

Conduit system embodiments in a rack sometimes include no adjustable valves. A metering nozzle, often having a fixed aperture, may regulate airflow and air pressure in certain rack embodiments. A conduit system may include one or more valves in certain embodiments. Any valve useful for constricting airflow may be utilized. One or more valves sometimes are located at a junction between a main supply/exhaust conduit, manifold and/or flexible tube, sometimes are located at the end of a flexible tube connected that is connected to a cage, and sometimes are located within the length of a main supply/exhaust or manifold (e.g., at a region not at a terminus of the conduit). In certain embodiments, the interior cross-sectional surface area of a conduit (e.g., the cross-sectional circular surface area of a tube) is smaller, and in some embodiments, is substantially smaller, than the interior cross-sectional surface area of a larger conduit to which it is connected. Such a configuration may be useful for providing substantially equal airflow and air pressure to each cage without control valves in the system to regulate airflow and pressure to each cage. For example, the interior diameter of a connector between a manifold conduit and a flexible conduit linked to a cage (e.g., a clamp system described herein) sometimes is about 0.05 inches and the interior diameter of the manifold conduit sometimes is about 0.25 inches or larger. The limiting aperture often is in a metering nozzle and sometimes is in a clamp assembly that couples cage-connected conduit to a manifold conduit.

In some rack unit embodiments a rack unit module includes a front panel, back panel and two side panels and contains within the panels an air supply manifold and tubing connecting the cage bases to the air supply manifold. Such rack units sometimes include an air exhaust manifold and tubing connecting the cage bases to the air exhaust manifold. The remaining space within the panels sometimes is referred to herein as a "plenum." Air can be scavenged directly from cages through tubing connecting each cage to an exhaust manifold, when present, within the panels. Air also may be scavenged from cages by applying negative air pressure within the plenum (e.g., by connecting a tube from an HVAC system to the plenum) and air leaving a cage via its filter is exhausted into the plenum through adjacent ports in the panel in contact with each cage. The latter method may be utilized in addition to or instead of exhausting air through exhaust manifolds. Where the rack unit includes an air supply and air exhaust manifold, and each manifold may be engaged with each cage via connection tubing and air separate supply and exhaust nozzles, positive air pressure and negative air pressure can be controlled to provide only positive air pressure, only negative air pressure, or a combination thereof. Some cage embodiments may include an air filter medium or non-porous medium juxtaposed with apertures in the cover or another member (e.g., aperture array) in such embodiments.

In some embodiments, a rack unit module may be connected to another rack unit module by a flexible tube connected to an air supply conduit and/or air exhaust conduit and one or more separate inserts that slideably engage a corresponding receptacle(s) in the other rack module. In the latter embodiments, a rack module may include one or more guides for connecting the modules to one another. In such embodiments, air supply and/or air exhaust plumbing may be coupled or decoupled at the same time rack units are engaged to/disengaged from one another.

In some embodiments, provided are animal containment cage racks including a tube, an air supply or exhaust connection at one end of the tube (e.g., air blower connection) and conduits connected to the tube that deliver air from the blower to metering nozzles, where air pressure (e.g., measured at the metering nozzles) is about 0.3 inches of water or greater. Such racks sometimes are modular, and in some embodiments are not modular. Air pressure (e.g., measured at the metering nozzles) sometimes is about 0.4 inches of water or greater, about 0.5 inches of water or greater, about 0.6 inches of water or greater, about 0.7 inches of water or greater, about 0.8 inches of water or greater, about 0.9 inches of water or greater or about 1.0 inches of water or greater. In some embodiments, the air pressure may be about 1 inches of water to about 3 inches of water, and can be about 2 inches of water. The pressure of air supplied at each metering nozzle often may not be regulated by an adjustable valve and often may be regulated by the metering nozzle. The orifice diameter of the metering nozzle often may be about 0.25 inches or less, and sometimes is about 0.06 inches to about 0.08 inches. In certain embodiments, a rack includes an airflow or air pressure sensor. The sensor sometimes may be in connection with one or more of a tube, a conduit and/or a metering nozzle. A rack in some embodiments includes one or more shelves each in proximity to a metering nozzle.

In some embodiments, provided are animal containment cage racks including shelves, a tube, an air supply blower connected at one end of the tube, conduits connected to the tube that deliver air from the blower at each of the shelves and an airflow or air pressure sensor, where a controller adjusts air delivered by the air supply blower based upon a set point and a signal from the sensor. In such embodiments, the sensor sometimes is in connection with a tube, a conduit, an air metering nozzle, a cage or combination of the foregoing. The air supply blower sometimes includes two or more fans oriented in series and a controller may be configured to adjust the speed of one or more of the fans. The rack sometimes includes an air exhaust blower, and the air exhaust blower may include two or more fans oriented in series and the controller configured to adjust the speed of one or more of the fans. The controller sometimes is linked by wire to the blower(s) and sometimes it is remote.

Any of the components discussed herein may be combined with one or more other components described herein and/or with one or more other components utilized in an animal containment facility. For example, an animal containment system sometimes includes one or more of the following: one or more cages (e.g., cage base member, lid member and insert member); one or more rack units each comprising one or more rack modules; one or more airflow assemblies (e.g., an air supply blower and/or an air exhaust blower); and one or more detection, monitoring or sensing devices. In some embodiments, air is provided to cages by a central airflow system in an animal containment facility, and sometimes air is provided by an airflow system described herein (e.g., an airflow assembly joined to the top of a rack).

Some embodiments of a cage base and a cage lid may be constructed from a polymer, which may be about 0.01 inches to about 0.08 inches in thickness.

Certain features of racks, ventilation systems and cages set forth in U.S. patent application Ser. No. 11/300,664 filed on 13 Dec. 2005, International Patent Application No. PCT/US2005/044977 filed on 13 Dec. 2005, U.S. patent application Ser. No. 11/423,949 filed on Jun. 13, 2006, and International Patent Application No. PCT/US2006/023038, each entitled "Containment Systems And Components For Animal Husbandry," each naming Dee Conger et al. as inventors, respectively, may discuss components applicable to embodiments described herein, and have been incorporated by reference herein in their entirety.

The manufacture of some rack system embodiments may be made more efficient and cost effective by the use of modular systems that include components that with repeating patterns of structure. Such repeating patterns of structure allow the rack components to be cut to any desired dimension and used to build components or subcomponents or rack systems at any suitable dimension. For example, rack systems having module structure that may be sized to any desired length or height may allow a rack system having custom dimensions to be easily manufactured.

FIG. 1 shows a modular rack assembly embodiment 10 with three rack modules 12 stacked on top of each other. A tram assembly 14 including four wheels is secured to the bottom of the rack assembly and allows for a mobile rack system embodiment 10. The tram assembly 14 may be secured to a frame 16 of the rack system or any other suitable module or part of the rack system assembly. Each rack module 12 is configured to accommodate multiple shelf assemblies 18 and corresponding containment cage assemblies 20 and may be made from components that have repeating structure that allow the modules 12 to be easily sized to custom dimensions. Some embodiments of rack system assembly 10 may be configured to hold about 2 shelf and corresponding cage assemblies to about 100 shelf and corresponding cage assemblies. Ventilation may be provided by a supply blower 24, air may be exhausted from cage assemblies via an exhaust blower 26, which can be coupled to an optional mixing box disposed within the blower assembly. The supply and exhaust blowers may each be in communication by hard wiring, fiber optic, wireless transmission or the like with a controller 30 shown at the top of the rack assembly 10.

Figure 2:
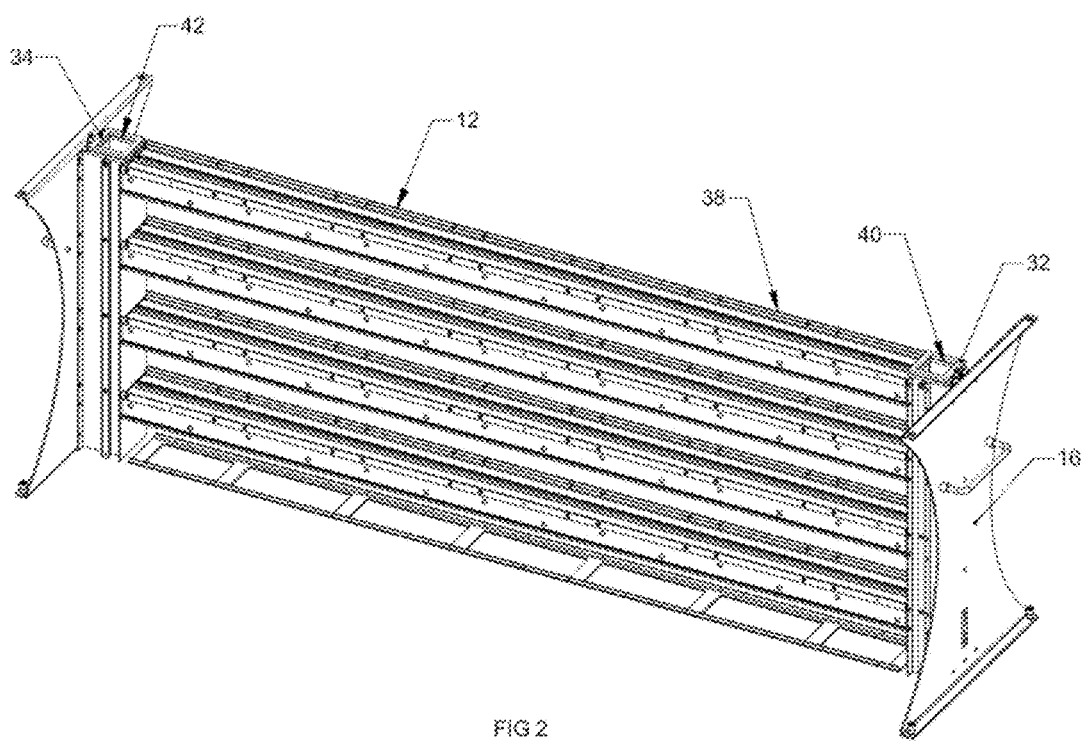
FIG. 2 is a perspective view of the frame and manifold assembly of a rack module of the rack system of FIG. 1.
Figure 4:
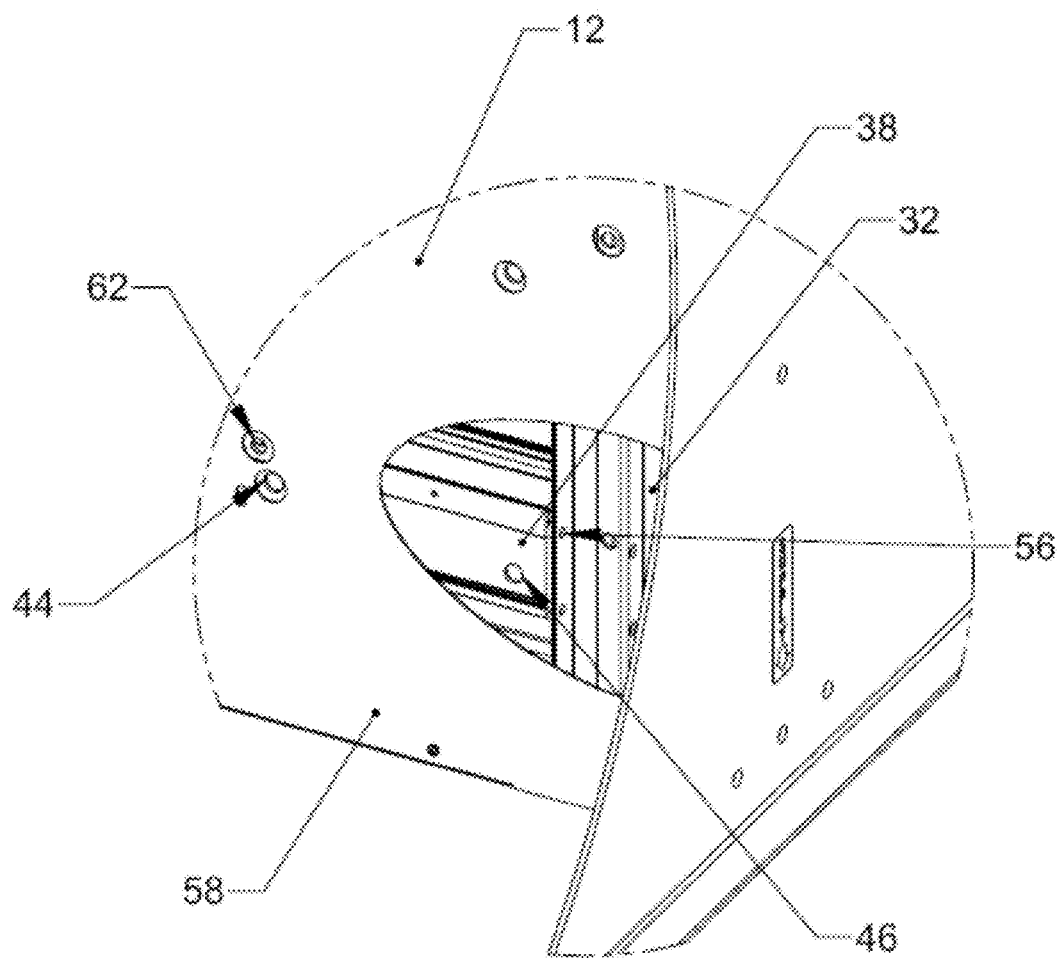
FIG. 4 is an enlarged cut away view of a portion of the rack module of FIG. 3 indicated by the encircled portion 4 in FIG. 3.
Figure 5:
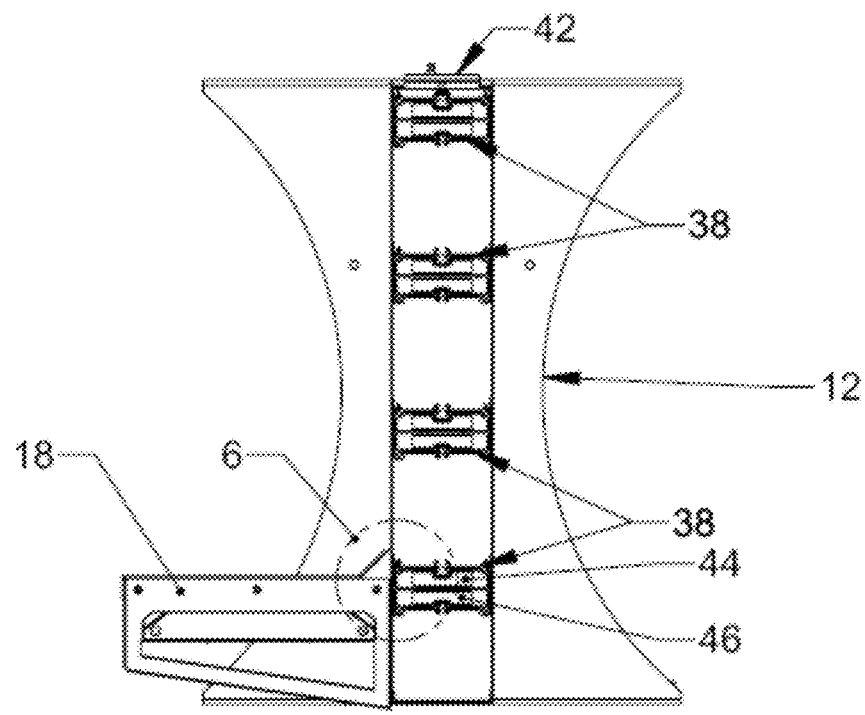
FIG. 5 is a sectional view of the rack module of FIG. 3.
Figure 6:
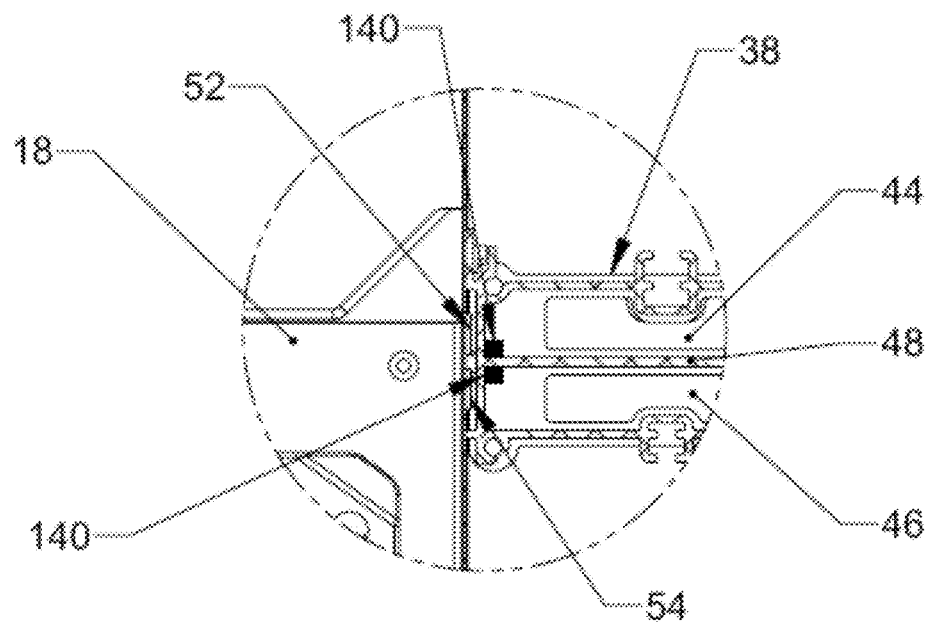
FIG. 6 is an enlarged view of the encircled portion 6 of the rack module shown in FIG. 5.

FIG. 2 shows a portion of a rack system module 12 with a frame 16 that includes a vertical supply manifold 32, a vertical exhaust manifold 34 and four transverse dual passageway plenums 38 that extend between and are secured to the manifolds 32 and 34. The vertical supply manifold 32 has an inner passageway 40 coupled to the supply blower assembly 24 and the vertical exhaust manifold has an inner passageway 42 coupled to the exhaust blower assembly 26. The vertical manifolds 32 and 34 may be configured to couple to and communicate with corresponding manifolds of adjacent rack modules 12 to form a continuous supply and exhaust passageway for each manifold of a rack system. The plenums 38 have a supply passageway 44 and a separate exhaust passageway 46 extending a length of the plenum but separated and sealed from each other along the entire length of each plenum by a bulkhead 48. The plenums are disposed between and in communication with the vertical manifolds 32 and 34 with the supply passageway of each plenum in communication with the inner passageway 40 of the vertical supply manifold 32 and the exhaust passageway of each plenum 38 in communication with the inner passageway 42 of the vertical exhaust manifold 34 as shown in FIGS. 5 and 6. The distinct and consistent vertical positions of the exhaust passageway and supply passageway of the plenums 38 also allow the shelf assemblies 18 to have respective supply conduits and exhaust conduits coupled to and in communication therewith via first and second couplers 52 and 54 shown in FIG. 6. Both the plenums 38 and the manifolds 32 and 34 may have a substantially uniform configuration along a length thereof with a repeating hole pattern 56 in communication with the supply and exhaust passageways and are capable of being cut to any unit length and assembled to accommodate a desired number of shelf assemblies as shown in FIG. 4.

In some embodiments, conduits of shelf assembly embodiments 18 may be coupled to metering nozzles (not shown), where air pressure (e.g., measured at the metering nozzles) is about 0.3 inches of water or greater. Air pressure (e.g., measured at the metering nozzles) sometimes is about 0.4 inches of water or greater, about 0.5 inches of water or greater, about 0.6 inches of water or greater, about 0.7 inches of water or greater, about 0.8 inches of water or greater, about 0.9 inches of water or greater or about 1.0 inches of water or greater. In some embodiments, the air pressure may be about 1 inches of water to about 3 inches of water, and can be about 2 inches of water. The pressure of air supplied at each metering nozzle often may not be regulated by an adjustable valve and often may be regulated by the metering nozzle. The orifice diameter of the metering nozzle often may be about 0.25 inches or less, and sometimes is about 0.06 inches to about 0.08 inches. In certain embodiments, a rack includes an airflow or air pressure sensor. The sensor sometimes may be in connection with one or more of a tube, a conduit and/or a metering nozzle.

Figure 3:
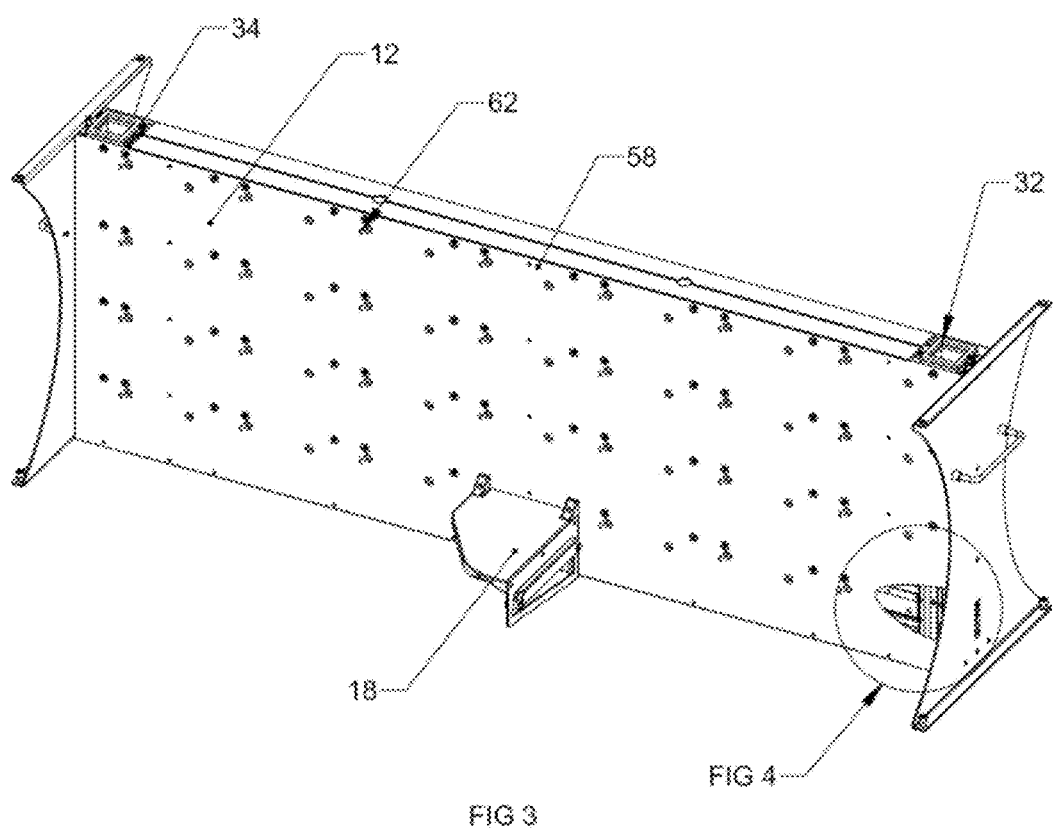
FIG. 3 is a perspective view of the module of FIG. 2 with a shelf assembly secured to a wall portion of the module of the rack.
Figure 8:
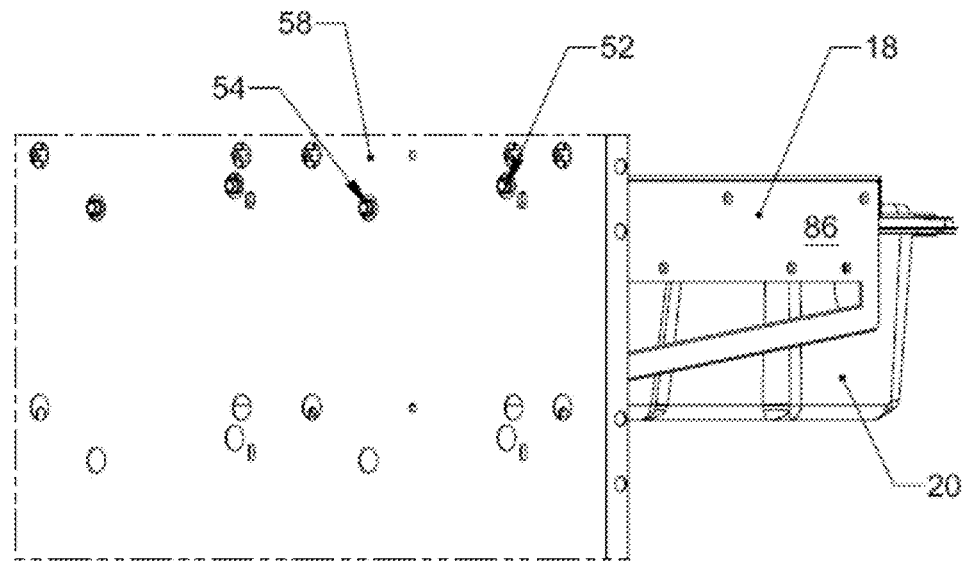
FIG. 8 is a rear perspective view of the coupling between a shelf assembly and the skin of the rack assembly.

Referring back to FIG. 3, a shelf assembly embodiment 18 is shown secured to a wall portion 58 of a completed rack module 12 of a rack assembly 10. The shelf assembly 18 includes mounting holes that may be secured to mounting holes 62 the wall portion 58 and adjacent plenum structure 38 by fasteners such as screws, bolts, rivets, welding adhesives or the like. FIG. 4 illustrates an enlarged view of the repeating hole pattern 56 in the wall portion 58 or skin of the rack module 12 as well as the underlying plenum assembly 38 which supplies ventilation to each shelf assembly 18 and corresponding containment cage assembly 20 of the rack assembly 10. FIG. 8 shows a rear perspective view of the connection between a shelf assembly 18 and wall portion 58, broken away, of the rack assembly module 12 and without the rest of the module structure shown for purposes of illustration. The rear outlet portions or couplers 52 and 54 of the supply conduit and exhaust conduit of the shelf assembly 18 can be seen extending through the wall portion 58 of the rack module 12 enabling the outlet portions 52 and 54 to then establish communication between the conduits and respective supply passageway 44 and exhaust passageways 46 of the plenum assembly 38 which are shown in FIG. 4. A containment cage assembly 20 is also shown in FIG. 8 that has a first conical receptacle 66 (shown in FIG. 15) in communication with a first nozzle 70 (shown in FIG. 11) of the shelf assembly and a second conical receptacle 68 (shown in FIG. 15) in communication with a respective second nozzle 72 (shown in FIG. 11) of the shelf assembly 18. Either of the respective first and second pairs of nozzles 70 and 72 and receptacles 66 and 68 may serve as either supply or exhaust passageways. The respective receptacles and nozzles may be spring biased or otherwise pushed together to form a releasable sealed relation due to the spring loaded rails 76 upon which a flange portion of the containment cage 20 rests on either side of the containment cage assembly.

Figure 7:
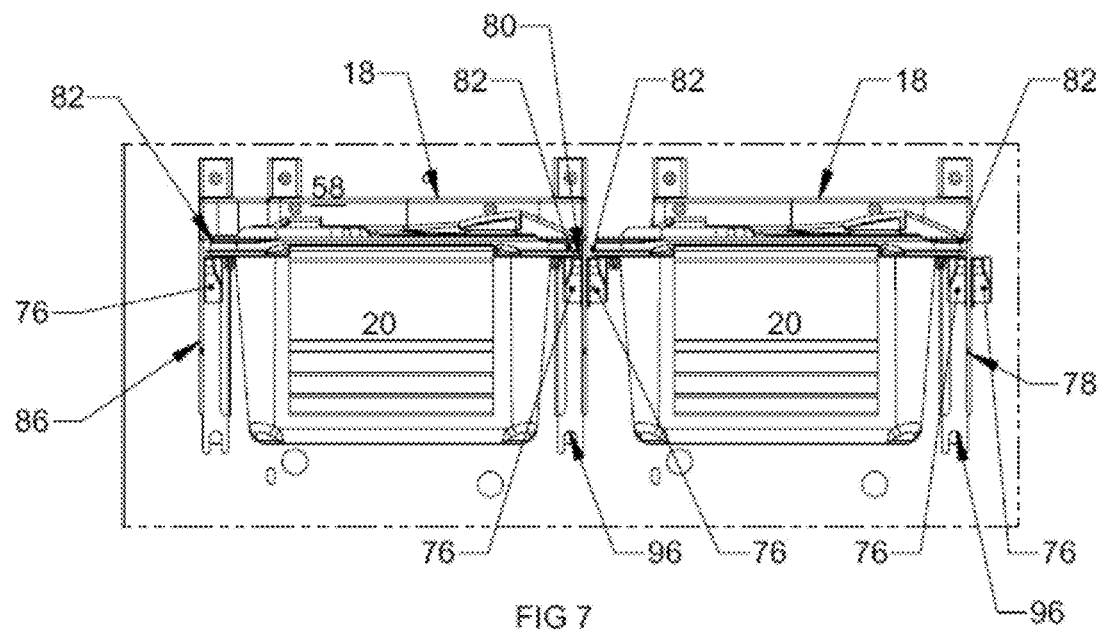
FIG. 7 illustrates two adjacent shelf assemblies of the rack system of FIG. 1 having respective cage assemblies disposed therein.
Figure 9:
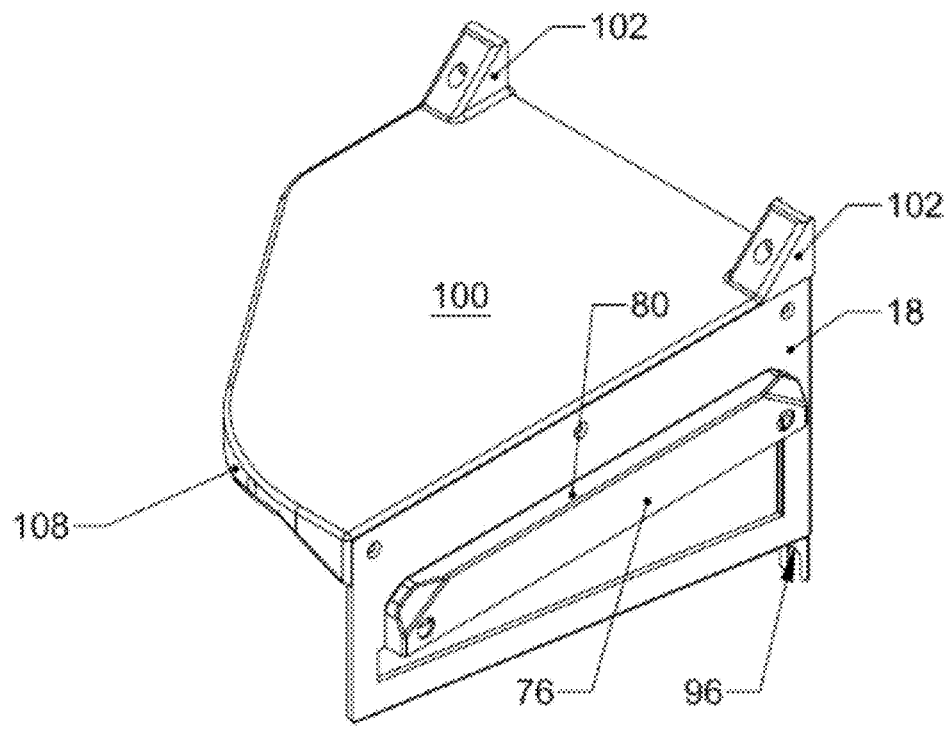
FIG. 9 is a perspective view of a shelf assembly.

FIG. 7 shows a front view of a pair of adjacent containment cages 20 disposed in adjacent shelf assemblies 18. A first shelf assembly 18 is secured to the frame 16 and is configured to receive and support a cage assembly 20. The first shelf assembly 18 has two substantially parallel longitudinal spring loaded rails 76 on opposite sides of a frame member 78 of the shelf assembly 18 with each spring loaded rail 76 having an upper edge 80 (see FIG. 9) configured to receive a bottom surface of a flange portion 82 of a disposable containment cage assembly 20 engaged therewith. As can be seen in FIG. 7, each individual shelf assembly 18 provides one spring bias rail 76 for a given cage assembly with the opposed spring loaded rail 76 on the opposite side of the frame member 78 of the shelf for the cage assembly provided by an adjacent shelf assembly 18. The rail 76 on the adjacent shelf assembly may also be substantially parallel to the first rail. As shown in the left hand side of FIG. 7, the end column of shelf assemblies 18 require a special frame piece 86 on the left hand side to provide a spring loaded rail 76 where there is no adjacent shelf assembly 18.

Each spring loaded rail 76 is vertically translatable with an upward spring bias for applying an upward bias on the flange portion 82 of the cage assembly 20 such that receptacles 66 and 68 of the containment cage assembly 20 are biased upward against the fixed nozzles 70 and 72 of the shelf assembly 18. The upward bias on the containment cage 20 establishes a seal between the respective nozzles 70 and 72 of the upper portion of the shelf assembly 18 and conical receptacles 66 and 68 of the containment cage 20. The seal provides for a controllable flow of air through the receptacles of the cage assembly and the first conduit 92 and second conduit 94 of the shelf assembly 18 which are in communication with an inner passageway of the manifold and plenum system. The coupling between the nozzles of the shelf assembly 18 and the conical receptacles of the cage assembly 20 may also create a releasable mechanical coupling between the cage assembly 20 and shelf assembly 18 such that when the cage assembly is fully inserted into the shelf assembly, it will resist removal until the spring bias force by the conical receptacles into the respective nozzles of the shelf assembly is overcome.

For some embodiments, stationary rails (see FIGS. 24-39, figure item 276) which are the same as or similar to the spring bias rails 76 may be used to support cage assemblies 20. Although such rail embodiments do not include bias springs, it may be possible to achieve a result similar to that of the spring bias rails by use of the inherent elasticity of lid embodiments of cage assemblies 20. More specifically, the inherent flexibility of a thin wall polymer lid of a cage assembly 20 may be capable of resilient vertical deflection sufficient to releasably couple the nozzles 70 and 72 to the conical receptacles 66 and 68 of the cage assembly. For such an embodiment, the flange portion 82 of a cage assembly 20 may be supported by a pair of substantially parallel stationary rails that are disposed at a fixed distance from the nozzles 70 and 72 of the shelf assembly 18. The fixed distance may be selected such that the conical receptacles are forced resiliently downward as the cage assembly 20 is pushed into the shelf assembly 18 and then resiliently recover in an upward direction when the conical receptacles become horizontally aligned with the respective nozzles 70 and 72. The lid material type, thickness and configuration may be selected in such embodiments to provide a desired amount of resilient force in order to achieve a proper seal between the conical receptacles 66 and 68 and the nozzles 70 and 72. For some embodiments, the spacing between the upper edge or surface 80 of the rails may be selected such that once the receptacles 66 and 68 engage the nozzles 70 and 72, the upward resilient force of the deflected lid may be substantially relaxed with a little to no residual force on the coupled configuration.

The nozzles 70 and 72 may serve to provide a source of pressurized gas or a source of negative pressure for ventilation of the cage assembly 20. The source of negative pressure or positively pressurized gas may include a ventilation system. This may allow air to flow downward into an interior volume of the base of a cage assembly coupled to a shelf assembly 18 and towards or into bedding material disposed in the bottom of the base when the cage assembly is in use. A user may pull the lid and cage base simultaneously from the rack 10 by engaging the lid and cage base units directly, and the lid and cage base will automatically disengage from the spring loaded cone receptacles of the nozzles of the rack.

For some embodiments, the flange portions 82 of the cage assemblies 20 may be configured to have a substantially loose fit in a transverse or horizontal direction so as to allow some movement and adjustment of the conical receptacles 66 and 68 of the cage assembly 20 with respect to the fixed nozzles 70 and 72 of the shelf assembly 18. Such transverse translation allows the nozzles 70 and 72 to couple to respective conical receptacles of the lid of the cage assembly 20 even if the cage assembly is positioned beneath the nozzles such that the nozzles are not perfectly aligned with respective conical receptacles. This situation of imperfect alignment may be particularly prevalent in situations involving larger cage assemblies 20 with larger heavier animals where the cage assembly does not easily slide on a shelf of a rack system in order to achieve such alignment.

For some embodiments, the spring bias rails 76 may be about 5 inches to about 15 inches in length and may be made from a variety of high strength injection molded materials such as glass filled nylon. The frame member 78 of the shelf assembly may be made from any suitable high strength material, including corrosion resistant metals such as aluminum, stainless steel and the like. The frame member 78 also includes a mounting slot 96 at a rear bottom portion of the frame member 78 that may be secured to a wall portion 58 of the rack assembly with any suitable fastener such as screws, bolts, rivets, welding, adhesives or the like. A top portion 100 of the shelf assembly 18 may be secured to the frame member 78 of the shelf assembly 18 by any suitable fasteners or adhesives and may also be made from a high strength injection molded material such as glass filled nylon. The top portion 100 includes shelf mounting flanges 102 and also houses the first and second nozzles 70 and 72 and first and second conduits 92 and 94 which may be used as either supply conduits or exhaust conduits. The top portion 100 may also be shorter in length than the cage 20, the same length as the cage 20, or longer than the cage 20.

Figure 10:
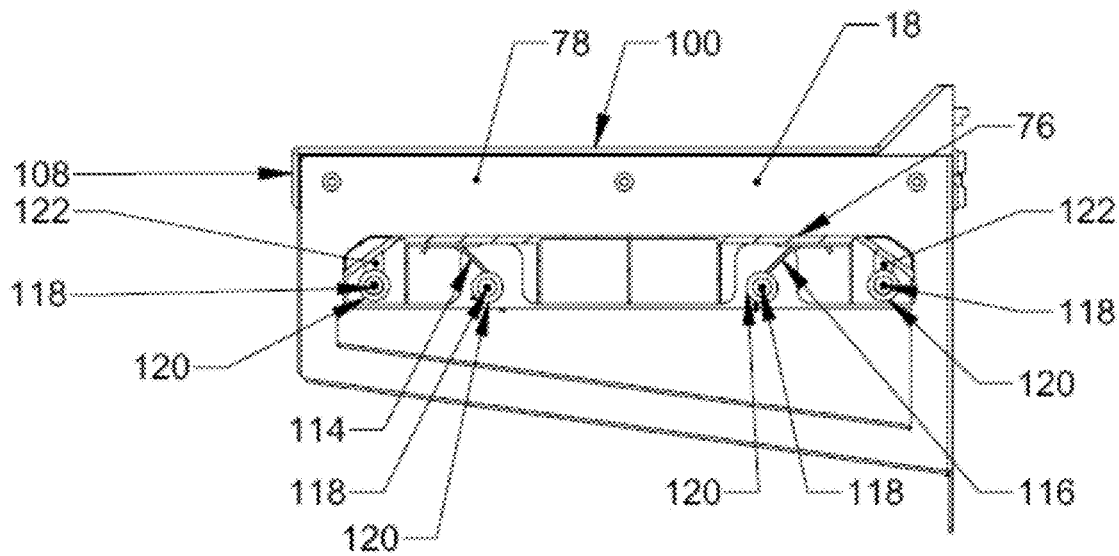
FIG. 10 is a side elevation view of the shelf assembly of FIG. 9 with the spring loaded rail of the shelf assembly shown in section.
Figure 11:
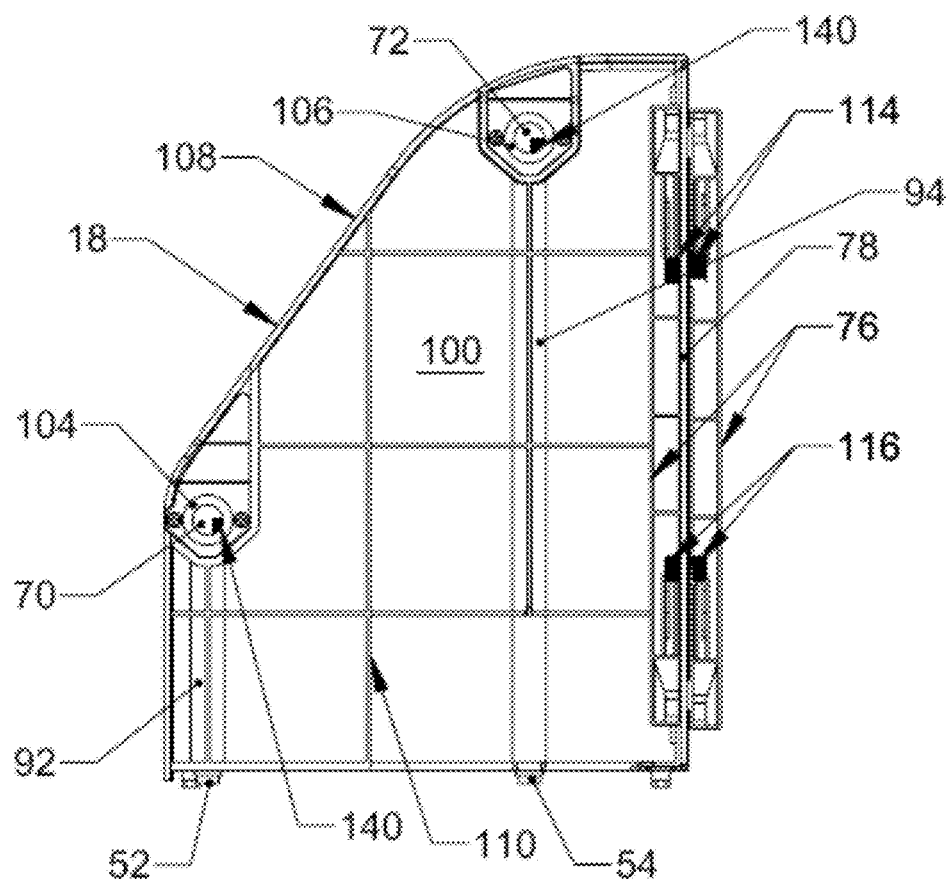
FIG. 11 is a bottom view of the shelf assembly of FIG. 9.
Figure 12:
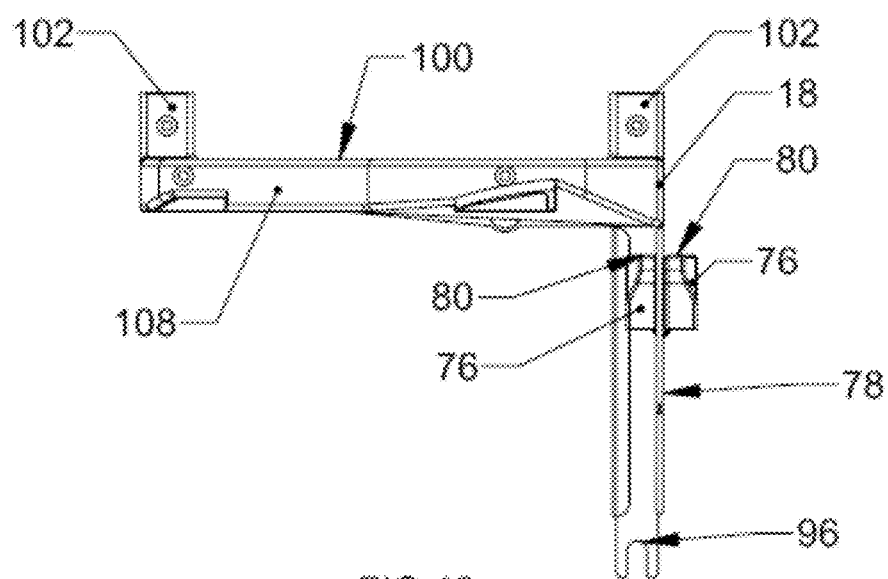
FIG. 12 is a front view of the shelf assembly of FIG. 9.
Figure 13:
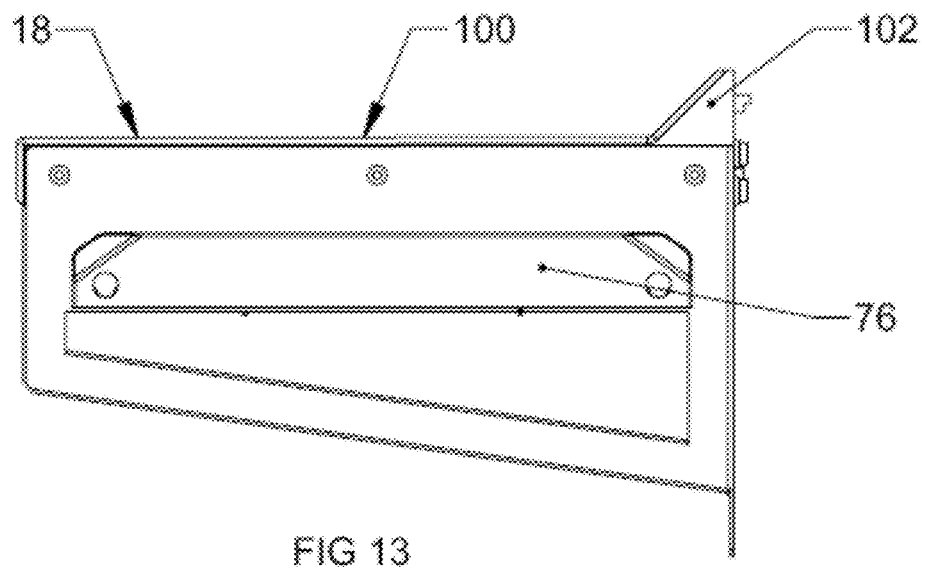
FIG. 13 is a side elevation view of the shelf assembly of FIG. 9.
Figure 14:
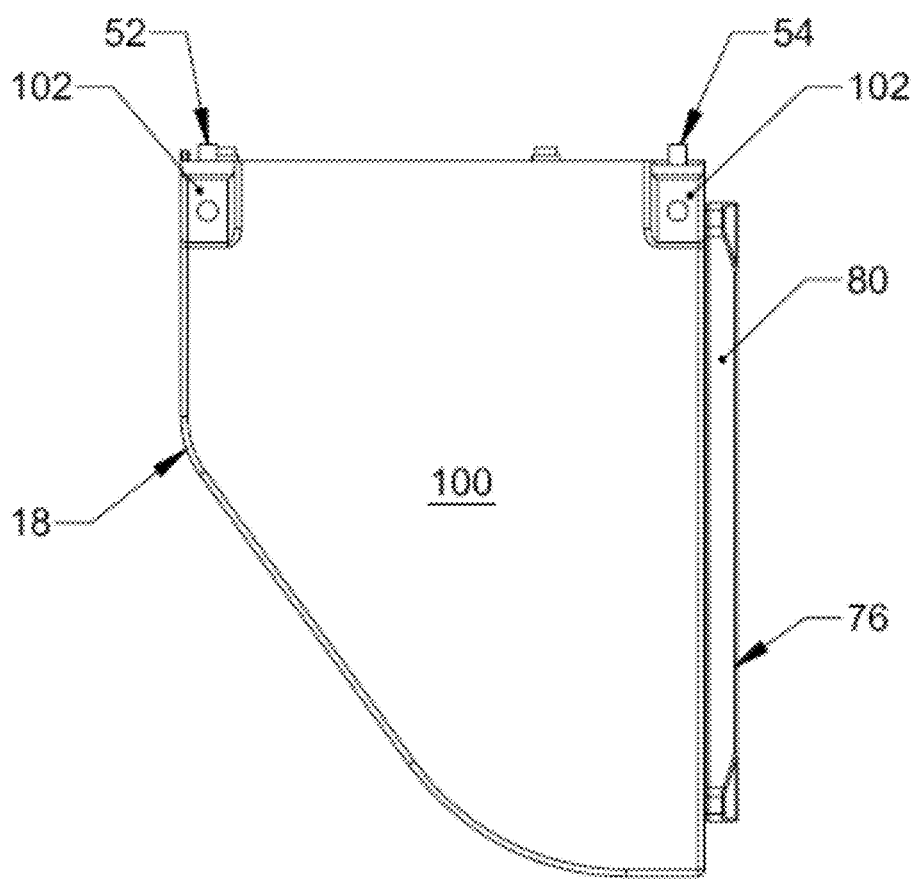
FIG. 14 is a top view of the shelf assembly of FIG. 9.

FIGS. 9-14 show an embodiment of the shelf assembly 18 in more detail. In particular, FIG. 11 shows the first conduit 92 and second conduit 94 molded into the top portion 100 of the shelf assembly 18 with the conduits 92 and 94 extending from respective first and second conduit couplers 52 and 54 in the rear of the top portion 100 to the respective first and second nozzles 70 and 72 disposed towards the bottom of the top portion 100. The first and second nozzles 70 and 72 include a respective first resilient seal 104 and second resilient seal 106 which are each disposed at the opening of the nozzle and held in place by respective retainer plates. The annular or cylindrical resilient seals 104 and 106 may be made of an elastic polymer or the like that facilitates an air tight seal between each mating nozzle 70 and 72 and conical receptacle 66 and 68 of the cage assembly 20. The top portion 100 of the shelf assembly 18 has a substantially smooth planar top surface and a corrugated bottom surface which also represents an outline of the internal structure of the top portion 100. The top portion 100 also includes a rim or lip portion 108 extending around the perimeter of the top portion 100 and a network of strengthening ribs 110 shown in FIG. 11 that form a grid on the bottom surface of the top portion 100. Mounting flanges 102 at the rear of the top portion 100 are also molded into the top portion structure. The molded structure including the perimeter rim 108 and strengthening ribs 110 allows the top portion 100 of the shelf assembly 18 to be injection molded at a low cost but maintain a high degree of uniformity and strength.

Referring to FIGS. 10 and 11, the configuration of the spring bias rail assemblies can be seen in more detail. Each spring loaded or bias rail 76 includes a first bias spring 114 disposed at a first end of the rail 76 and a second bias spring 116 disposed at a second end of the rail 76. The bias spring embodiments 114 and 116 shown include coil springs having a first end operatively coupled to the frame member 78 of the shelf assembly and a second end operatively coupled to an inner surface of the rail body 76. Although coil spring embodiments are shown, other spring embodiments may also be used including leaf type springs, ribbon type springs or any other suitable spring configuration. For some embodiments, each bias spring 114 and 116 may be configured to apply about 1 pound to about 10 pounds in a vertical direction against the spring bias rail 76. As such, for some embodiments, each spring bias rail 76 may exert an upward force on a supported cage assembly 20 of about 2 pounds to about 20 pounds and each pair or spring biased rails 76 may exert an upward force against a supported cage assembly 20 of about 4 pounds to about 40 pounds. For some embodiments, the spacing between the upper edge or surface 80 of the rails may be selected such that once the receptacles 66 and 68 engage the nozzles 70 and 72, the upward resilient force of the deflected lid may be substantially relaxed with a little to no residual force on the coupled configuration between the receptacles and nozzles.

For some embodiments, the spring bias rail members 76 may be mounted by a plurality of fasteners that include a shaft portion 118 and a flange portion 120 as shown in FIG. 10. The shaft portion 118 of each fastener extends rigidly from the shelf frame 78 member through respective slots 122 in the rail assembly as shown in FIG. 10. The flange portions 120 at the end of the shaft portion 118 may be larger than the size of the slots 122 and the shaft portion 118 smaller than an inside dimension of the slots 122 so as to allow the shaft portion and carriage body generally to move about vertically within the slot. For some embodiments, the spring bias rail assemblies may be configured to translate vertically by about 0.1 inches to about 1 inch.

Figure 15:
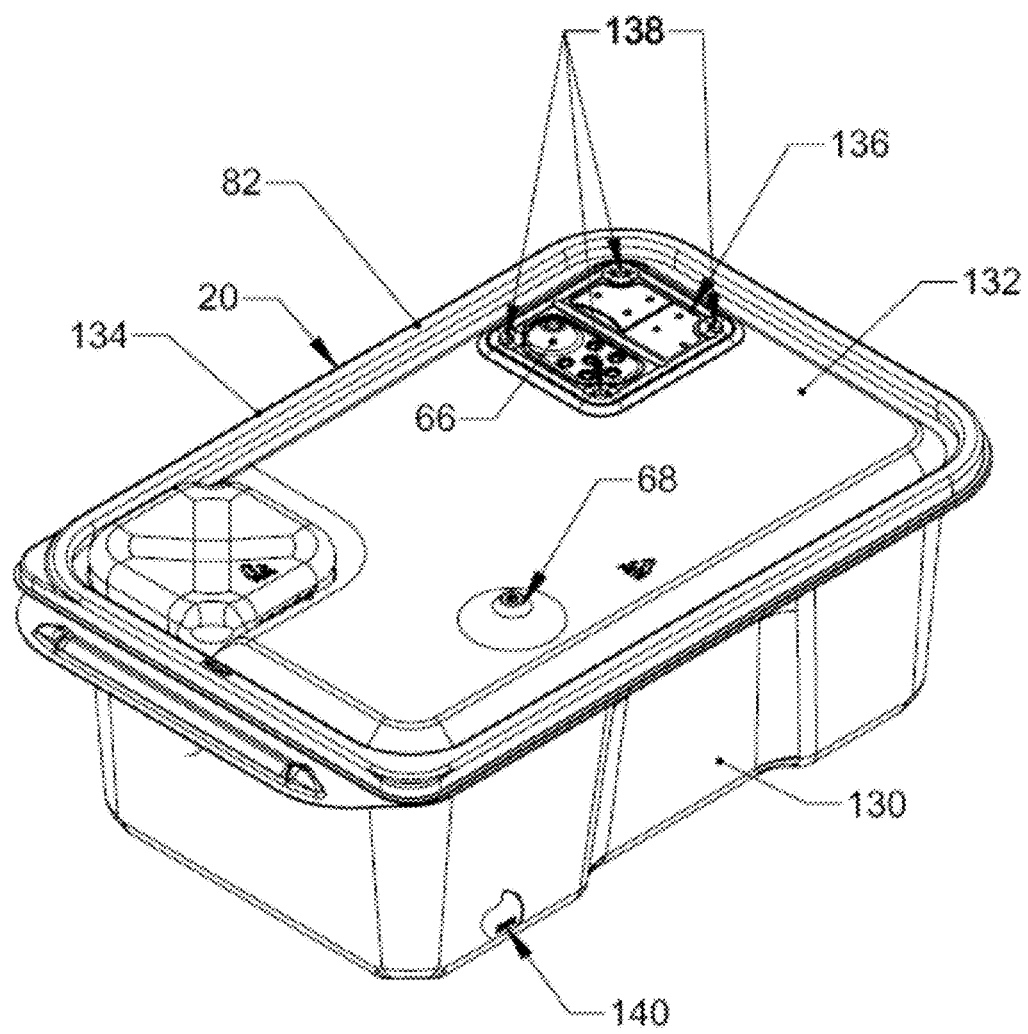
FIG. 15 is a perspective view of a cage assembly suitable for use with the rack system of FIG. 1.

FIG. 15 illustrates an embodiment of a containment cage assembly 20 that may have some of the same features, dimensions and materials as the cage assemblies discussed above. For the embodiment shown, a rim of the base 130 extends continuously around the perimeter of the base and is configured to be removably secured to a rim of a lid 132 by a snap fit. In addition, a channel 134 on the perimeter of the lid 132 which is configured to mate by snap fit to the rim of the base 130 also extends continuously around the perimeter of the lid. For some embodiments, the channel on the perimeter of the lid includes elongate channels having sides tapered to a reduced transverse dimension and configured to mechanically engage in a snap fit.

The base 130 includes a polymer material and has four sides and a bottom formed together in a continuous structure. The lid 132 also includes a polymer material with a generally planar structure or configuration. The lid 132 includes the first conical ventilation receptacle 66 and a second conical ventilation receptacle 68 disposed in an upwardly extending direction and configured to mate with respective first and second nozzles 70 and 72 of the shelf assembly 18 embodiment discussed above. The lid 132 may include a vent structure 136 and a vent shield (not shown) comprising press-in post couplers 138 configured to engage corresponding holes in the lid 132 disposed adjacent the vent structure 136 of the lid. A filter element (not shown) may be disposed between the vent structure 136 of the lid 132 and the vent shield. For some embodiments, the base 130 and lid 132 may be made of a polymer having a thickness of about 0.01 inches to about 0.08 inches and may include materials such as thermoplastics, polyesters, polypropylene (PP), high-density polyethylene, low-density polyethylene, polyethylene teraphthalate (PET), polyvinyl chloride (PVC), polyethylenefluoroethylene (PEFE), polystyrene (PS), high-density polystryrene and acryInitrile butadiene styrene copolymers.

As discussed above, for any of the cage system embodiments discussed herein or components thereof, including the base 130 and lid 132, it may be desirable to use a photodegradable or biodegradable material in order to reduce the impact of the use of disposable type cage assemblies on landfills and other waste management depots. One such material may include a biodegradable PET, such as a biodegradable PET manufactured by BioLand company. Such a biodegradable PET material may include the polyethylene terephthalate and an organic additive which creates an extension of the polymer chain that is highly attractive to microbes. Some such additives may be used that do not degrade the strength, stiffness, impact resistance, abrasion resistance, gas barrier properties or migration propensity of the material. Some biodegradable PET materials may have a specific gravity of about 1.3 grams per $cm^2$ and a tensile strength of about 7,000 psi to about 8,500 psi.

One of the issues regarding the maintenance of a rack system and the animals contained within the cages supported by the rack system is directed to the efficient and accurate gathering, processing and displaying information regarding the interior conditions of each cage to lab personnel. In many circumstances regarding the care and maintenance of systems or studies involving multiple containment cages that house laboratory animals, the cages are cleaned, changed or otherwise maintained on a regular schedule that may be dictated by good laboratory practices and may also include the input of a veterinary professional. Because of the complicated nature of an animal's interactions with its surroundings, maintenance schedules may often be calculated or determined based on a worst case scenario for a group of cages. More specifically, the maintenance schedule for all cages may be determined by the cage having the highest bio-burden as it is too time consuming to monitor each cage individually. For such an arrangement, cages not immediately requiring maintenance will receive it anyway, resulting in a non-efficient use of laboratory resources and unnecessary maintenance of some cages having a lower bio-burden or the like. In addition, even if cage monitoring data is available remotely to laboratory personnel, if laboratory personnel are tasked with monitoring a large number of cages, it may still be burdensome to process all the cage data.

As such, it may be important in some circumstances for lab personnel to have the ability to reliably and conveniently monitor the interior conditions of each individual cage supported by a rack system with cage status information being conveniently and efficiently displayed. As shown in FIG. 1, the rack system embodiment 10 includes a controller embodiment 30 which may be coupled to a blower assembly and one or more sensors 140. Any desired sensor or sensors may be disposed within the supply and exhaust passageways 44 and 46 of the plenum 38 shown in FIG. 6, within the conduits 92 and 94 of the shelf assembly 18 as shown in FIG. 11, within an interior volume of the cage assembly 20 as shown in FIG. 15 or at any other suitable position within the rack assembly 10. The sensors 140 include any of a variety of configurations or types that may be used to monitor conditions within each individual cage 20 supported by the rack system 10. The data obtained by the controller 30 from the sensors 140 or other sources may be processed by a computing system disposed within the controller or any other suitable location in the system that may include a processor and data storage device and then displayed on a graphic user interface in a convenient visual display format.

For some embodiments, the graphic user interface may contemporaneously display an icon or the like for each containment cage 20 supported by a given rack system 10. For some embodiments, the icons displayed on the graphic user interface may be positioned on the screen in a configuration corresponding to the configuration of the actual cages of the rack system. In other words, a facsimile of a front view of a side of the actual rack system may be displayed on the screen of the graphic user interface such that lab personnel may immediately and intuitively assess the status of any of the cages on the rack system. For some embodiments, the cage icons of the graphic user interface may use a color coded display to efficiently and rapidly convey cage status information to lab personnel. For example, if parameters are being monitored and processed are directed to determining the appropriate time to change a disposable cage to a new unused cage, an icon color may be used to indicate the proximity of a necessary change. If the icon color is green, no change is necessary, if the icon color is yellow, a change may be necessary soon and a red icon may be used to indicate the need for an immediate cage change.

Some of the cages status parameters that may be monitored within each cage interior by remote sensors 140 or other means may include the presence or level of viruses or bacteria, ammonia levels, carbon dioxide levels, carbon monoxide levels, humidity levels, air pressure levels, and the like. Other parameters that may be monitored may include total animal weight within each cage, animal physical activity within each cage or other animal behavior or dynamics within each cage. For some embodiments, sensors 140 to determine one or more of the above parameters may be disposed within each cage but may also be disposed within a conduit of the shelf assembly or plenum adjacent the shelf assembly. Each sensor 140 may also be operatively coupled to the controller 30 in order to communicate the sensor reading to the controller so that the sensor reading data may then be processed and displayed on the graphic user interface.

Figure 16:
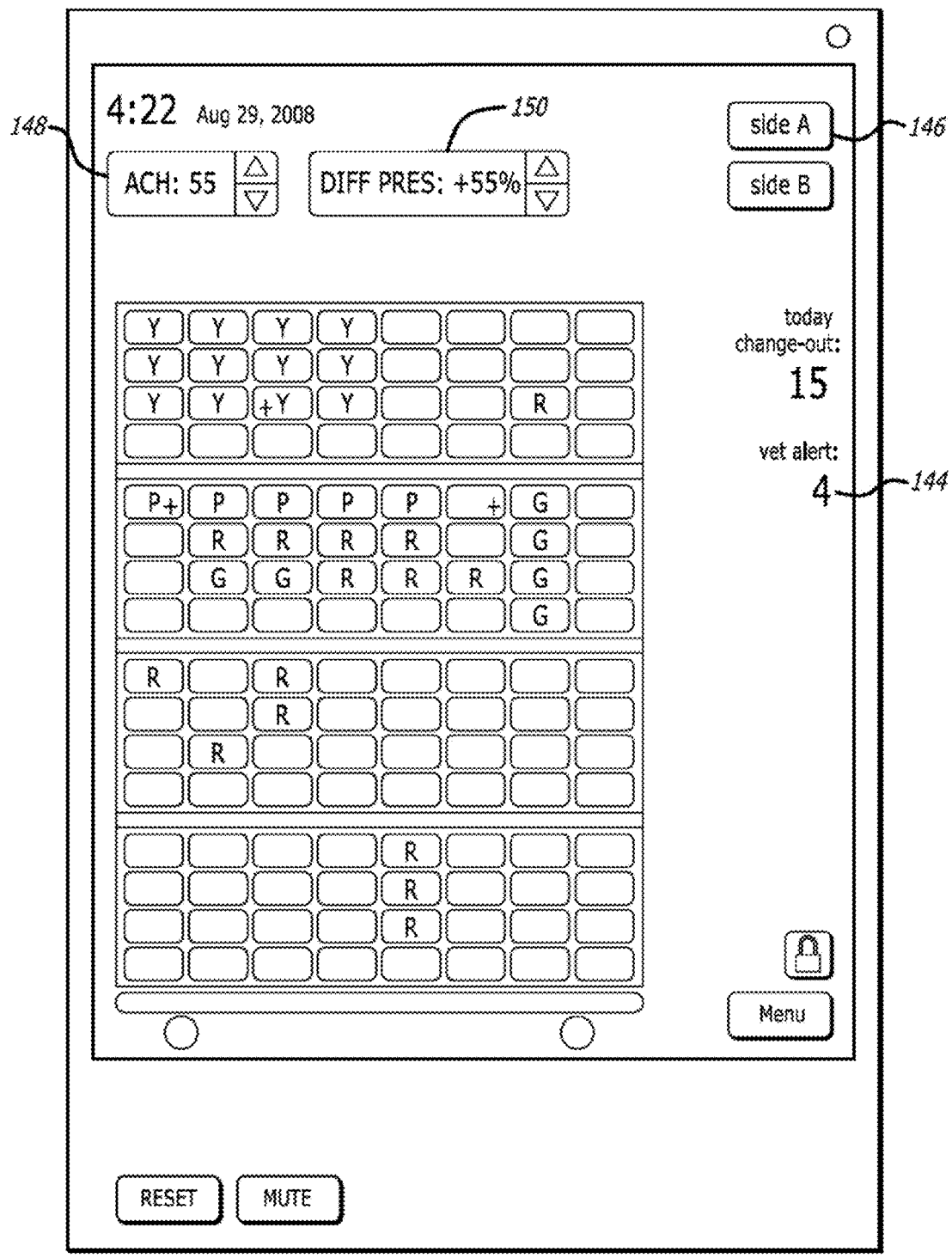
FIGS. 16-21 are diagrammatic screen shots of the controller of the rack system of FIG. 1.

FIGS. 16-21 illustrate screen shots of a graphic user interface embodiment 142 displaying a variety of information regarding containment cage status. Referring to FIG. 16, an elevation view facsimile of "side A" of a rack system 10 having four rack modules in a vertically stacked configuration is shown on the screen. Each containment cage icon on the display may be shown in a color which is indicative of the cage status regarding a particular parameter. A color coded system may be used for each cage status parameter so that lab personnel may get a quick assessment of cage status within the rack. For example, regarding the cage change status information discussed above, if the color coding of the icons shown in the display of FIG. 16 is directed to cage change status information, lab personnel may select this parameter and view the icons at once and determine whether any cage changes are immediately necessary based on the presence of any red colored icons (indicated by the letter R) on the display. A similar scheme may be used for other parameters such as ammonia levels. If the lab technician selects ammonia level status, the color coding of the icons may then be switched to indicate whether ammonia levels are low, high or intermediate based on the colors white (indicated by no letter on icon of FIG. 16), yellow (indicated by the letter Y on the icons), pink (indicated by the letter P on the icon) or grey (indicated by the letter G on the icons), respectively. Color coding may be used to indicate the need for attention by a veterinary professional for some embodiments. A numeric display 144 of the total number of cages requiring veterinary attention and the total number of cages requiring changing may also be shown. A side selector switch 146 may be toggled to switch from displaying information regarding cages on "side A" of the rack system to "side B" of the rack system.

Figure 17:
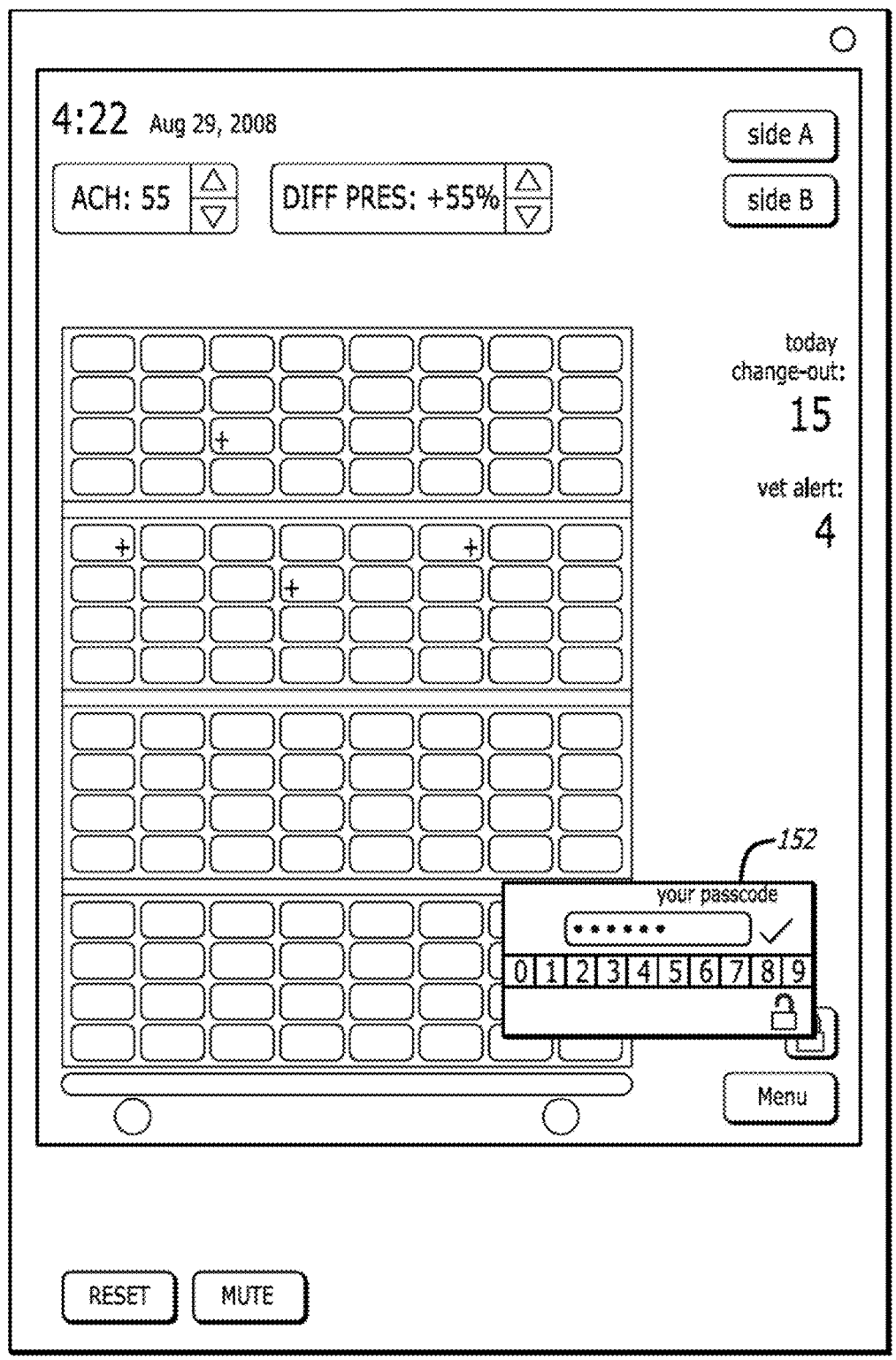
Figure 18:
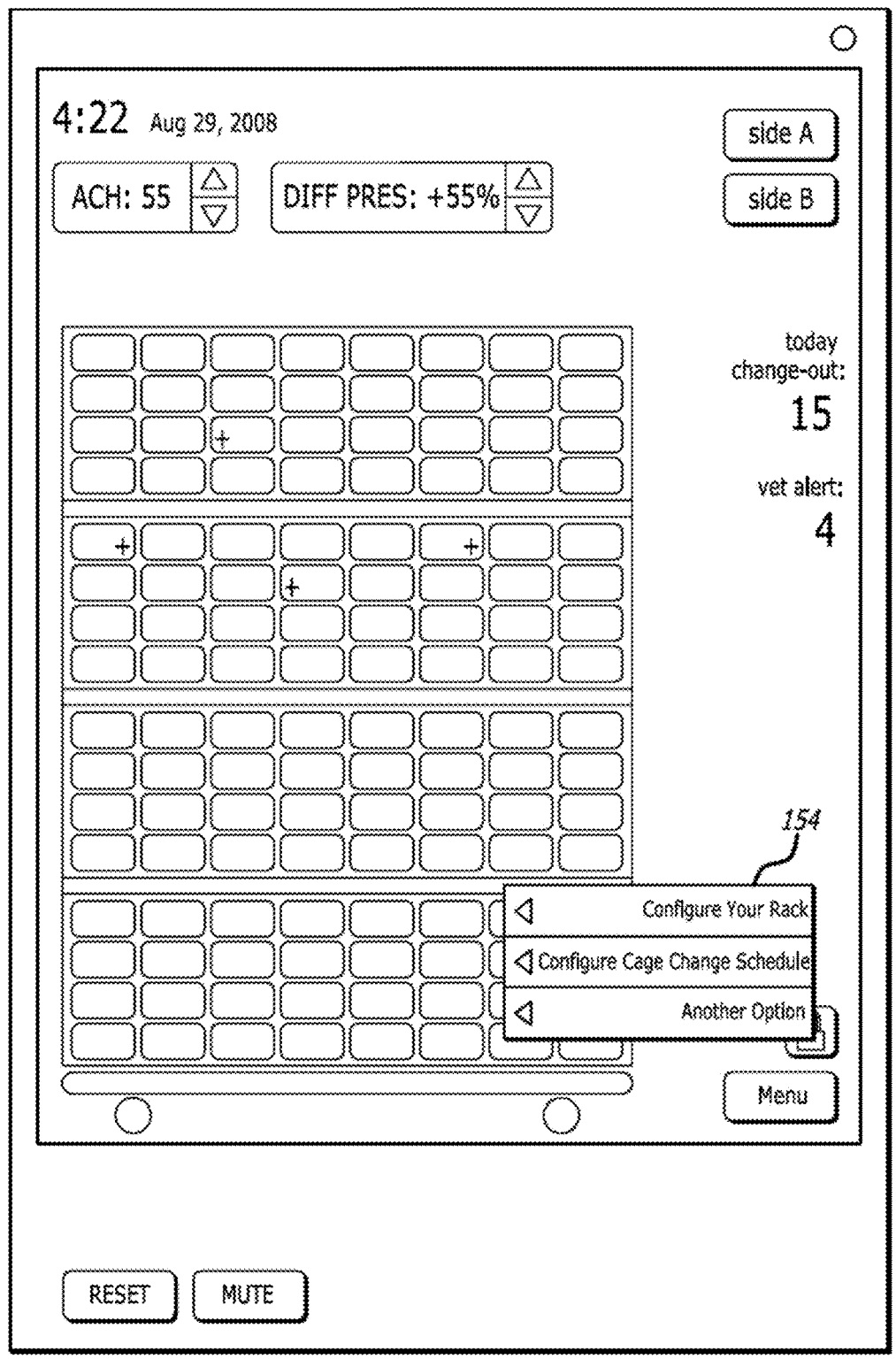
Figure 19:
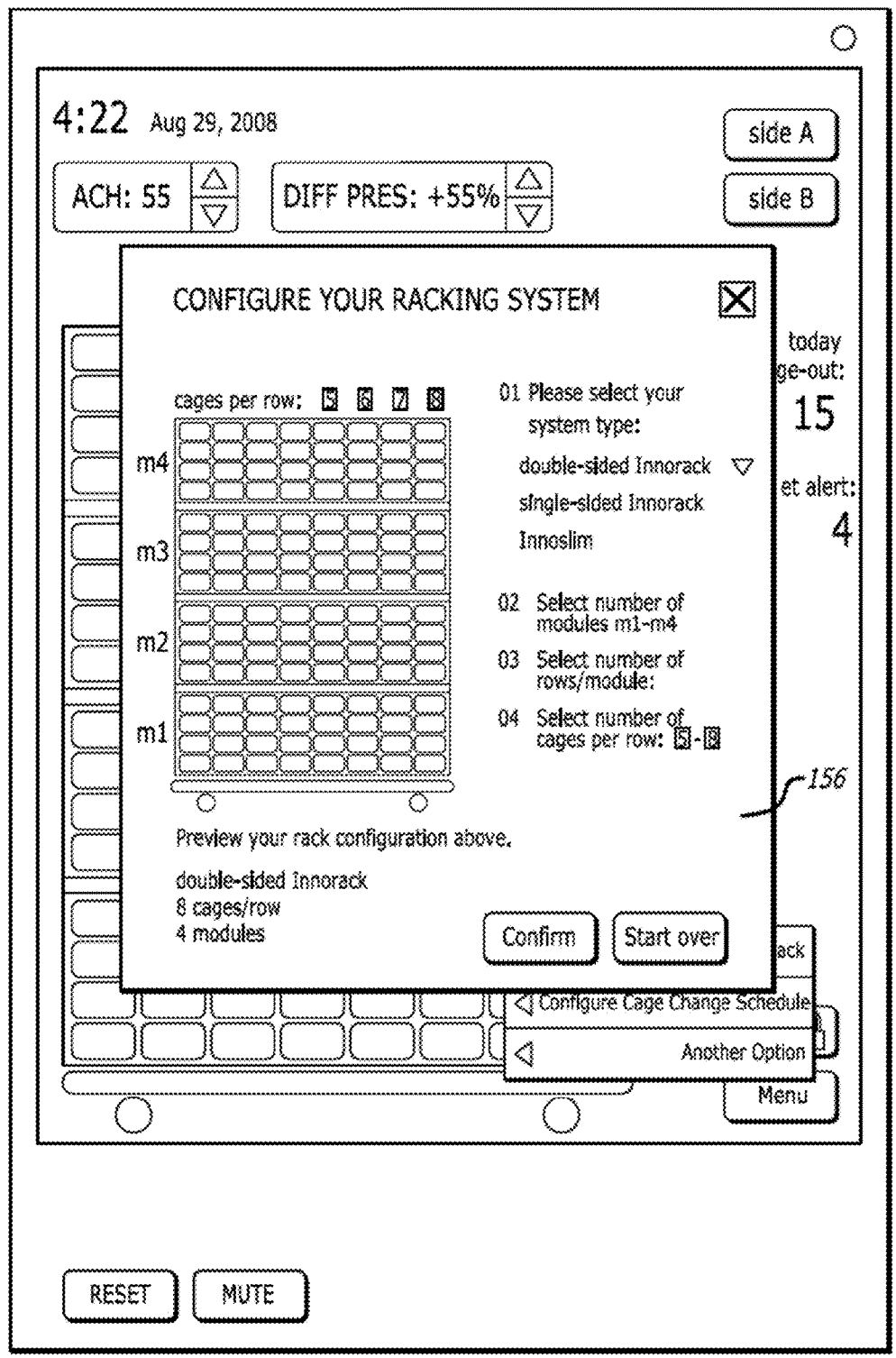

The display may also show the air changes per hour "ACH" value 148 which may be adjusted by toggling up and down arrows on the screen. The differential pressure between the supply conduits and the exhaust conduits indicated as "DIFF PRES" may also be displayed which is indicative of whether the cage assembly interiors have a net positive or negative pressure with respect to the ambient atmosphere. The "DIFF PRES" display also includes up and down arrows 150 for adjustment of the relative pressures for achieving either positive or negative internal pressure within the cage assemblies. The date, time and other information may also be shown for reference by lab personnel. For some controller embodiments, various levels of access to the controller parameters and output may be controlled by requiring a passcode. FIG. 17 shows a pop up menu 152 that is prompting a user passcode, that, when entered, will permit user access to the controller system for making adjustments and resetting parameters. FIG. 18 illustrates a pop up menu 154 with options for "Configuring Your Rack", "Configuring Cage Change Schedule" and other options. Access to such configuration settings may be restricted by the passcode access to only veterinary professionals or any other suitable level or group of personnel. FIG. 19 illustrates the pop up display 156 of the "Configure Your Rack" option from the display shown in FIG. 18. The configuration menu in FIG. 19 allows a user to select the system type, the number of rack modules, the number of rows per module and the number of cages per row. Such configuration parameters may be particularly useful for the modular rack system discussed herein which is well suited to customization with regard to sizing. The configuration pop up menu also provides a preview display of the rack system for visual confirmation to the user of the correct rack configuration.

Figure 20:
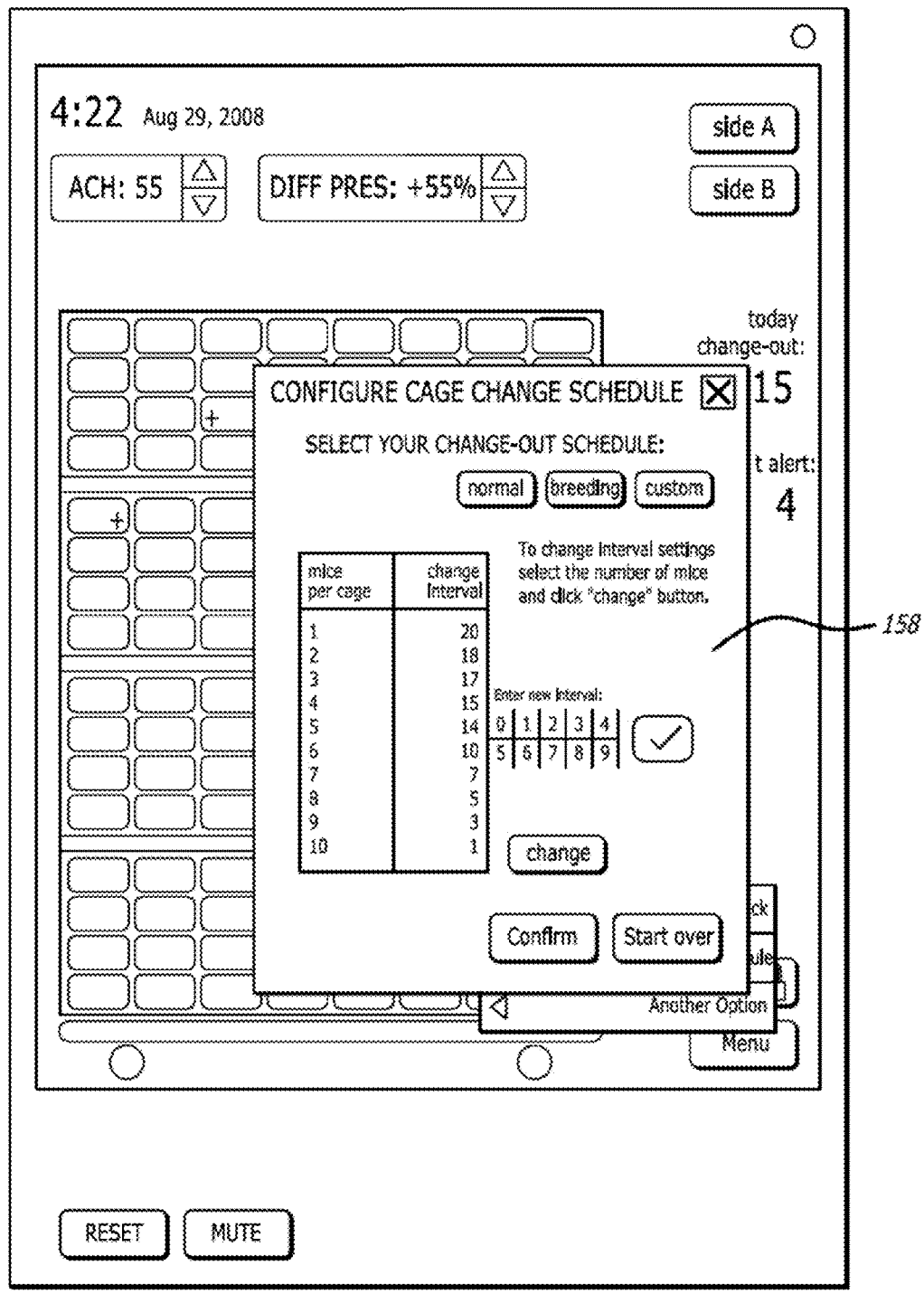
Figure 21:
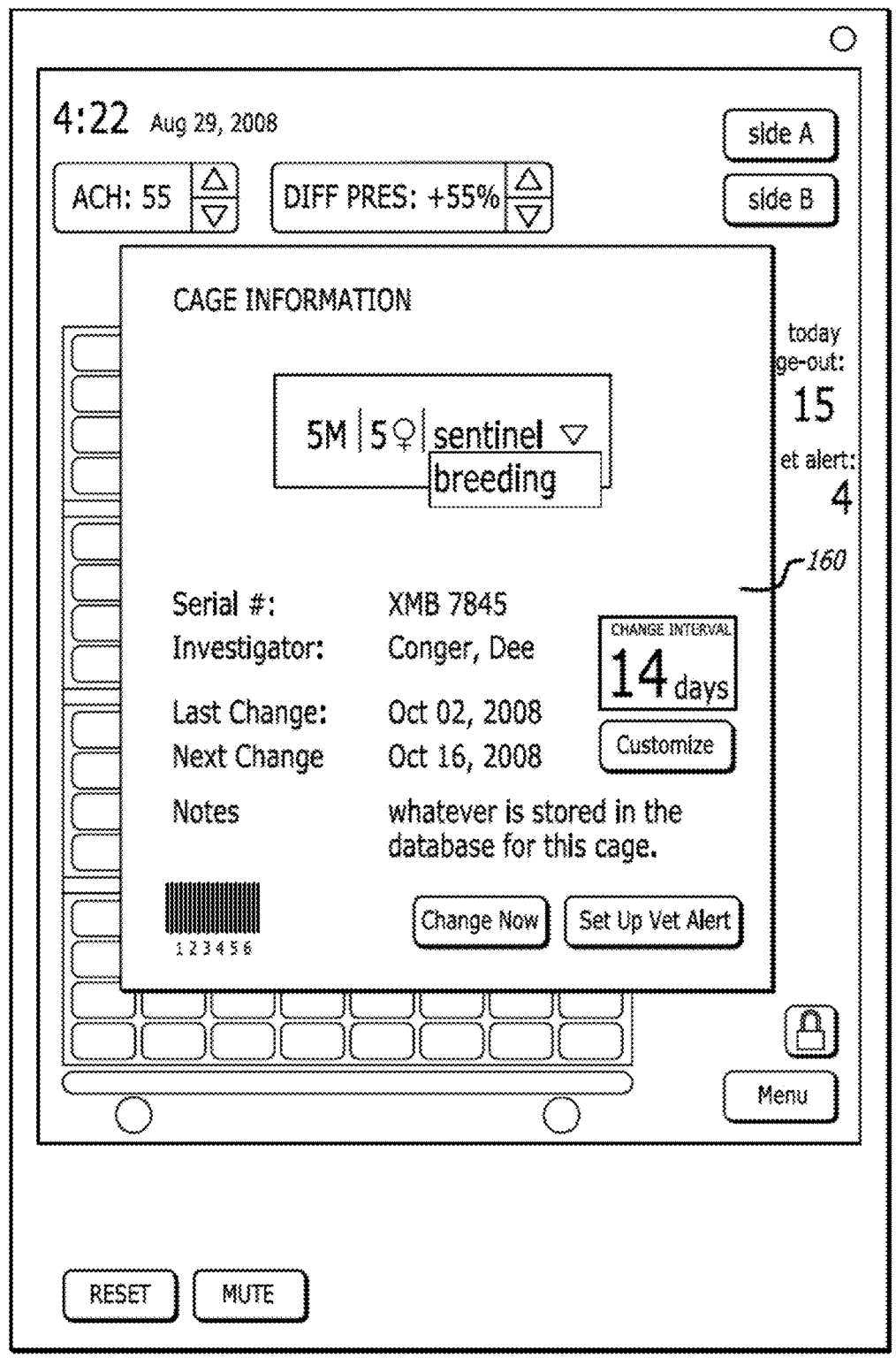

FIG. 20 illustrates a pop up menu 158 corresponding to the "Configure Cage Change Schedule" option discussed above. The change schedule menu includes a variety of change schedule options such as "normal", "breeding" and "custom". A look up chart showing number of mice per cage versus change interval is also displayed. FIG. 21 shows a pop up window 160 regarding "Cage Information" which displays various status information for a particular cage in the rack system. For the embodiment shown, the serial number, investigator and notes are shown for the selected cage. The display also shows the date of the last cage change and the due date for the next cage change.

Figure 22:
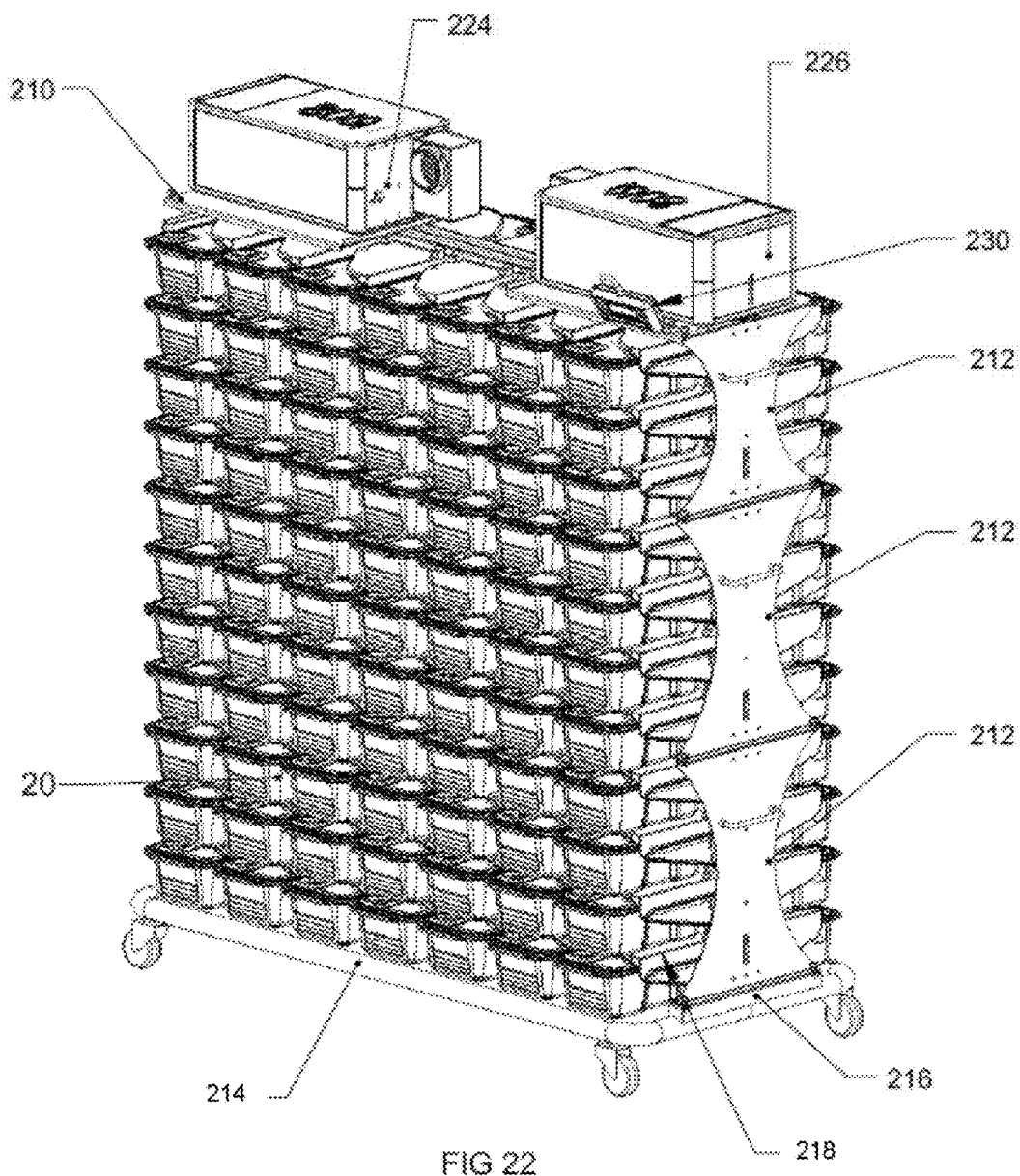
FIG. 22 is a perspective view of an embodiment of the rack system.

FIGS. 22-39 show an embodiment of a modular rack assembly with stationary rails 276 depicted in FIGS. 24-39 and a supply blower 224 and an exhaust blower 226 further depicted in FIGS. 40-45. This rack assembly embodiment including shelf assemblies and cages may optionally include some or all of the features, dimensions and materials as those of the embodiments discussed above. FIG. 22 shows a modular rack assembly embodiment 210 with three rack modules 212 stacked on top of each other. A tram assembly 214 including four wheels is secured to the bottom of the rack assembly and allows for a mobile rack system embodiment 210. The tram assembly 14 may be secured to a frame 216 of the rack system or any other suitable module or part of the rack system assembly. Each rack module 212 is configured to accommodate multiple shelf assemblies 218 and corresponding containment cage assemblies 20 and may be made from components that have repeating structure that allow the modules 212 to be easily sized to custom dimensions. Some embodiments of rack system assembly 210 may be configured to hold about 2 shelf and corresponding cage assemblies to about 100 shelf and corresponding cage assemblies. Ventilation may be provided by a supply blower 224, air may be exhausted from cage assemblies via an exhaust blower 226, which can be coupled to an optional mixing box disposed within the blower assembly. The supply and exhaust blowers may each be in communication by hard wiring, fiber optic, wireless transmission or the like with a controller 230 shown at the top of the rack assembly 210.

Figure 23:
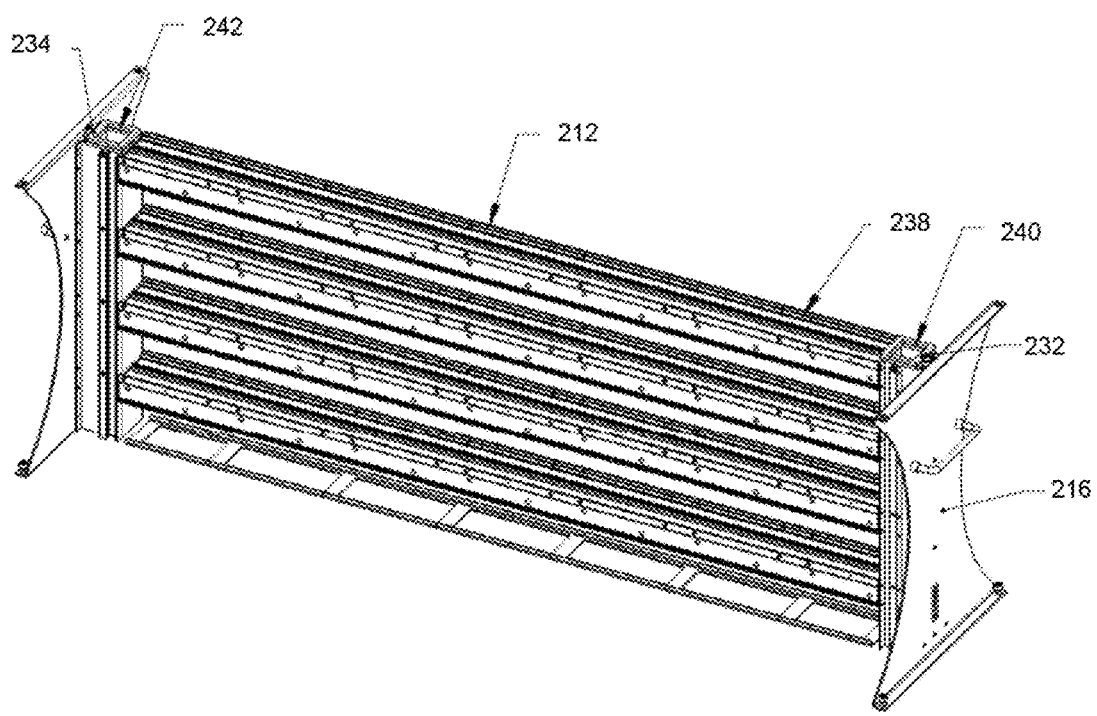
FIG. 23 is a perspective view of the frame and manifold assembly of a rack module of the rack system of FIG. 22.
Figure 24:
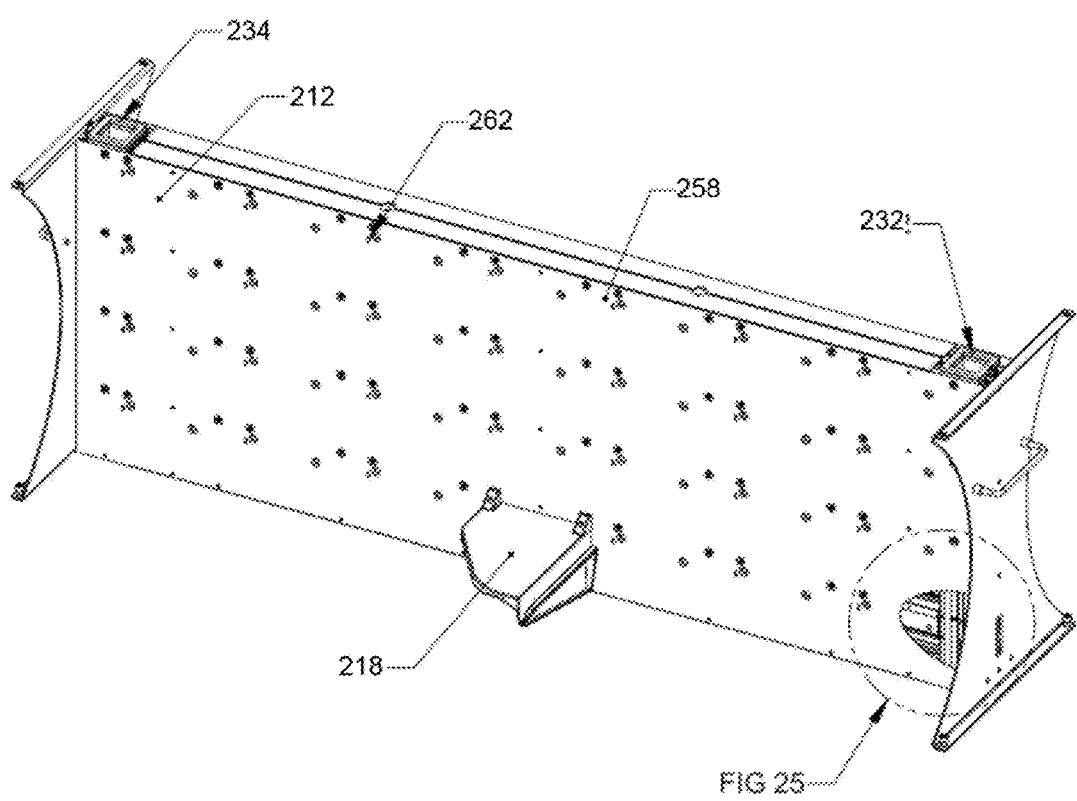
FIG. 24 is a perspective view of the module of FIG. 23 with a shelf assembly secured to a wall portion of the module of the rack.
Figure 25:
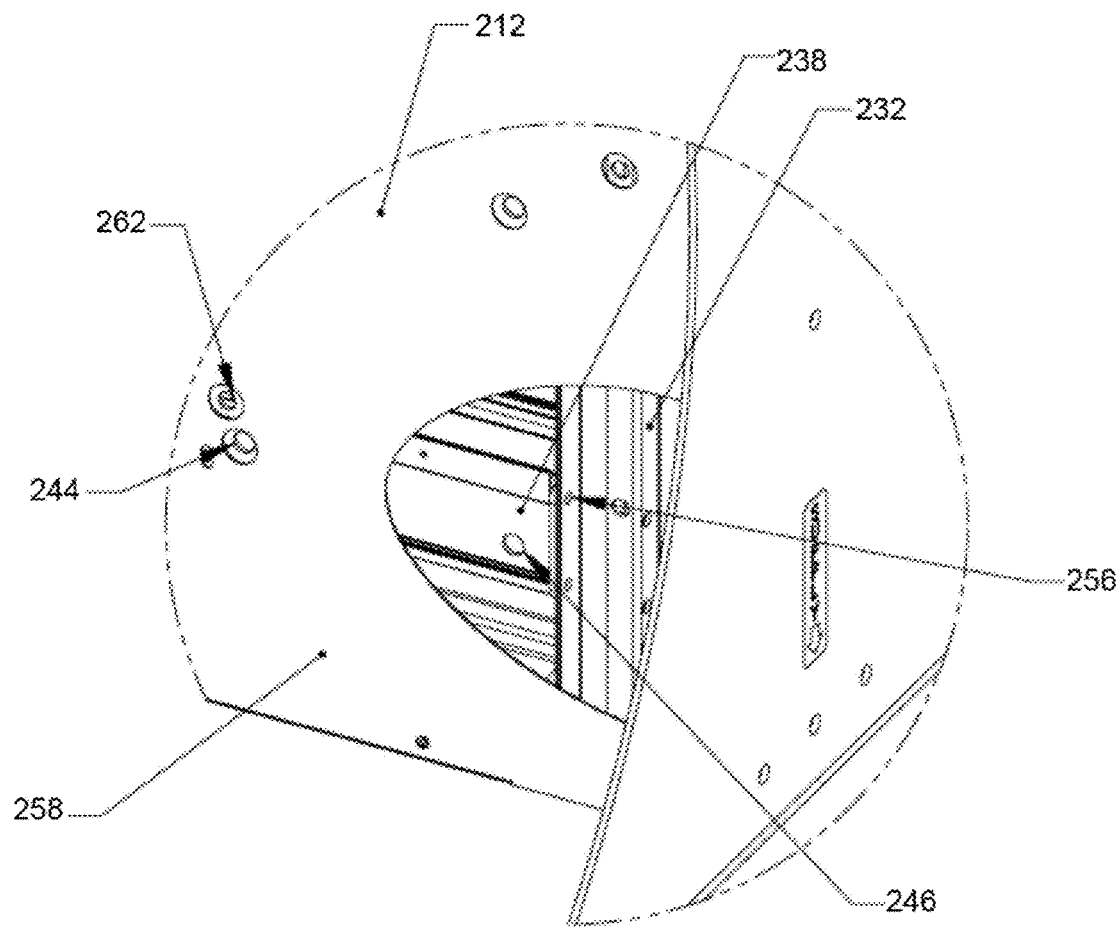
FIG. 25 is an enlarged cut away view of a portion of the rack module of FIG. 24 indicated by the encircled portion 25 in FIG. 24.
Figure 26:
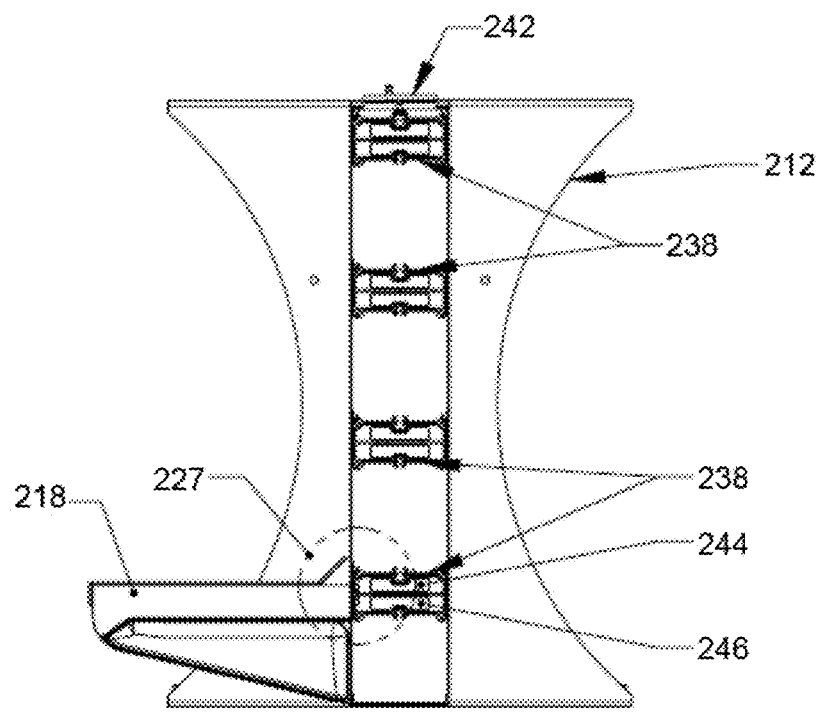
FIG. 26 is a sectional view of the rack module of FIG. 24.
Figure 27:
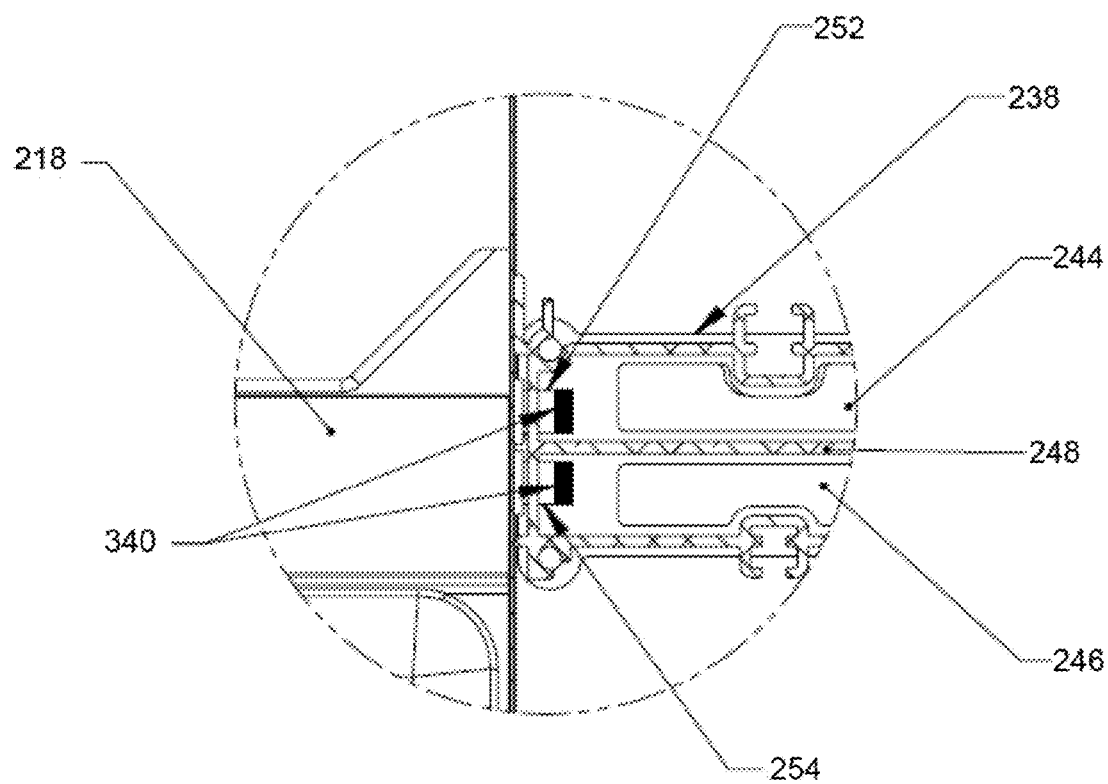
FIG. 27 is an enlarged view of the encircled portion 27 of the rack module shown in FIG. 26.

FIG. 23 shows a portion of a rack system module 212 with a frame 216 that includes a vertical supply manifold 232, a vertical exhaust manifold 234 and four transverse dual passageway plenums 238 that extend between and are secured to the manifolds 232 and 234. The vertical supply manifold 232 has an inner passageway 240 coupled to the supply blower assembly 224 and the vertical exhaust manifold has an inner passageway 242 coupled to the exhaust blower assembly 226. The vertical manifolds 232 and 234 may be configured to couple to and communicate with corresponding manifolds of adjacent rack modules 212 to form a continuous supply and exhaust passageway for each manifold of a rack system. The plenums 238 have a supply passageway 244 and a separate exhaust passageway 246 extending a length of the plenum but separated and sealed from each other along the entire length of each plenum by a bulkhead 248. The plenums are disposed between and in communication with the vertical manifolds 232 and 234 with the supply passageway of each plenum in communication with the inner passageway 240 of the vertical supply manifold 232 and the exhaust passageway of each plenum 238 in communication with the inner passageway 242 of the vertical exhaust manifold 234 as shown in FIGS. 26 and 27. The distinct and consistent vertical positions of the exhaust passageway and supply passageway of the plenums 238 also allow the shelf assemblies 218 to have respective supply conduits and exhaust conduits coupled to and in communication therewith via first and second couplers 252 and 254 shown in FIG. 27. Both the plenums 238 and the manifolds 232 and 234 may have a substantially uniform configuration along a length thereof with a repeating hole pattern 256 in communication with the supply and exhaust passageways and are capable of being cut to any unit length and assembled to accommodate a desired number of shelf assemblies as shown in FIG. 25.

In some embodiments, conduits of shelf assembly embodiments 218 may be coupled to metering nozzles (not shown), where air pressure (e.g., measured at the metering nozzles) is about 0.3 inches of water or greater. Air pressure (e.g., measured at the metering nozzles) sometimes is about 0.4 inches of water or greater, about 0.5 inches of water or greater, about 0.6 inches of water or greater, about 0.7 inches of water or greater, about 0.8 inches of water or greater, about 0.9 inches of water or greater or about 1.0 inches of water or greater. In some embodiments, the air pressure may be about 1 inches of water to about 3 inches of water, and can be about 2 inches of water. The pressure of air supplied at each metering nozzle often may not be regulated by an adjustable valve and often may be regulated by the metering nozzle. The orifice diameter of the metering nozzle often may be about 0.25 inches or less, and sometimes is about 0.06 inches to about 0.08 inches. In certain embodiments, a rack includes an airflow or air pressure sensor. The sensor sometimes may be in connection with one or more of a tube, a conduit and/or a metering nozzle.

Figure 29:
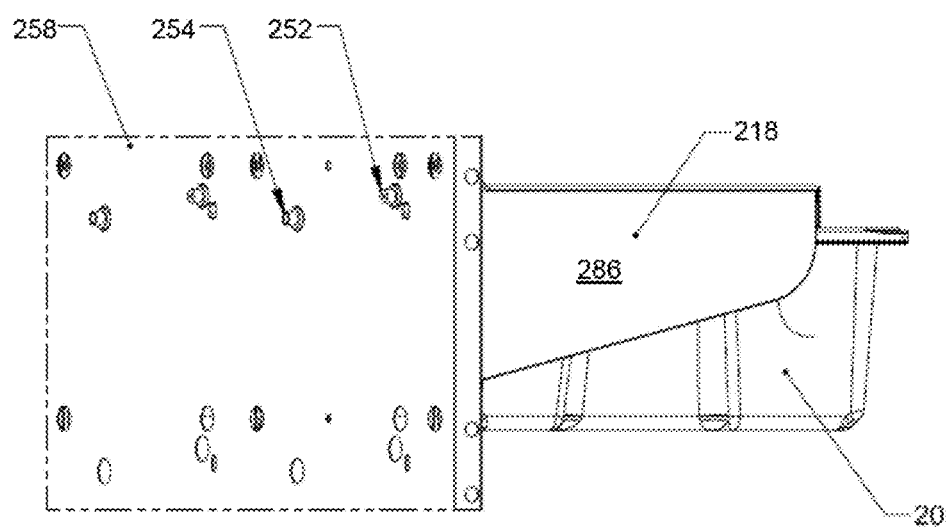
FIG. 29 is a rear perspective view of the coupling between a shelf assembly and the skin of the rack assembly of FIG. 28.
Figure 30:
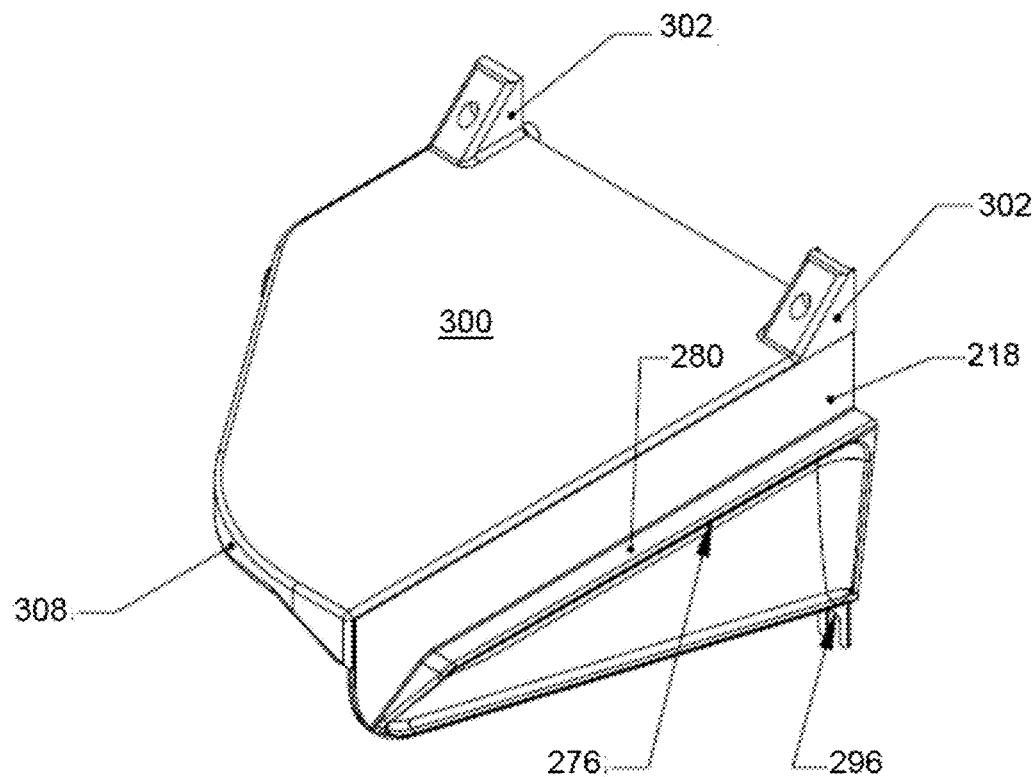
FIG. 30 is a perspective view of another embodiment of the shelf assembly.
Figure 31:
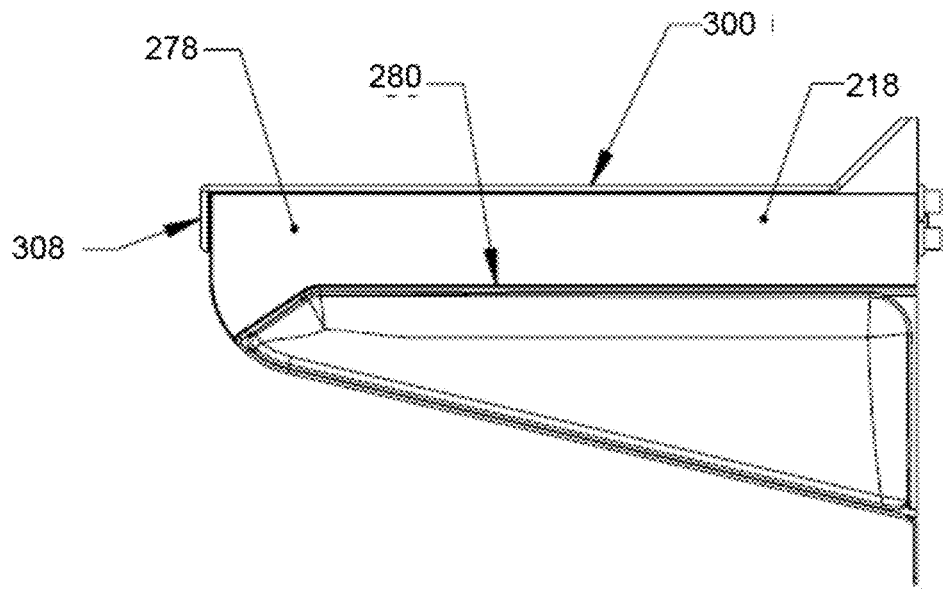
FIG. 31 is a side elevation view of the shelf assembly of FIG. 30.

Referring back to FIG. 24, a shelf assembly embodiment 218 is shown secured to a wall portion 258 of a completed rack module 212 of a rack assembly 210. The shelf assembly 218 includes mounting holes that may be secured to mounting holes 262 the wall portion 258 and adjacent plenum structure 238 by fasteners such as screws, bolts, rivets, welding adhesives or the like. FIG. 25 illustrates an enlarged view of the repeating hole pattern 256 in the wall portion 258 or skin of the rack module 212 as well as the underlying plenum assembly 238 which supplies ventilation to each shelf assembly 218 and corresponding containment cage assembly 20 of the rack assembly 210. FIG. 29 shows a rear perspective view of the connection between a shelf assembly 218 and wall portion 258, broken away, of the rack assembly module 212 and without the rest of the module structure shown for purposes of illustration. The rear outlet portions or couplers 252 and 254 of the supply conduit and exhaust conduit of the shelf assembly 218 can be seen extending through the wall portion 258 of the rack module 212 enabling the outlet portions 252 and 254 to then establish communication between the conduits and respective supply passageway 244 and exhaust passageways 246 of the plenum assembly 238 which are shown in FIG. 25. A containment cage assembly 20 is also shown in FIG. 29 that has a first conical receptacle 266 (shown in FIG. 36) in communication with a first nozzle 270 (shown in FIG. 32) of the shelf assembly and a second conical receptacle 268 (shown in FIG. 36) in communication with a respective second nozzle 272 (shown in FIG. 32) of the shelf assembly 218. Either of the respective first and second pairs of nozzles 270 and 272 and receptacles 266 and 268 may serve as either supply or exhaust passageways. For example, in an embodiment the exhaust nozzle is figure item 270 and the supply nozzle is figure item 272. In another embodiment the exhaust nozzle is figure item 272 and the supply nozzle is figure item 270. The respective conical receptacles 266, 268 and nozzles 270, 272 may be pushed together to form a releasable sealed relation due to residual deflection force. The residual deflection force is between the cage lid 132 or conical receptacles 66, 68 and the respective nozzles 270, 272. The flange portions 82 of the containment cage 20 rests on the stationary rails 276 of the shelf assembly 218. The flange portion 82 being supported by the rails 276 allows the cage lid 132 with conical receptacles 266, 268 to contact the underside of the top portion 300 of the shelf assembly, specifically contacting the respective nozzles 66, 68. Such contact between the conical receptacles 66, 68 and the respective nozzles 66, 68 is due to the residual deflection force of the lid 132 and conical receptacles 66, 68. The residual deflection force allows a seal between each conical receptacle and nozzle pair.

Figure 28:
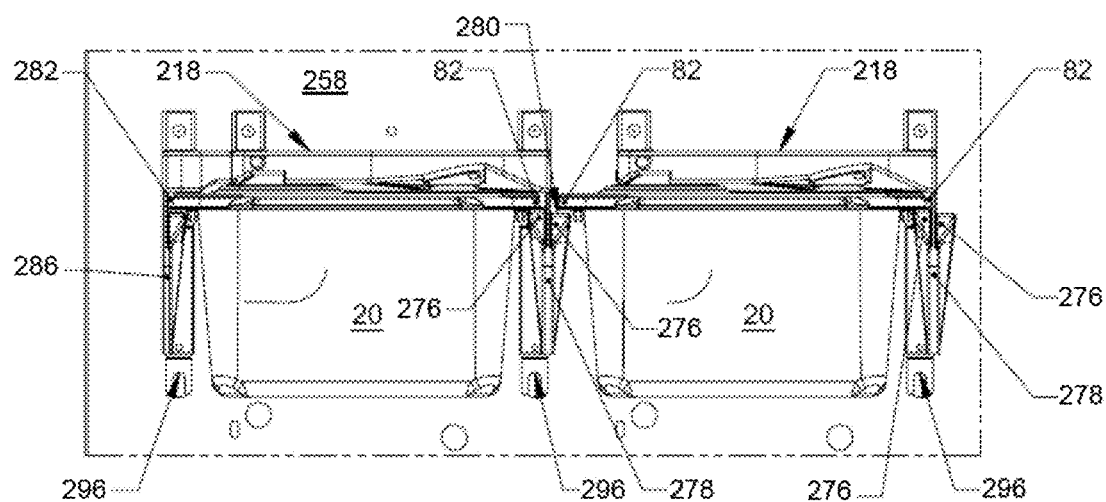
FIG. 28 illustrates two adjacent shelf assemblies of the rack system of FIG. 22 having respective cage assemblies disposed therein.

FIG. 28 shows a front view of a pair of adjacent containment cages 20 disposed in adjacent shelf assemblies 218. A first shelf assembly 218 is secured to the frame 216 and is configured to receive and support a cage assembly 20. The first shelf assembly 218 has two substantially parallel longitudinal rails 276 on opposite sides of a frame member 278 of the shelf assembly 218 with each rail 276 having an upper edge 280 (see FIG. 30) configured to receive a bottom surface of a flange portion 82 of a disposable containment cage assembly 20 engaged therewith. As can be seen in FIG. 28, each individual shelf assembly 218 provides one rail 276 for a given cage assembly with the opposed rail 276 on the opposite side of the frame member 278 of the shelf for the cage assembly provided by an adjacent shelf assembly 218. The rail 276 on the adjacent shelf assembly may also be substantially parallel to the first rail. As shown in the left hand side of FIG. 28, the end column of shelf assemblies 218 may require a special frame piece 286 on the left hand side to provide a rail 276 where there is no adjacent shelf assembly 218.

Each rail 276 is stationary so that an upward bias on a conical receptacle of the containment cage 20 is created from the deflection of the cage lid 132 or conical receptacles 66, 68 against the respective fixed nozzles 270, 272 of the shelf assembly 218. This upward bias establishes a seal between the respective nozzles 270 and 272 of the upper portion of the shelf assembly 218 and conical receptacles 66 and 68 of the containment cage 20. The seal provides for a controllable flow of air through the receptacles of the cage assembly and the first conduit 292 and second conduit 294 of the shelf assembly 218 which are in communication with an inner passageway of the manifold and plenum system. The coupling between the nozzles of the shelf assembly 218 and the conical receptacles of the cage assembly 20 may also create a releasable mechanical coupling between the cage assembly 20 and shelf assembly 218 such that when the cage assembly is fully inserted into the shelf assembly, it will resist removal until the force by the conical receptacles into the respective nozzles of the shelf assembly is overcome due to residual deflection. The maximum force to fully pull or disengage some embodiments of a cage 20 that is engaged with a shelf assembly may be, for example between about 1 pound to about 10 pounds, or more specifically about 2 pounds to about 8 pounds, or more specifically about 3 pounds to about 6 pounds, or more specifically about 4 pounds to about 5 pounds. Conversely, the maximum force required to completely engage some embodiments of a cage 20 with a shelf assembly may be, for example between about 1 pound to about 10 pounds, or more specifically about 2 pounds to about 8 pounds, or more specifically about 3 pounds to about 6 pounds, or more specifically about 4 pounds to about 5 pounds.

As discussed above, stationary rails 276 may be used to support cage assemblies 20. Although such rail embodiments 276 do not include bias springs, it may be possible to achieve a result similar to that of the spring bias rails by use of the inherent elasticity of lid embodiments of cage assemblies 20. More specifically, the inherent flexibility of a thin wall polymer lid of a cage assembly 20 may be capable of resilient vertical deflection sufficient to releasably couple the nozzles 270 and 272 to the conical receptacles 66 and 68 of the cage assembly. For such an embodiment, the flange portion 82 of a cage assembly 20 may be supported by a pair of substantially parallel stationary rails 276 that are disposed at a fixed distance from the nozzles 270 and 272 of the shelf assembly 218. The fixed distance may be selected such that the conical receptacles are forced resiliently downward as the cage assembly 20 is pushed into the shelf assembly 218 and then resiliently recover in an upward direction when the conical receptacles become horizontally aligned with the respective nozzles 270 and 272. The lid material type, thickness and configuration may be selected in such embodiments to provide a desired amount of resilient force in order to achieve a proper seal between the conical receptacles 66 and 68 and the nozzles 270 and 272. For some embodiments, the spacing between the upper edge or surface 80 of the rails 276 and nozzles on the shelf assembly 218 may be selected such that once the receptacles 66 and 68 engage the nozzles 270 and 272, the upward resilient force of the deflected lid may be substantially relaxed with a little to no residual force on the coupled configuration.

The nozzles 270 and 272 may serve to provide a source of pressurized gas or a source of negative pressure for ventilation of the cage assembly 20. The source of negative pressure or positively pressurized gas may include a ventilation system. This may allow air to flow downward into an interior volume of the base of a cage assembly coupled to a shelf assembly 218 and towards or into bedding material disposed in the bottom of the base when the cage assembly is in use. A user may pull the lid and cage base simultaneously from the rack 210 by engaging the lid 132 and cage base units directly, and the lid 132 and cage base will automatically disengage from the resilience of the lid 132 or cone receptacles 66, 68 from the nozzles 270, 272 of the rack.

For some embodiments, the flange portions 82 of the cage assemblies 20 may be configured to have a substantially loose fit in a transverse or horizontal direction so as to allow some movement and adjustment of the conical receptacles 66 and 68 of the cage assembly 20 with respect to the fixed nozzles 270 and 272 of the shelf assembly 218. Such transverse translation allows the nozzles 270 and 272 to couple to respective conical receptacles of the lid of the cage assembly 20 even if the cage assembly is positioned beneath the nozzles such that the nozzles are not perfectly aligned with respective conical receptacles. This situation of imperfect alignment may be particularly prevalent in situations involving larger cage assemblies 20 with larger heavier animals where the cage assembly does not easily slide on a shelf of a rack system in order to achieve such alignment.

For some embodiments, the rails 276 may be about 5 inches to about 15 inches in length and may be made from a variety of high strength injection molded materials such as glass filled nylon. The frame member 278 of the shelf assembly may be made from any suitable high strength material, including corrosion resistant metals such as aluminum, stainless steel and the like. The frame member 278 also includes a mounting slot 296 at a rear bottom portion of the frame member 278 that may be secured to a wall portion 258 of the rack assembly with any suitable fastener such as screws, bolts, rivets, welding, adhesives or the like. A top portion 300 of the shelf assembly 218 may be secured to the frame member 278 of the shelf assembly 218 by any suitable fasteners or adhesives and may also be made from a high strength injection molded material such as glass filled nylon. The top portion 300 includes shelf mounting flanges 302 and also houses the first and second nozzles 270 and 272 and first and second conduits 292 and 294 which may be used as either supply conduits or exhaust conduits. The top portion 300 may also be shorter in length than the cage 20, the same length as the cage 20, or longer than the cage 20.

Figure 32:
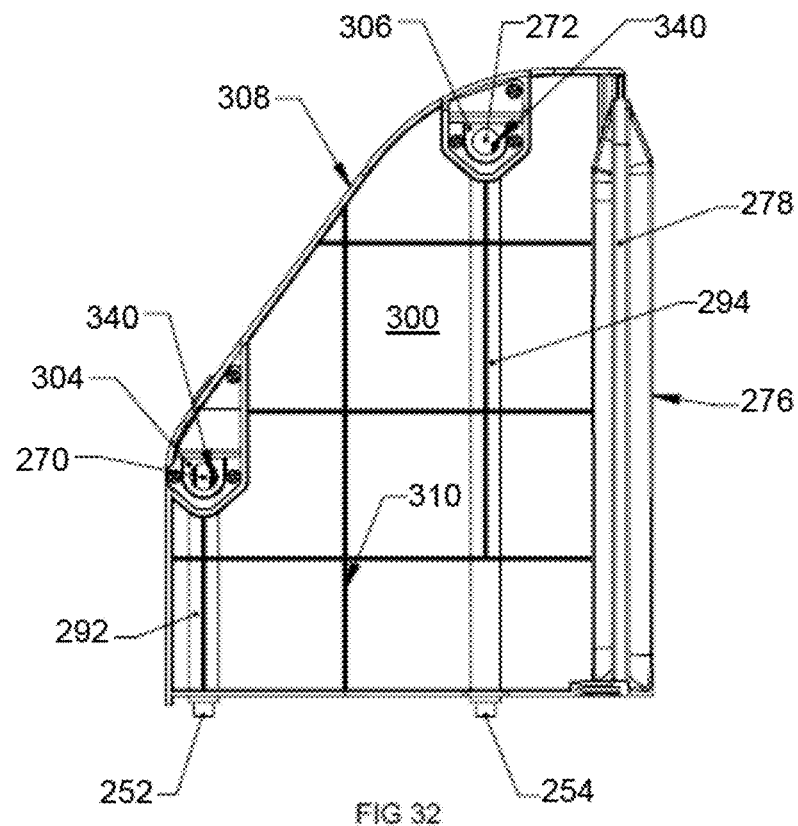
FIG. 32 is a bottom view of the shelf assembly of FIG. 30.
Figure 33:
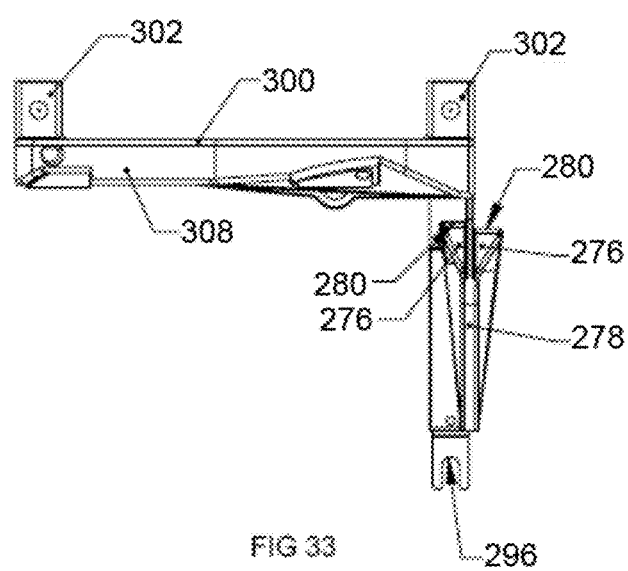
FIG. 33 is a front view of the shelf assembly of FIG. 30.
Figure 34:
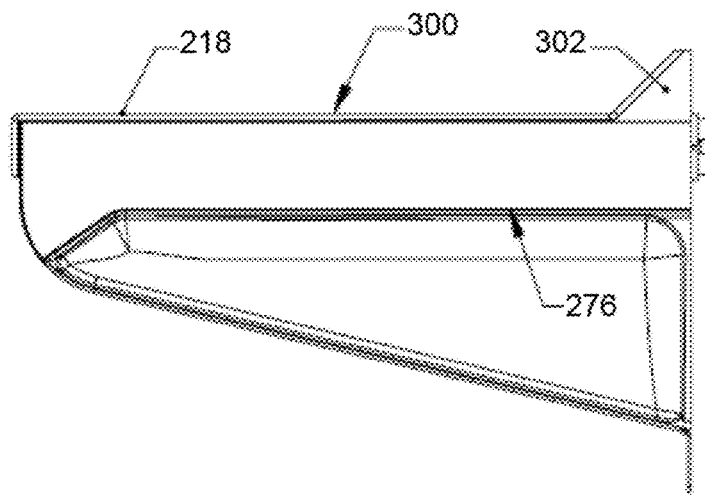
FIG. 34 is a side elevation view of the shelf assembly of FIG. 30.
Figure 35:
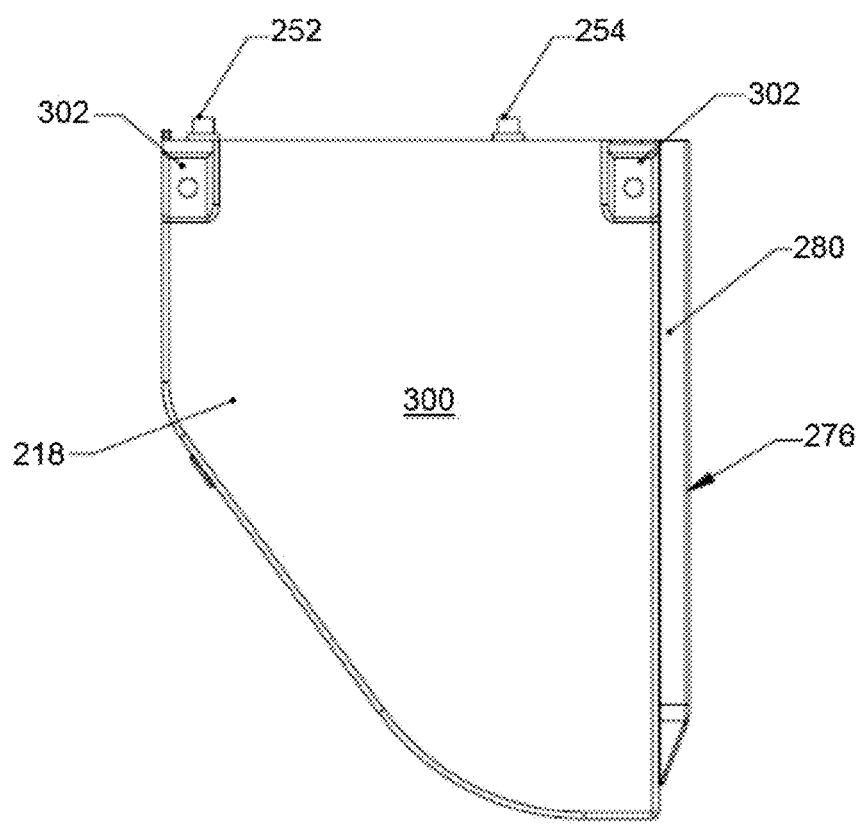
FIG. 35 is a top view of the shelf assembly of FIG. 30.

FIGS. 30-35 show an embodiment of the shelf assembly 218 in more detail. In particular, FIG. 32 shows the first conduit 292 and second conduit 294 molded into the top portion 300 of the shelf assembly 218 with the conduits 292 and 294 extending from respective first and second conduit couplers 252 and 254 in the rear of the top portion 300 to the respective first and second nozzles 270 and 272 disposed towards the bottom of the top portion 300. The first and second nozzles 270 and 272 include a respective first resilient seal 304 and second resilient seal 306 which are each disposed at the opening of the nozzle and held in place by respective retainer plates. The annular or cylindrical resilient seals 304 and 306 may be made of an elastic polymer or the like that facilitates an air tight seal between each mating nozzle 270 and 272 and conical receptacle 66 and 68 of the cage assembly 20. The top portion 300 of the shelf assembly 218 has a substantially smooth planar top surface and a corrugated bottom surface which also represents an outline of the internal structure of the top portion 300. The top portion 300 also includes a rim or lip portion 308 extending around the perimeter of the top portion 300 and a network of strengthening ribs 310 shown in FIG. 32 that form a grid on the bottom surface of the top portion 300. Mounting flanges 302 at the rear of the top portion 300 are also molded into the top portion structure. The molded structure including the perimeter rim 108 and strengthening ribs 310 allows the top portion 300 of the shelf assembly 218 to be injection molded at a low cost but maintain a high degree of uniformity and strength.

As shown in FIG. 22, the rack system embodiment 210 includes a controller embodiment 230 which may be coupled to a blower assembly and one or more sensors 340 (see FIG. 32). Any desired sensor 340 or sensors may be disposed within the supply and exhaust passageways 244 and 246 of the plenum 238 shown in FIG. 27, within the conduits 292 and 294 of the shelf assembly 218 as shown in FIG. 32, within an interior volume of the cage assembly 220 as shown in FIG. 15 or at any other suitable position within the rack assembly 210. The sensors 340 include any of a variety of configurations or types that may be used to monitor conditions within each individual cage 220 supported by the rack system 210. The data obtained by the controller 230 from the sensors 340 (see FIG. 32) or other sources may be processed by a computing system disposed within the controller or any other suitable location in the system that may include a processor and data storage device and then displayed on a graphic user interface in a convenient visual display format.

For some embodiments, the graphic user interface may contemporaneously display an icon or the like for each containment cage 220 supported by a given rack system 210. For some embodiments, the icons displayed on the graphic user interface may be positioned on the screen in a configuration corresponding to the configuration of the actual cages of the rack system. In other words, a facsimile of a front view of a side of the actual rack system may be displayed on the screen of the graphic user interface such that lab personnel may immediately and intuitively assess the status of any of the cages on the rack system. For some embodiments, the cage icons of the graphic user interface may use a color coded display to efficiently and rapidly convey cage status information to lab personnel. For example, if parameters are being monitored and processed are directed to determining the appropriate time to change a disposable cage to a new unused cage, an icon color may be used to indicate the proximity of a necessary change. If the icon color is green, no change is necessary, if the icon color is yellow, a change may be necessary soon and a red icon may be used to indicate the need for an immediate cage change.

Some of the cages status parameters that may be monitored within each cage interior by remote sensors 340 or other means may include the presence or level of viruses or bacteria, ammonia levels, carbon dioxide levels, carbon monoxide levels, humidity levels, air pressure levels, and the like. Other parameters that may be monitored may include total animal weight within each cage, animal physical activity within each cage or other animal behavior or dynamics within each cage. For some embodiments, sensors 140, 340 (see FIG. 15) that may be configured to provide measurement data to determine one or more of the above parameters may be disposed within each cage but may also be disposed within a conduit of the shelf assembly or plenum adjacent the shelf assembly. Each sensor 140, 340 may also be operatively coupled to the controller 230 in order to communicate the sensor reading to the controller so that the sensor reading data may then be processed and displayed on the graphic user interface.

FIGS. 36-39 illustrate a containment cage assembly 20 being slid into a shelf assembly of a rack assembly 218 with stationary rails 276. With respect to FIGS. 36-39, these figures show nozzle 272, cage conical receptacle 68, and ramp 350 for the purpose of illustration of operation. One or more nozzles, conical receptacles or ramps may not be depicted within these figures, however, all reference with regards to parts in these figures are applicable to similar or identical parts not shown.

Figure 36:
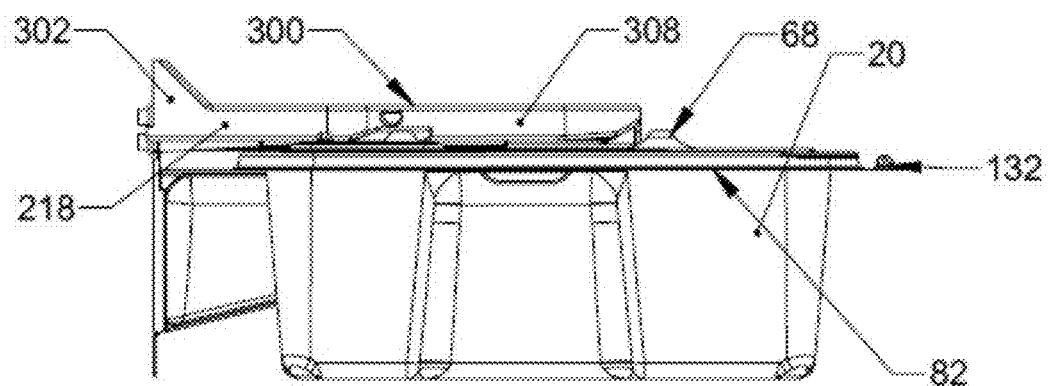
FIG. 36 depicts a cage assembly being engaged into a shelf assembly of a rack system.
Figure 37:
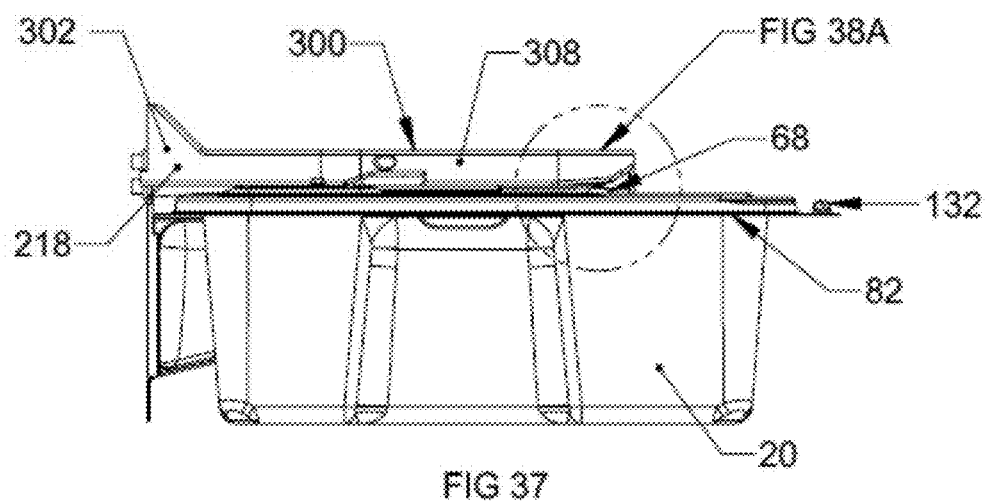
FIG. 37 is a side view of a cage encountering engagement force from the top portion of the shelf assembly.
Figure 38A:
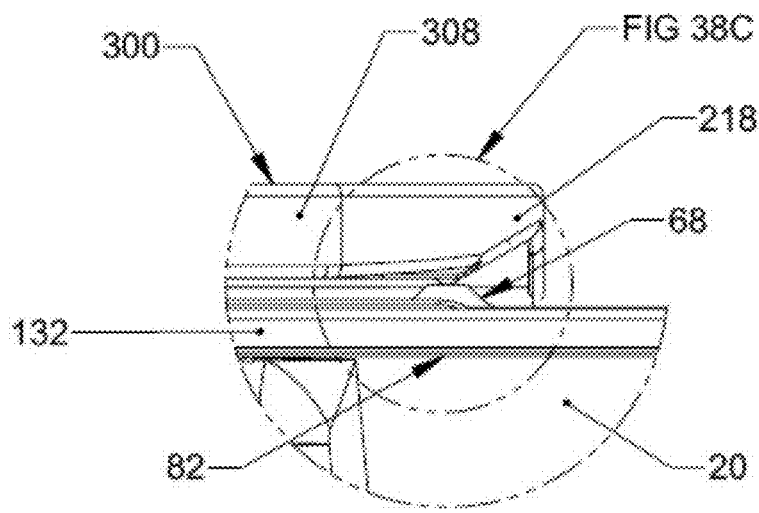
FIG. 38A is an enlarged cut away view of a portion of the shelf assembly and cage of FIG. 37 indicated by the encircled portion 38A in FIG. 37.

FIG. 36 shows a cage 20 being slid into a shelf assembly 218, supported by stationary rails 276 where the cage lid 132 and a cage conical ventilation receptacle 68 are minimally being deflected by the top portion 300. FIG. 37 shows cage 20 being engaged further into the shelf assembly 218 with maximum deflection force being placed on the cage lid 132, cage conical 68 and cage flange portion 82 by the downward displacement of the conical receptacle 68 by the top portion 300 of the shelf assembly 218. As seen in FIG. 37, the cage conical receptacle 68 is lowered as the lid 132 is displaced in a downward direction. FIGS. 38A, 38C and 38D show the conical receptacle 68 being deflected in a downward bending direction to give clearance to the outer rim of the nozzle 272 on the bottom side of the top portion 300 of the shelf assembly 218. FIG. 38C is a further cut away view of a portion of the rack module of FIG. 37 indicated by the encircled portion 38A in FIG. 37. FIG. 38C further depicts the downward deflection of the cage lid 132 for clearance of the conical receptacle 68 with respect to the outer rim of the nozzle 272.

The ramp 350 of nozzle 272 is configured to deflect conical receptacle 68 such that as the conical receptacle 68 contacts the ramp 350 from an upper portion of the ramp 350 and is pushed along the ramp towards the lower most portion of the ramp 350 during cage insertion into the shelf assembly, the conical receptacle 68 will encounter an increase in deflection force such that the conical receptacle 68 is pushed downwards into the lid and is displaced, the amount of displacement indicated by arrows B and C. The ramp angle, figure item E, is the angle of the ramp 350 formed relative to a horizontal plane or is parallel to either the top portion 300 or rails 276. The ramp angle E may affect the time and force of engagement a conical receptacle 68 or lid 132 may be encounter during cage insertion. For example, if the ramp angle E is relatively large, then the time and engagement distance over which the maximum deflection force between the ramp and conical receptacle is encountered may be short in comparison to those values for a smaller ramp angle. For a smaller ramp angle, the time and distance of engagement during cage insertion for maximum deflection once contact is made will be greater, but the engagement force required may be smaller. The ramp angle E for some embodiments may be about 10 degrees and about 70 degrees, more specifically, about 20 degrees to about 40 degrees, for example.

Figure 38B:
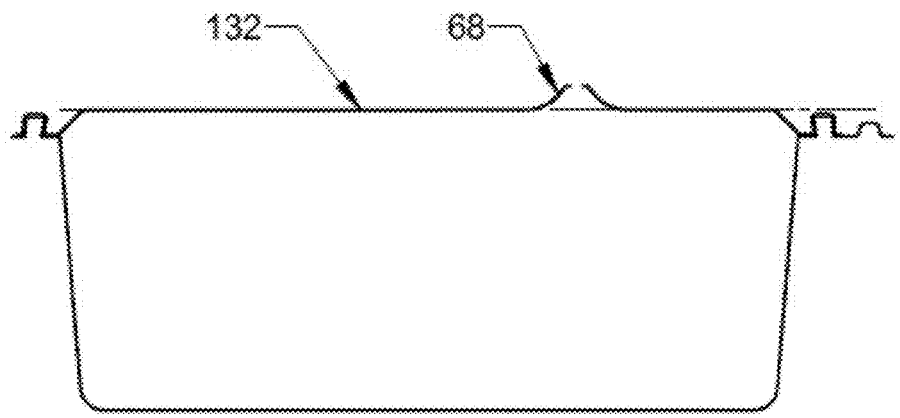
FIG. 38B is an elevation view in section of a portion of the cage assembly of FIG. 36 where the cage assembly is not engaged in the rack module and there is no deflection of the cage lid.
Figure 38C:
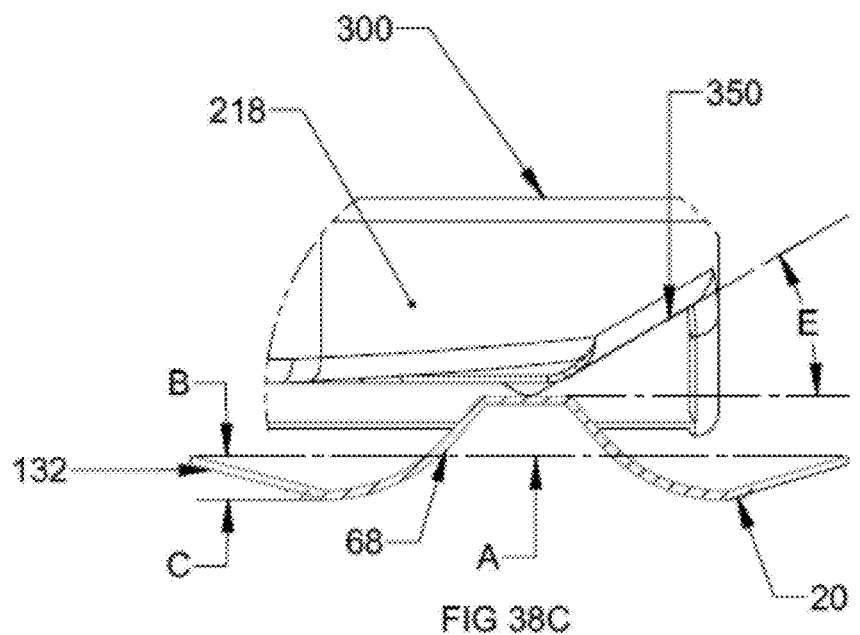
FIG. 38C is an enlarged cut away view of a portion of the shelf assembly and cage of FIG. 38A indicated by the encircled portion 38C in FIG. 38A.
Figure 38D:
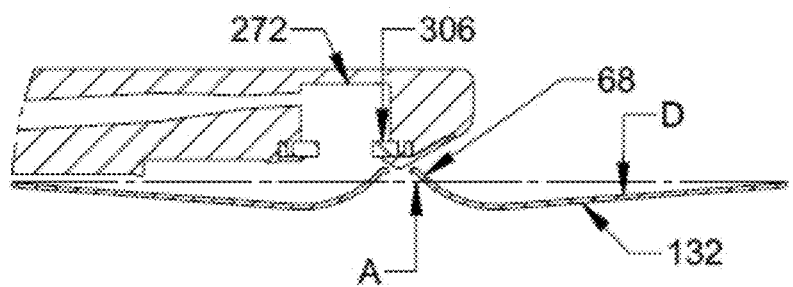
FIG. 38D is a cut away view of a portion of the shelf assembly and cage of FIG. 37 indicated by the encircled portion 38A in FIG. 37.

FIG. 38B shows a cage assembly where the cage assembly is not engaged in the shelf assembly 218 and there is no deflection of the cage lid 132 or conical receptacle 68. However, it should be noted that there may be a minimal force or deflection force being exerted onto the lid of cage 20 by earth's gravity. When the cage 20 is inserted into the shelf assembly 218 and the conical receptacle 68 is being displaced by the top portion 300 of the shelf assembly 218, the conical receptacle 68 or lid 132 will encounter a range of forces starting with a minimum force (from an undeflected state of the lid, as shown in FIG. 38B, by dotted line A) up to a maximum engagement force. The maximum engagement force refers to the greatest amount of force necessary for a user to continue pushing the cage further into the shelf assembly. The maximum engagement force also may refer to the situation when a cage 20 has encountered the greatest amount of friction. The maximum engagement force may also be encountered at about the same time when the maximum deflection force is encountered. The maximum engagement force may also be a force whose direction is perpendicular to the wall 258 of the rack assembly, or along the same direction as the rails 276 of the shelf assembly 218, or in a horizontal direction. The conical receptacle 68 or lid 132 has reached a maximum deflection force when a maximum amount of force is exerted onto the conical receptacle by the top portion 300.

In some embodiments, the conical receptacle 68 or lid 132 has reached a maximum deflection force when a maximum amount of force is exerted onto the conical receptacle by the lower most protrusion of the top portion 300 or the lower most part connected to the top portion 300. Such parts may include, for example, a connector, a gasket, a value, a nut, a bolt, a frame, a rail, a sensor, a coupler, a flange, a seal, a rim or lip, a rib, a tram, a channel, a spring, a slot, a plenum or any such component of the rack assembly described herein. In order to continue pushing the cage into the shelf assembly, the maximum deflection force needs to be overcome so that the conical receptacle 68 will clear the top portion 300 and deflect back towards the undeflected state in an upward direction to achieve a proper seal between the conical receptacle 68 and nozzle 272. FIG. 38C shows the maximum deflection of the lid 132 at the conical receptacle 68 when a maximum engagement force has been encountered. The maximum amount of deflection by the lid is shown between arrows B and C. In FIG. 38D, the maximum deflection force onto the lid is shown by figure item D.

Figure 39:
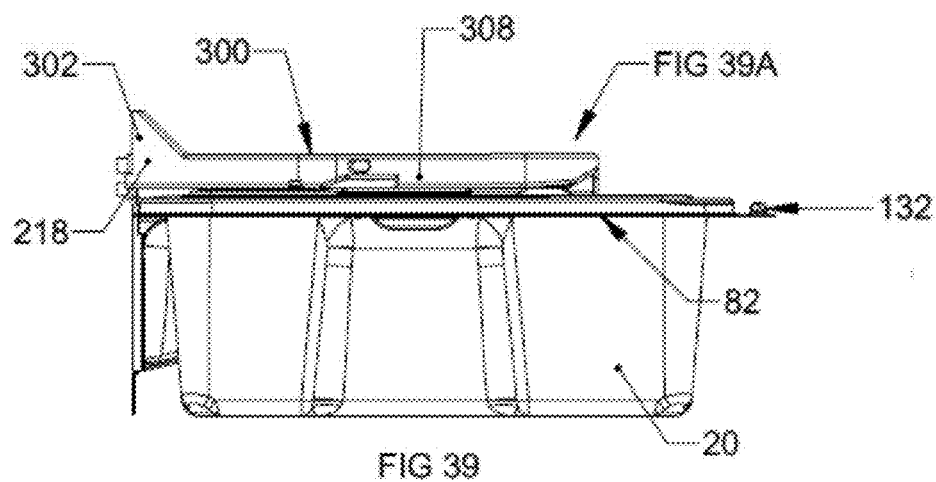
FIG. 39 shows engagement of a cage fully inserted or engaged into shelf assembly of a rack system.
Figure 39A:
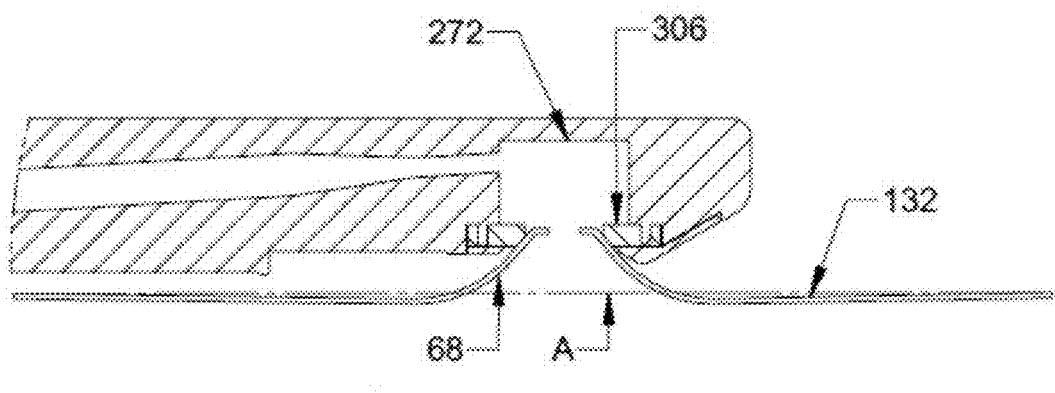
FIG. 39A is an enlarged cut away view of a portion of the shelf assembly and cage lid of FIG. 39 indicated by the encircled portion 39A in FIG. 39.
Figure 40:
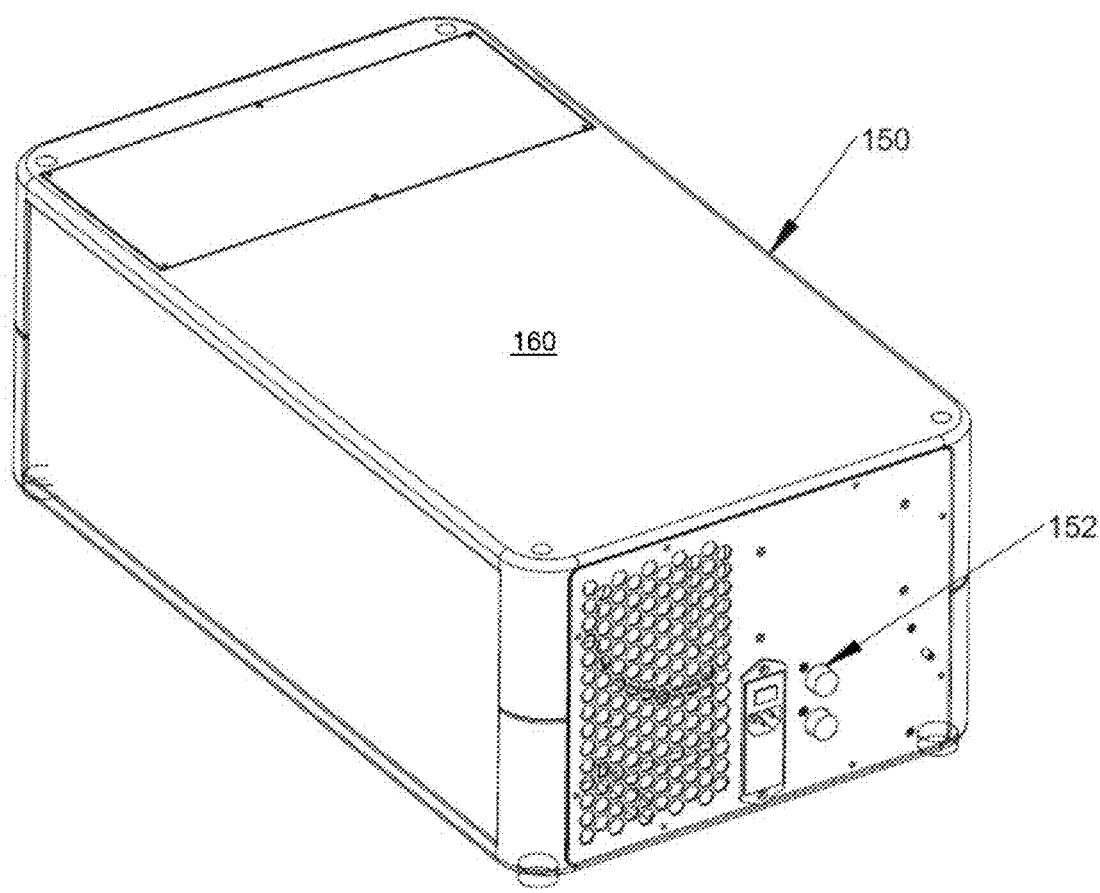
FIG. 40 is a rear perspective view of a blower assembly embodiment.

FIG. 39 depicts engagement of a cage assembly 20 into a shelf assembly 218. FIG. 39 is a side view of a cage assembly fully inserted into a rack system wherein the conical receptacle 68 has clearance within the nozzle 272 and provides a desired amount of resilient force in order to achieve a proper seal between the conical 68 and nozzle 272. This resilient force is also referred to as the residual deflection force where the lid 132 or conical receptacle 68 is exerting a force onto the nozzle 272, wherein the resilient force has a magnitude between the force generated in an undeflected state of the lid 132 or conical receptacle 68 and the maximum deflection force. The lid 132 or conical receptacle 68 at an undeflected state can be depicted by figure item A in FIG. 39A, for example. The lid 132 or conical receptacle 68 at maximum deflection can be depicted by figure item D in FIG. 38D, for example. The residual deflection force of engagement for the embodiment in FIG. 39A results from the residual deflection of the lid indicated by the separation between the base line datum A and the top surface of the lid 132. For some embodiments, the residual deflection of the lid may be about 0 inches to about 0.1 inches, more specifically, about 0.01 inches to about 0.06 inches. A proper seal between a conical 68 and nozzle 272 may also be aided by an optional component such as a resilient seal 304, 306, see FIG. 32, or any similar component. Other embodiments of cages and lids that are resilient to these forces may also be used within the rack assembly.

In order to properly slide a cage into (or out of) a shelf assembly to where the cage is fully secured within the shelf assembly, a certain amount of force or pressure needs to be exerted onto the cage, cage lid, flange portion, conical receptacles or any combination thereof. Pressure or force place on any of the cage components may come from any components of the shelf assembly and vice versa. Other factors might increase or decrease these pressures or forces, such as environmental factors, for example humidity, or contaminants, for example dirt, or material durability, or length of the top portion, or height of the conical receptacle whereby the lid is deflected downward from the undeflected state, or the length of the rails, or other such factors and combinations thereof. For some embodiments, an engagement force for pushing a containment cage into a shelf assembly may be calculated by a mathematical formula. An example, of such a mathematical formula may include:

$$F=(((3EJy)/(l^3 \cos\theta))^2+((3EJy)/(l^3 \sin\theta))^2)^{1/2}$$

where F is the engagement force, E is the modulus of elasticity of the containment cage lid material, J is the area moment of inertia based on the geometry of the cage lid, l is the major transverse length of the nominal surface of the cage lid, y is the height of the receptacle and θ is the ramp angle of the shelf assembly. The area moment of inertia J may also be expressed as $J=(\pi y^4)/8$ for some embodiments. A specific example of the application of such a formula for a system embodiment may include an engagement force of F equal to about 6.2 pounds, where E is about 427861 pounds per square inch, J is about 0.01 in$^4$, l is about 12.4 inches, y is about 0.4 inches and θ, the ramp angle, is about 30 degrees. For such an example, any suitable or corresponding range of variable or value discussed herein may be substituted for any of the given values, either singly or in any combination with other disclosed ranges.

Forces needed to slide a cage into or out of a shelf assembly may be affected or influenced by at least a maximum engagement force, a maximum deflection force and a residual deflection force, or any combination thereof. As discussed above, a maximum engagement force, for example, may be about 1 pound to about 10 pounds, or more specifically about 2 pounds to about 8 pounds, or more specifically about 3 pounds to about 6 pounds, or more specifically about 4 pounds to about 5 pounds. For some embodiments, a maximum deflection force, for example, may be about 1 pound to about 15 pounds, or more specifically about 2 pounds to about 10 pounds, or more specifically about 3 pounds to about 8 pounds, or more specifically about 4 pounds to about 7 pounds. For some embodiments, a residual deflection force, for example, may be about 0.1 pounds to about 5 pounds, or more specifically about 0.5 pounds to about 4 pounds, or more specifically about 0.7 pounds to about 3 pounds, or more specifically about 1 pounds to about 2 pounds. For some embodiments, the maximum amount of deflection by the lid and receptacles disposed thereon, as shown in FIG. 38C between arrows B and C, for example, may be about 1 mm to about 25 mm, or more specifically about 2 mm to about 10 mm, or more specifically about 4 mm to about 8 mm, or more specifically about 5 mm to about 7 mm. For some embodiments, the length of the ramp 350 on the top portion of the shelf assembly, for example, may be about 0.5 inches to about 2.5 inches, more specifically, about 1 inches to about 2 inches. For some embodiments, the height of the conical receptacles above a nominal top surface of the lid portion adjacent a receptacle, for example, may be about 0.1 inches to about 1.5 inches, more specifically, about 0.2 inches to about 1.0 inches.

Figure 41:
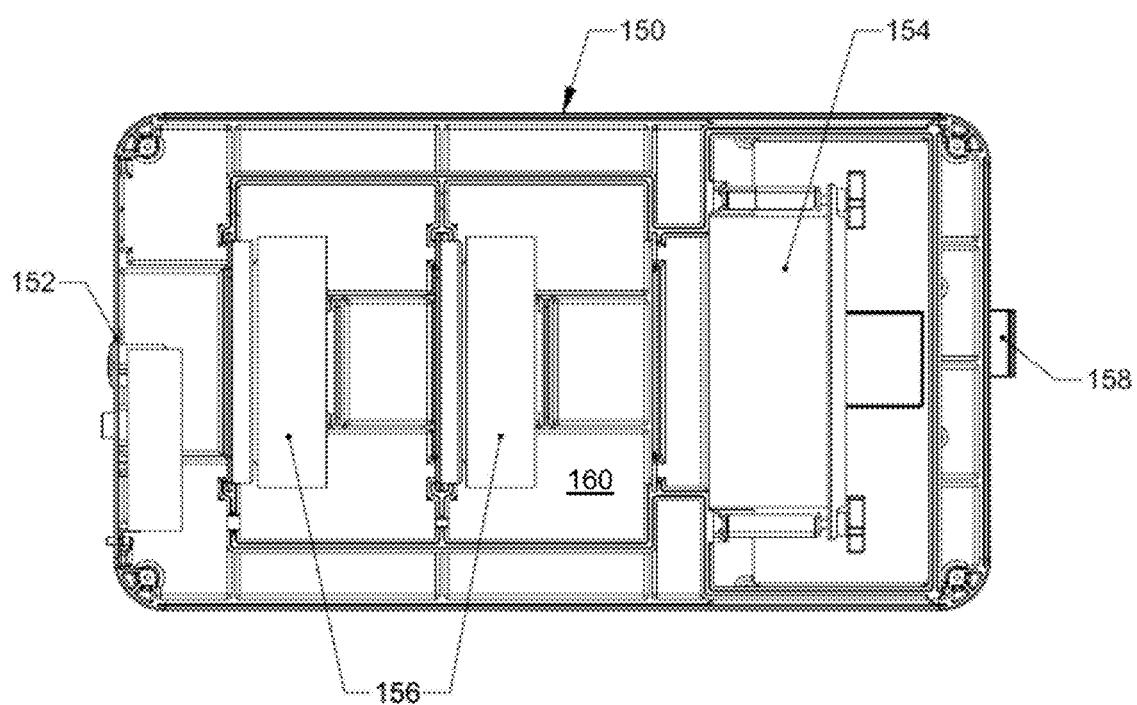
FIG. 41 is a top view of the blower assembly of FIG. 40.
Figure 42:
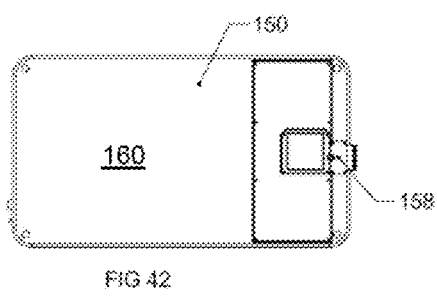
FIG. 42 is a top view of the blower assembly for an exhaust blower for a double sided rack.
Figure 44:
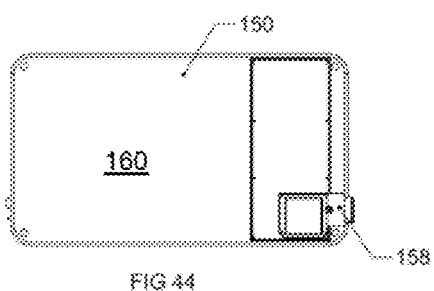
FIG. 44 is a top view of the blower assembly for a exhaust blower for a single sided rack.
Figure 43:
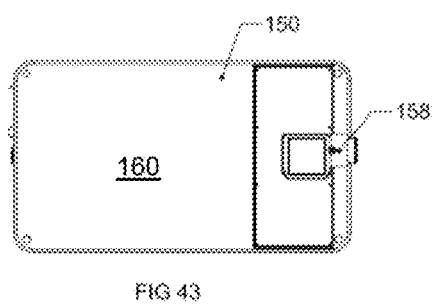
FIG. 43 is a top view of the blower assembly for a supply blower for a double sided rack.
Figure 45:
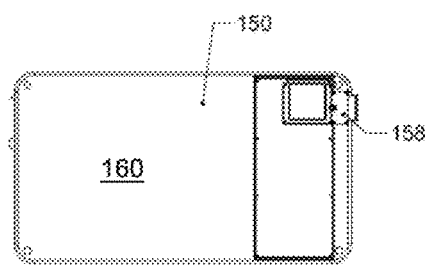
FIG. 45 is a top view of the blower assembly for a supply blower for a double sided rack.

FIGS. 40-45 46 illustrate the blower assembly 160 of the rack system. As depicted in FIG. 22, the blower assembly may be found on top of the rack system as either a supply blower 224, or an exhaust blower 224. A supply blower 224 comprises a high pressure blower and provides a high pressure air or positive pressure to the supply passageway of the at least one transverse dual passageway manifold. An exhaust blower 226 comprises a high vacuum blower and provides a high vacuum or negative pressure to the exhaust passageway of the at least one transverse dual passageway manifold. FIG. 41 is a top cut away view of the blower assembly 160 of FIG. 40 which comprises a case injected molding 150 that has a horizontal top portion and horizontal bottom portion which are interchangeable and house all the blower components, an electronics panel 152, an air filter 154, one or more electric fans 156, a blower interface 158, and a housing unit. The blower assembly 160 may either be a supply blower 224 or an exhaust blower 224 depending on whether the electronic fans 156 are oriented such that they provide high pressure air or force air into a supply passageway or they provide a high vacuum or force air out of the exhaust passageway. FIG. 42 is a top cut away view of the blower assembly for an exhaust blower for a double sided rack. FIG. 43 is a top cut away view of the blower assembly for a supply blower for a double sided rack. FIG. 44 is a top cut away view of the blower assembly for an exhaust blower for a single sided rack. FIG. 45 is a top cut away view of the blower assembly for a supply blower for a double sided rack. Rack assemblies supporting cage assemblies only on one side are called single sided racks. Rack assemblies supporting cage assemblies on both sides, as depicted in FIG. 22, are called double sided racks. Depending on whether the blower assembly 160 is an exhaust blower or a supply blower and whether the rack assembly is a single sided or double sided assembly may orient where the blower interface 158 is located within the blower assembly 160, as seen in FIGS. 42-45. The blower interface 158 which is a protruding tab that hangs over the edge of the blower may serve at least two functions in that it acts as an interface between the rack assembly and the blower assembly and it seals or locks the blower assembly to the rack assembly.

Figure 46:
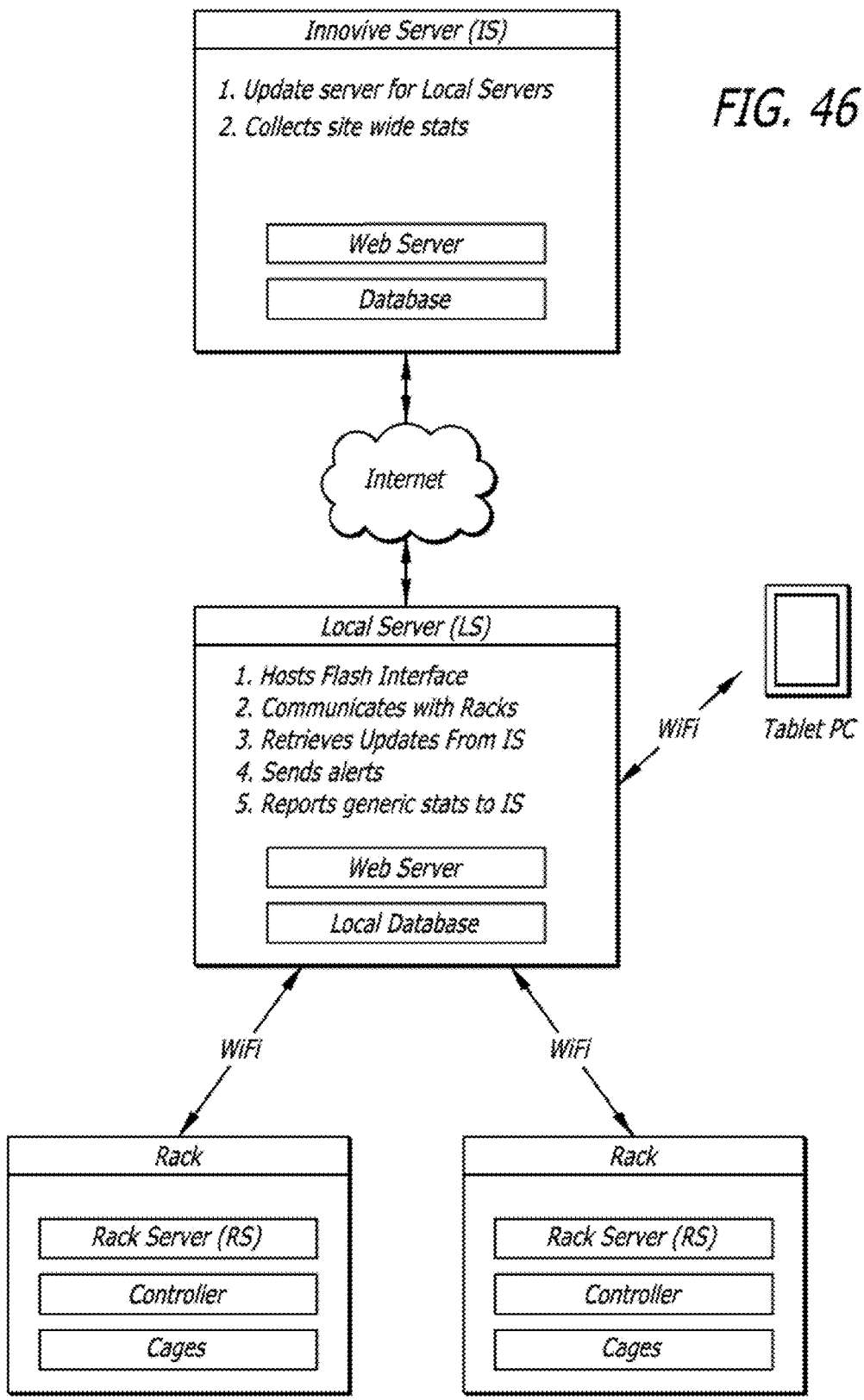
FIG. 46 is an embodiment of an architecture system for the operational rack system.
Figure 47:
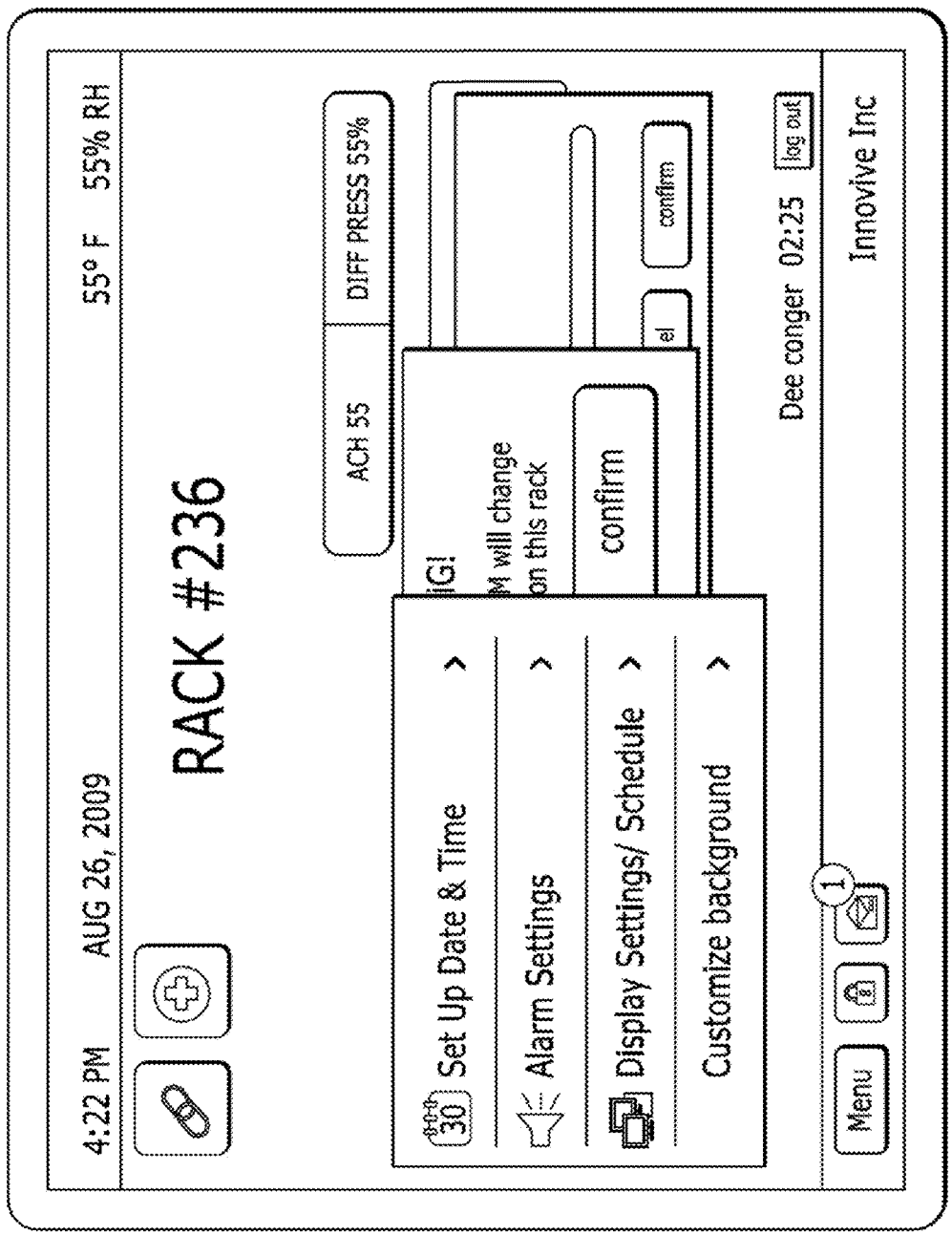
FIG. 47 is a diagrammatic screen shot of an embodiment of the controller of the rack system of FIG. 46.

FIG. 46 illustrates the system architecture of the controller 230 which maintains information regarding containment cage status. The three levels of servers for the rack, local and main servers can each act alone or in combination with each other. FIG. 46 shows an example of two rack systems each having their own rack server (RS), controller 30, and one or more cage assemblies. FIG. 47 illustrates a screen shot of a graphic user interface embodiment for a controller showing information about a rack, i.e. rack #236, the ACH, DIFF PRESS percentages, a warning pop up window, as well as a menu pop up where setting may be updated such as date, time, alarm settings, display settings/schedule and customize background. Other features may include a password protection, messages, menu and the like. The controller may also have such features as wireless access to the internet or other wireless devices. The controller may support video and audio functions as well as automated features such as sending an automated audio message to a specified phone or emails, faxes and the like in response to an emergency situation, an alert, a warning or as a reminder. An electronic log of persons accessing the controller, time, duration and operations performed as well as information monitored by the sensors 140, 340 may be stored in the controller's data storage. The display may also have a touch screen as well as a virtual keyboard displayed on the screen or a manual keyboard as part of the device. The controller of each rack may also be in direct or wireless connection to a rack server. This rack server may coordinate schedules for all cages within the rack, manage maintenance, monitor all sensors, and efficiently process all information through a user friendly display similar to those of the individual controllers.

Figure 48:
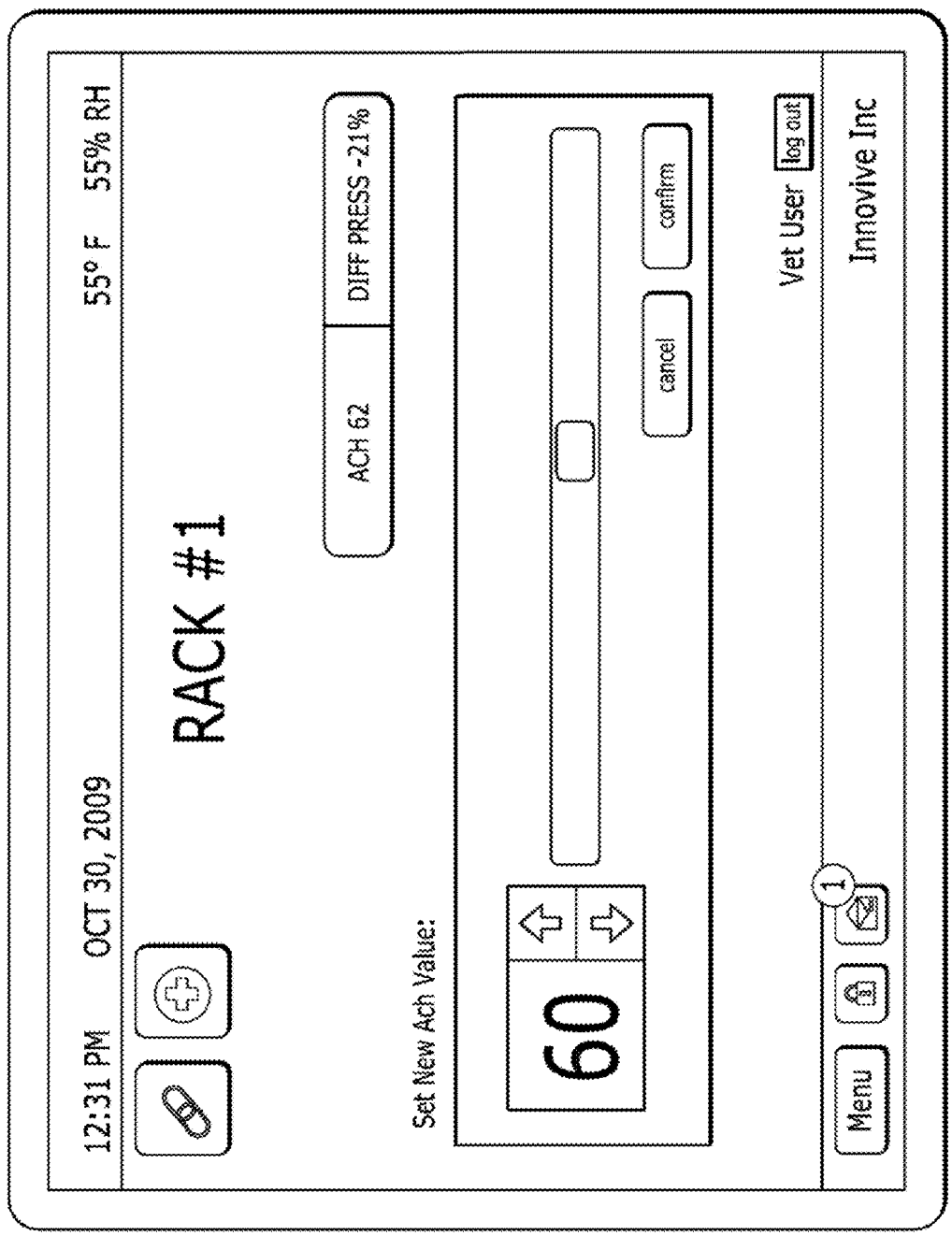

FIGS. 48-51 illustrate graphic user interface embodiments from a rack server. In FIG. 48, the display shows the air changes per hour "ACH" value 60 which may be adjusted by toggling up and down arrows on the screen. The differential pressure between the supply conduits and the exhaust conduits indicated as "DIFF PRES" may also be displayed which is indicative of whether the cage assembly interiors have a net positive or negative pressure with respect to the ambient atmosphere. The "DIFF PRES" display also includes up and down arrows, once selected, for adjustment of the relative pressures for achieving either positive or negative internal pressure within the cage assemblies. The date, time and other information may also be shown for reference by lab personnel. For some controller embodiments, various levels of access to the controller parameters and output may be controlled by requiring a passcode. An electronic log of persons accessing the controller, time, duration and operations performed as well as information monitored by the sensors 140, 340 may be stored in the controller's data storage. The display may also have a touch screen as well as a virtual keyboard displayed on the screen or a manual keyboard as part of the device. FIG. 49 shows a list of racks with serial numbers, descriptions, ACH and differential pressure (DP) levels (actual and target levels), status, settings, data and a color code for maintenance. FIG. 50 illustrates rack settings for a particular rack number, i.e. rack #1, with information such as settings, description, stored values, last updated, target values, current values, new target values, rack status, store new value option, set vet alert option, clear vet alert option and done or finished option. FIG. 51 illustrates a schedule or history of each rack, i.e. rack #1, which may include information for type (i.e. ACH or DP), value, time, and reference number for a history of the last 5 minutes, last hour, last 6 hours, last 12 hours, last day, last week, last month, all and the like.

The rack systems may be connected either by hardware or wireless connection (as depicted in FIG. 46) to a local servers (LS). The local server (LS) may serve several functions or be programmable to have additional functions. The local server may host an type of user interface, such as a flash interface, communicate with one or more rack systems, retrieve updates from a main server, send or generate alerts, report generic status to the main server, function as a web server and local database and provide backup to the individual rack servers. The local server may also be directly connected or wirelessly connected to a user friendly portable device such as a tablet personal computer, which may be handheld and easily accessed by users while performing maintenance on cages within a rack system. Such a feature provides easy of use in order to maintain a log of services per cage or update information into the database. The local server can have a programmable processor that monitors the rack settings as well as log maintenance and export the information into a graphical display, such as a bar graph which can be viewed on the table PC. The main server (for example an Innovive Server—IS) may be wireless in communication to the local server in order to send updates or maintain programs or functions for each server. The main server may also collect site wide status for various locations and provide a hosting network. The main server may also act as a web server, offer customer support when a need arises and maintains a backup database. A rack system need not use a local server or main server but be self sufficient. In another embodiment, one or more rack assemblies may only use one local server. In yet another embodiment, a rack system may use only a main server without a local server. Any combination of system architecture is possible.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Modifications may be made to the foregoing without departing from the basic aspects of the embodiment of the invention discussed herein. Although substantial detail has been described with reference to one or more specific embodiments, changes may be made to the embodiments specifically disclosed in this application, and these modifications and improvements may be within the scope and spirit of the embodiments of the invention.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the invention claimed. The term "a" or "an" can refer to one of or a plurality of the elements it modifies (e.g., "a device" can mean one or more devices) unless it is contextually clear either one of the elements or more than one of the elements is described. The term "about" as used herein refers to a value sometimes within 10% of the underlying parameter (i.e., plus or minus 10%), a value sometimes within 5% of the underlying parameter (i.e., plus or minus 5%), a value sometimes within 2.5% of the underlying parameter (i.e., plus or minus 2.5%), or a value sometimes within 1% of the underlying parameter (i.e., plus or minus 1%), and sometimes refers to the parameter with no variation. For example, a weight of "about 100 grams" can include weights between 90 grams and 110 grams. Thus, it should be understood that although the present invention has been specifically disclosed by representative embodiments and optional features, modification and variation of the concepts herein disclosed may be resorted to by those skilled in the art, and such modifications and variations are considered within the scope of this invention.

What is claimed is:

1. A rack system comprising a plurality of disposable animal containment cage assemblies, the rack system comprising:

a frame comprising a nozzle and mount members configured to receive and support a disposable animal containment cage assembly; and a disposable animal containment assembly comprising a lid, a flange or groove and a nozzle receptacle, wherein the nozzle receptacle is on a resilient flexible surface, each of which mount members comprising a groove or flange configured to slideably receive a surface of a flange or groove portion of a disposable animal containment cage assembly;

which nozzle is configured for releasable coupling with the nozzle receptacle of the disposable animal containment cage assembly, and which releasable coupling is by the nozzle receptacle exerting a force onto the nozzle due to deflection of the resilient flexible surface.

2. The rack system of claim 1, wherein the nozzle receptacle of the disposable animal containment cage assembly is conical.

3. The rack system of claim 1, wherein the disposable animal containment cage assembly comprises a thin polymer.

4. The rack system of claim 1, wherein the lid of the disposable animal containment cage assembly is resiliently flexible.

5. The rack system of claim 4, wherein the lid comprises a thin polymer.

6. The rack system of claim 1, wherein the nozzle receptacle of the disposable animal containment cage assembly is on the lid.

7. The rack system of claim 1, wherein the nozzle is convex and the nozzle receptacle is concave.

8. The rack system of claim 1, wherein the nozzle is concave and the nozzle receptacle is convex.

* * * * *